(12) United States Patent
Maeda et al.

(10) Patent No.: US 7,209,103 B2
(45) Date of Patent: Apr. 24, 2007

(54) LIQUID CRYSTAL PROJECTOR

(75) Inventors: Toshio Maeda, Chiba (JP); Akihiro Watanabe, Mobara (JP); Yoshio Maruoka, Mobara (JP); Toshiki Misonou, Ichihara (JP); Hideki Nakagawa, Chiba (JP)

(73) Assignees: Hitachi, Ltd., Tokyo (JP); Hitachi Device Engineering Co., Ltd., Mobara-shi (JP)

( * ) Notice: Subject to any disclaimer, the term of this patent is extended or adjusted under 35 U.S.C. 154(b) by 262 days.

(21) Appl. No.: 10/367,698

(22) Filed: Feb. 19, 2003

(65) Prior Publication Data

US 2003/0156086 A1    Aug. 21, 2003

(30) Foreign Application Priority Data

Feb. 19, 2002   (JP)   ............... 2002-040912

(51) Int. Cl.
*G09G 3/36* (2006.01)
(52) U.S. Cl. .......................... 345/87; 345/204
(58) Field of Classification Search ........ 345/204–206, 345/698, 87–92, 96, 98
See application file for complete search history.

(56) References Cited

U.S. PATENT DOCUMENTS

| | | | | |
|---|---|---|---|---|
| 5,406,304 A | * | 4/1995 | Shirayama | .................. 345/98 |
| 5,874,937 A | * | 2/1999 | Kesatoshi | .................. 345/428 |
| 5,973,661 A | * | 10/1999 | Kobayashi et al. | ......... 345/100 |
| 6,337,235 B1 | * | 1/2002 | Miyanaga et al. | .......... 438/166 |
| 6,448,962 B1 | * | 9/2002 | McKnight et al. | .......... 345/205 |
| 6,480,180 B1 | * | 11/2002 | Moon | .......................... 345/98 |
| 6,504,403 B2 | * | 1/2003 | Bangs et al. | .................. 327/62 |
| 6,515,679 B1 | * | 2/2003 | Igarashi | ...................... 345/698 |
| 6,628,253 B1 | * | 9/2003 | Hiroki | .......................... 345/87 |
| 6,657,622 B2 | | 12/2003 | Park | .......................... 345/205 |
| 2002/0003507 A1 | * | 1/2002 | Dodge | ........................ 345/3.1 |

FOREIGN PATENT DOCUMENTS

| | | |
|---|---|---|
| JP | 08-069265 | 3/1996 |
| JP | 10-011027 | 1/1998 |
| KR | 2002-0007577 | 1/2002 |

* cited by examiner

*Primary Examiner*—Amr A. Awad
*Assistant Examiner*—Steven Holton
(74) *Attorney, Agent, or Firm*—Antonelli, Terry, Stout & Kraus, LLP.

(57) ABSTRACT

A projector includes a liquid crystal display device has a liquid crystal display panel and a display control device coupled to the liquid crystal display panel. The display control device is composed of a first section for receiving an externally supplied video signal, and a second section succeeding the first section and coupled to the liquid crystal display panel. The second section is formed of a circuit for amplifying and converting the video signal into an ac signal supplied from the first section, and a drive pulse circuit for outputting drive pulses for driving the liquid crystal display panel. The first section and the second section are fabricated on first and second substrates separate from each other, respectively. The second section is disposed proximately to the liquid crystal display panel, and the first section and the second section are coupled via a flexible cable.

18 Claims, 59 Drawing Sheets

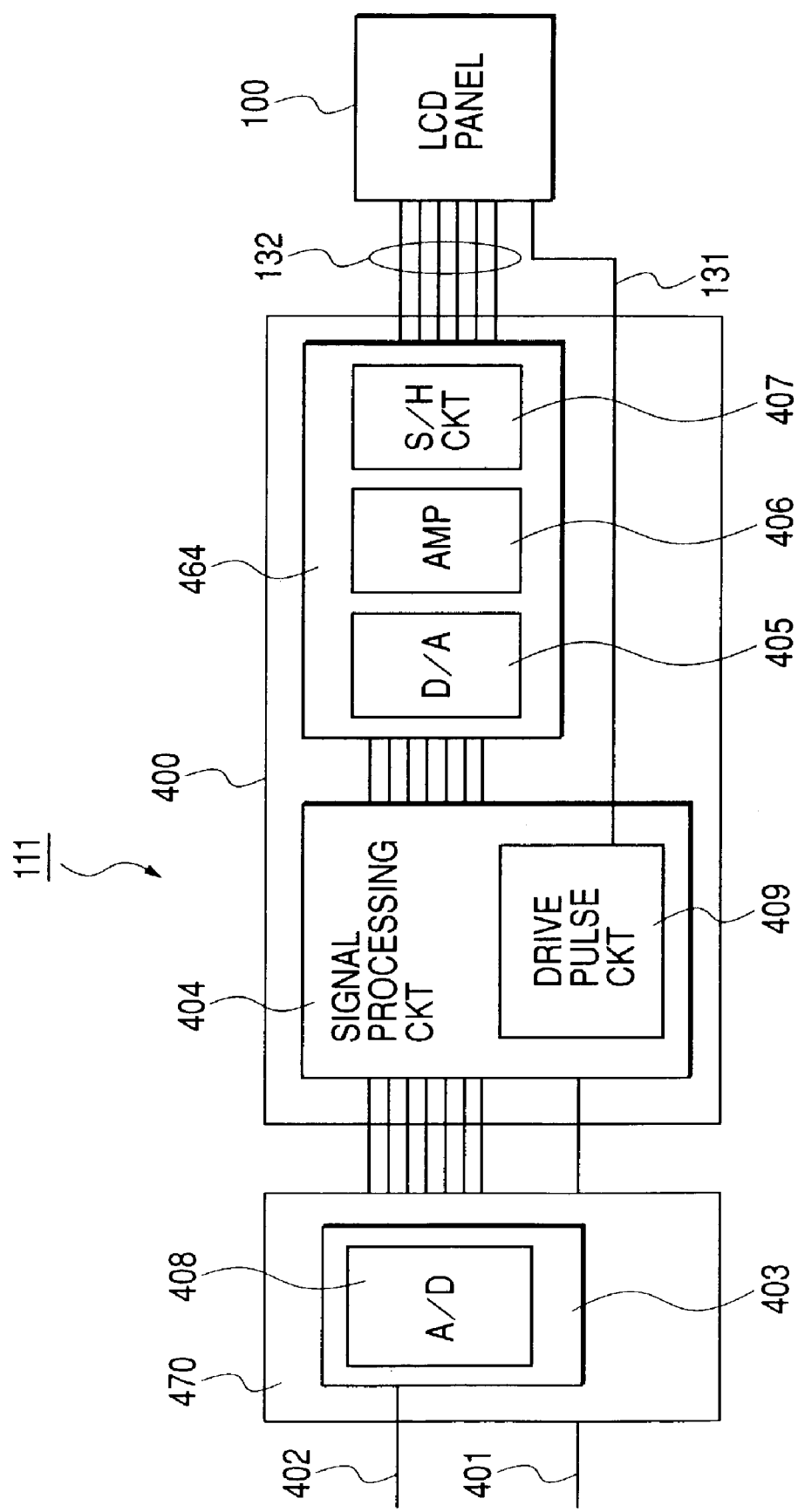

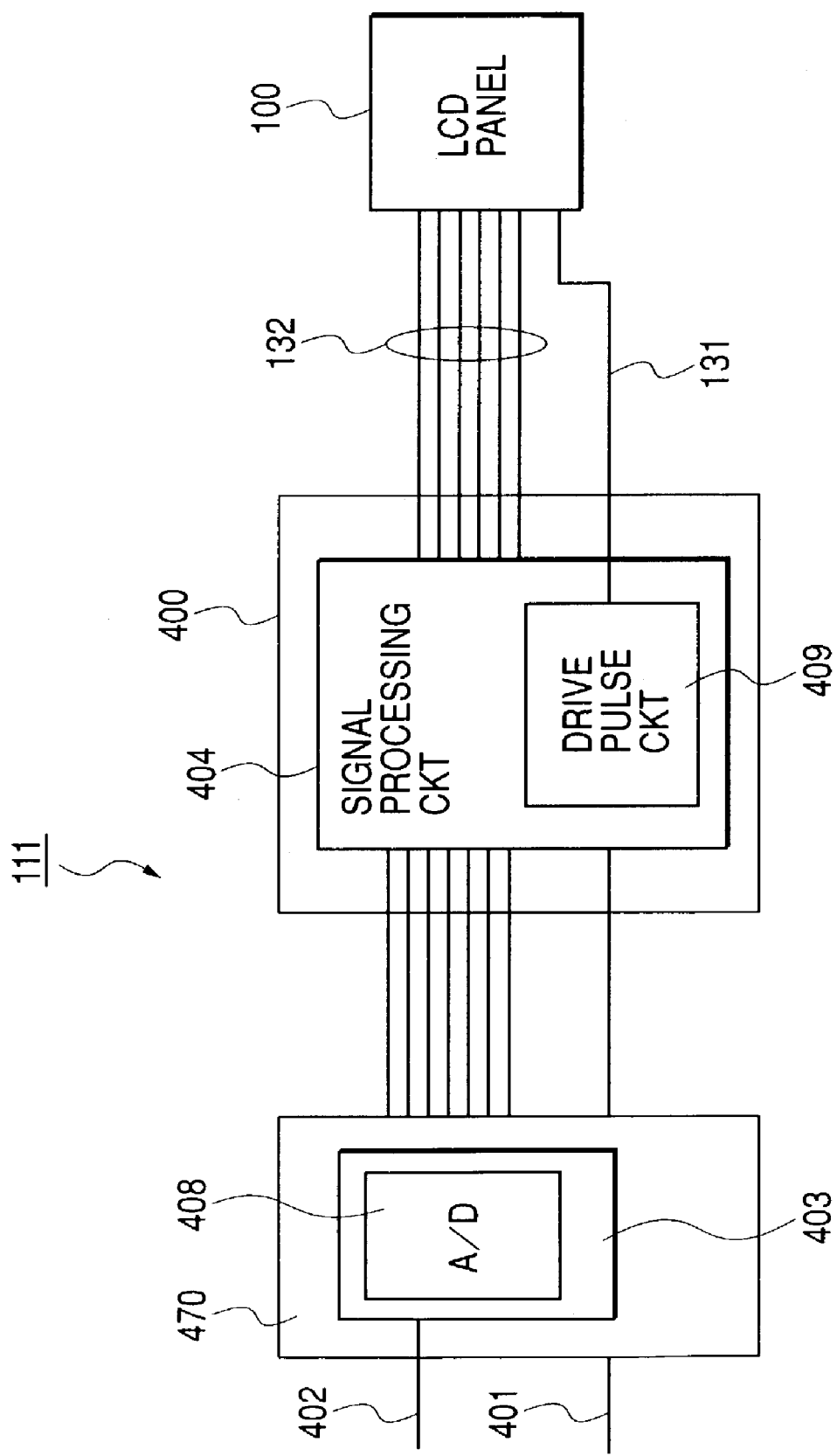

FIG. 15

| ADDRESS | CORRECTION DATA | | | | | | | | |
|---|---|---|---|---|---|---|---|---|---|
| 0 | $D_9$ | $D_8$ | $D_7$ | $D_6$ | $D_5$ | $D_4$ | $D_3$ | $D_2$ | $D_1$ | $D_0$ |
| 1 | $D_9$ | $D_8$ | $D_7$ | $D_6$ | $D_5$ | $D_4$ | $D_3$ | $D_2$ | $D_1$ | $D_0$ |
| 2 | $D_9$ | $D_8$ | $D_7$ | $D_6$ | $D_5$ | $D_4$ | $D_3$ | $D_2$ | $D_1$ | $D_0$ |
| 3 | $D_9$ | $D_8$ | $D_7$ | $D_6$ | $D_5$ | $D_4$ | $D_3$ | $D_2$ | $D_1$ | $D_0$ |
| 4 | $D_9$ | $D_8$ | $D_7$ | $D_6$ | $D_5$ | $D_4$ | $D_3$ | $D_2$ | $D_1$ | $D_0$ |
| 5 | $D_9$ | $D_8$ | $D_7$ | $D_6$ | $D_5$ | $D_4$ | $D_3$ | $D_2$ | $D_1$ | $D_0$ |
| | | | | | | | | | | |
| 251 | $D_9$ | $D_8$ | $D_7$ | $D_6$ | $D_5$ | $D_4$ | $D_3$ | $D_2$ | $D_1$ | $D_0$ |
| 252 | $D_9$ | $D_8$ | $D_7$ | $D_6$ | $D_5$ | $D_4$ | $D_3$ | $D_2$ | $D_1$ | $D_0$ |
| 253 | $D_9$ | $D_8$ | $D_7$ | $D_6$ | $D_5$ | $D_4$ | $D_3$ | $D_2$ | $D_1$ | $D_0$ |
| 254 | $D_9$ | $D_8$ | $D_7$ | $D_6$ | $D_5$ | $D_4$ | $D_3$ | $D_2$ | $D_1$ | $D_0$ |
| 255 | $D_9$ | $D_8$ | $D_7$ | $D_6$ | $D_5$ | $D_4$ | $D_3$ | $D_2$ | $D_1$ | $D_0$ |

MSB        LSB

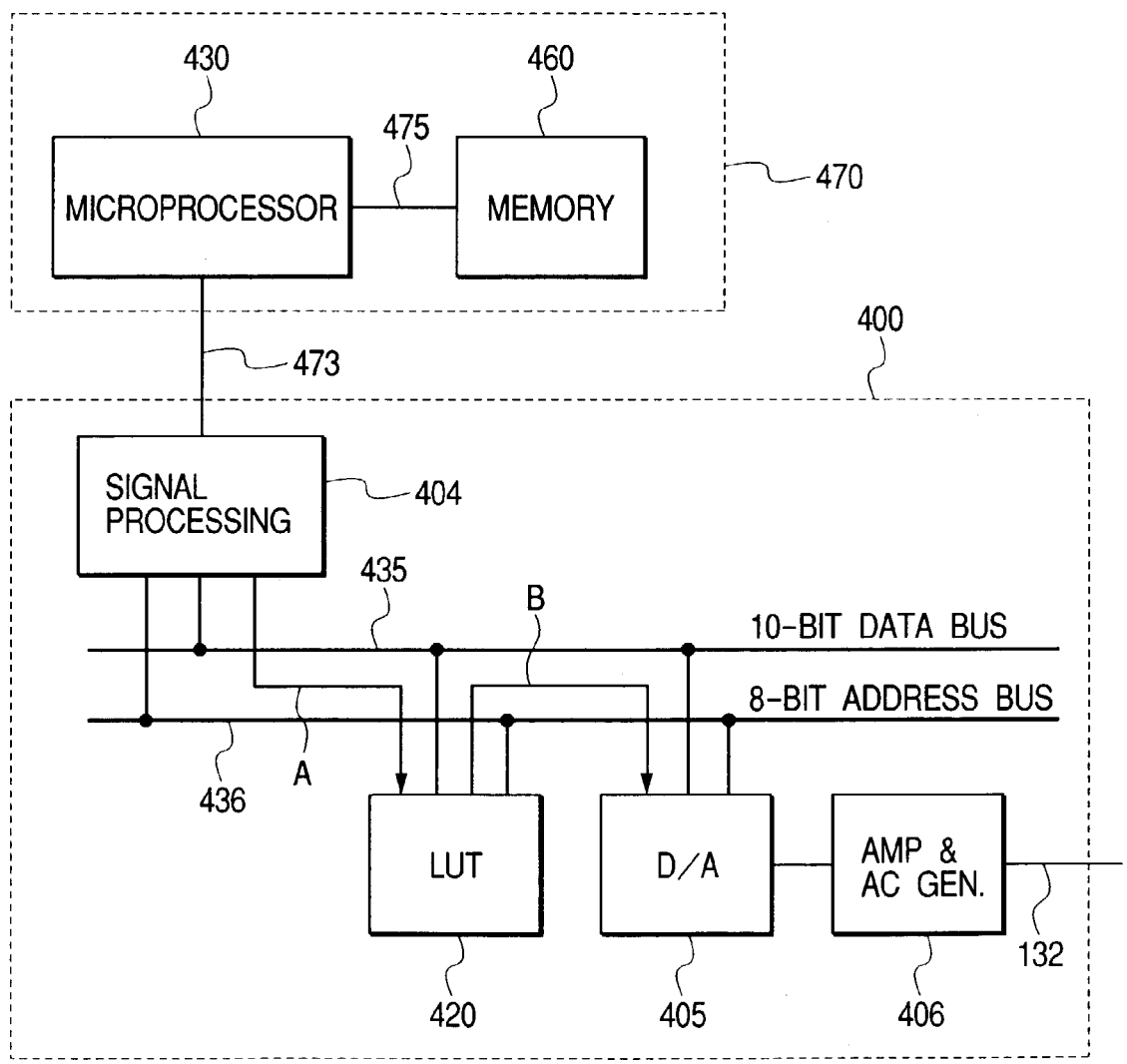

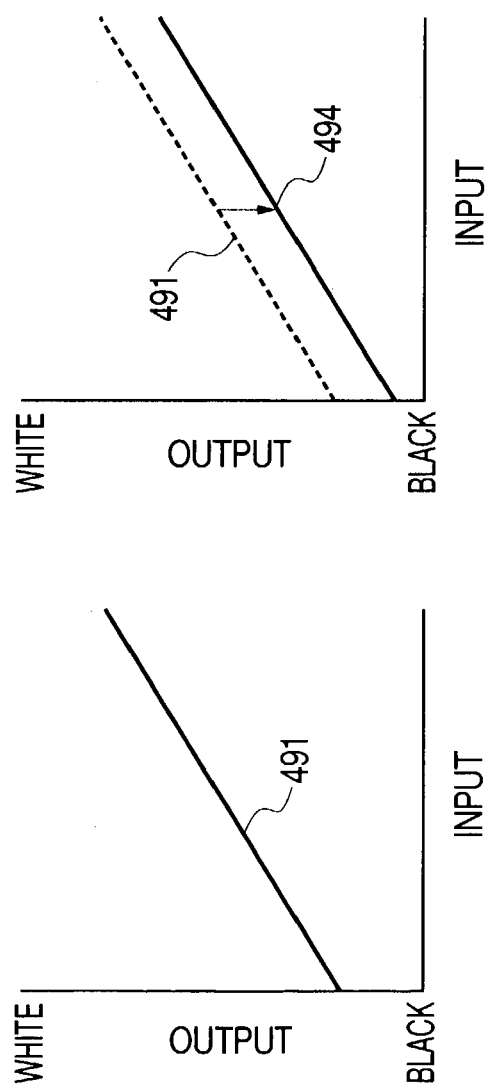

FIG. 34A
FIG. 34B
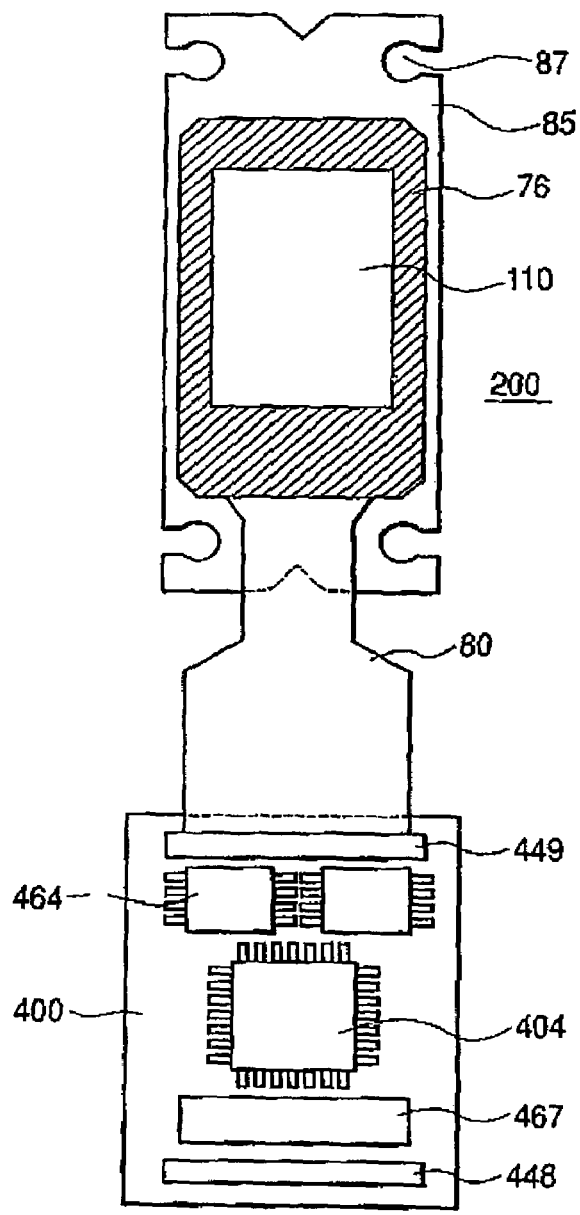
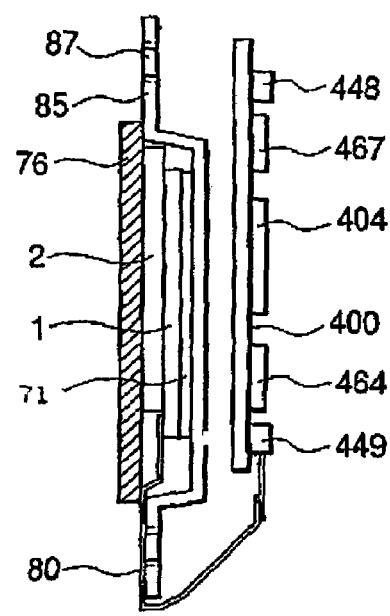

FIG. 35A
FIG. 35B
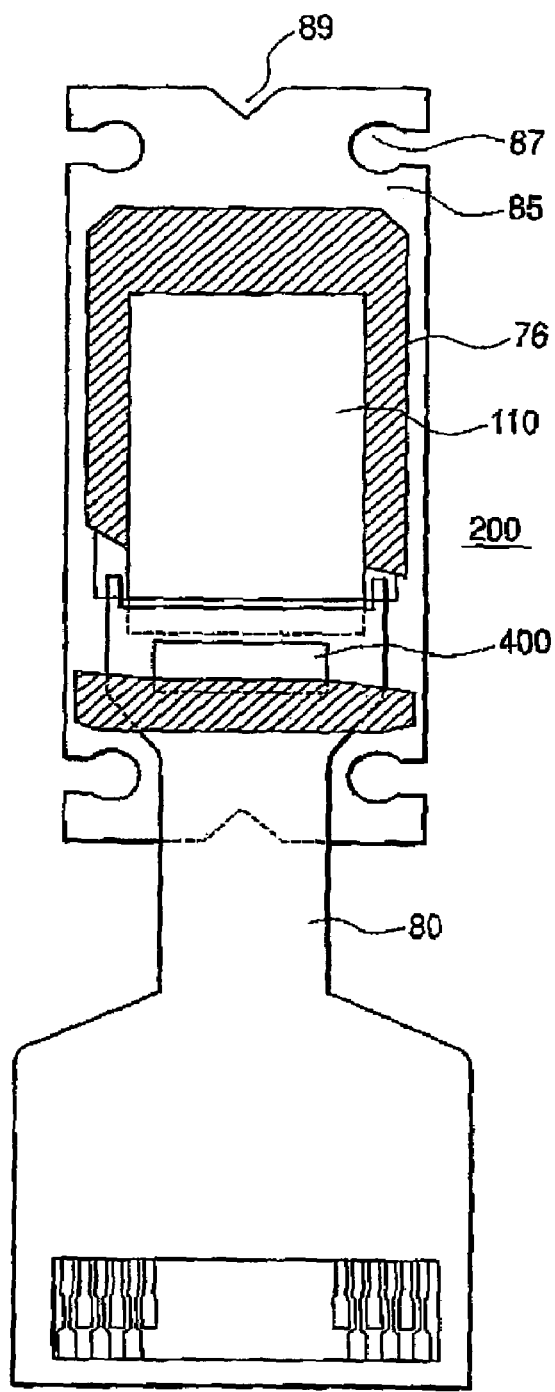
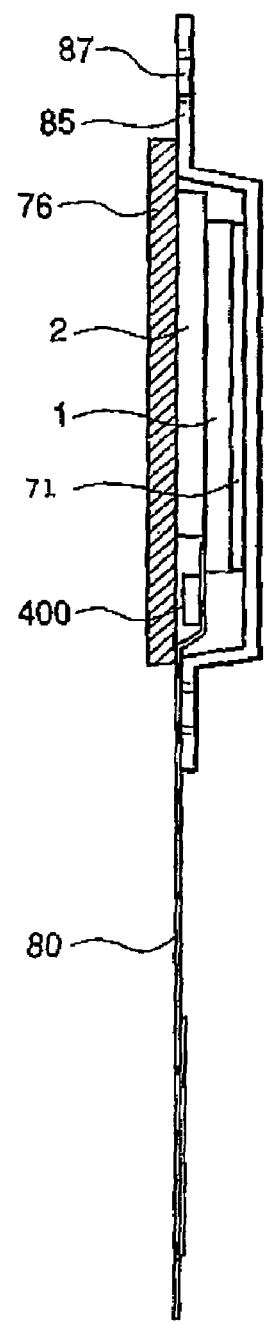

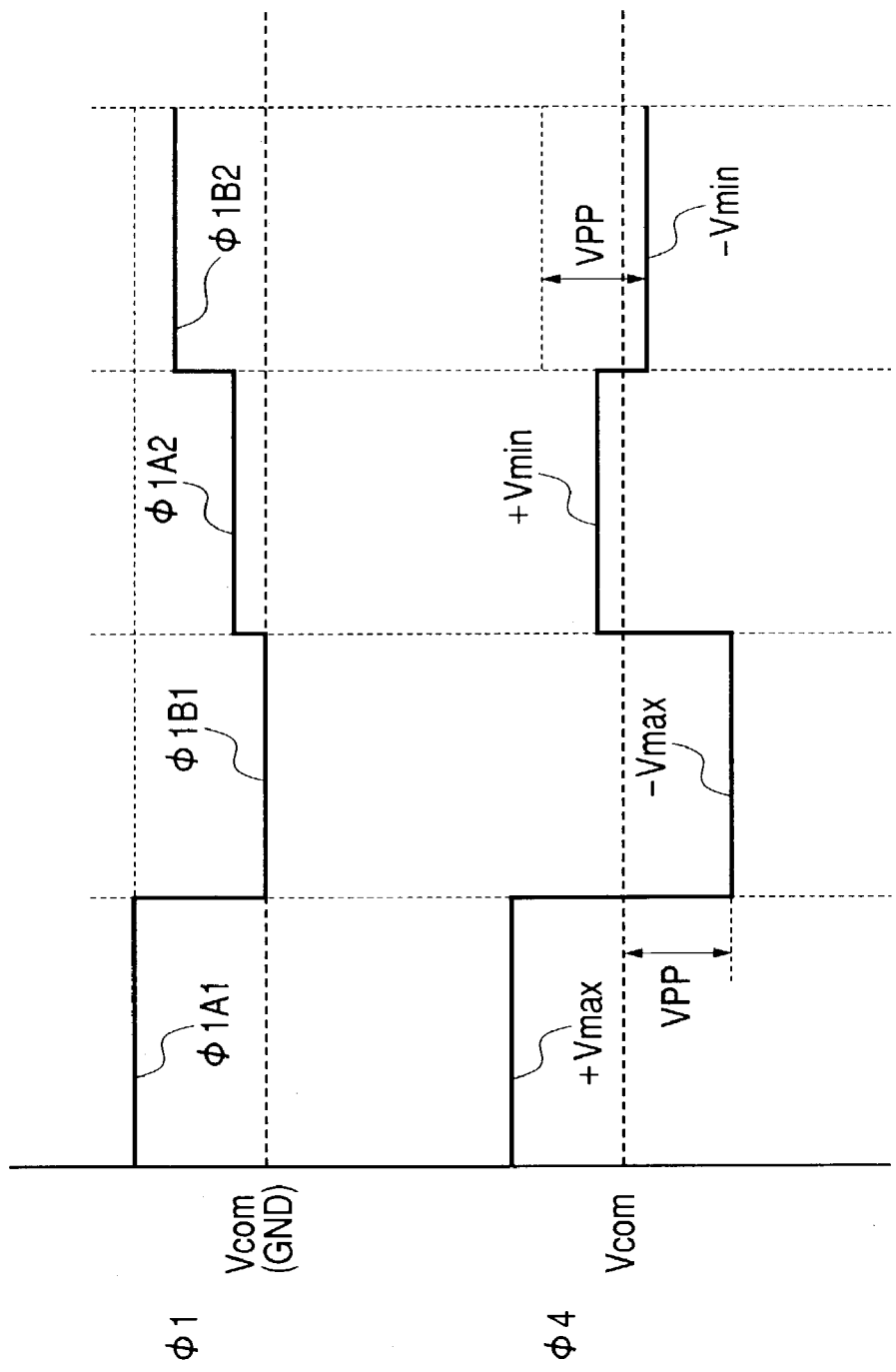

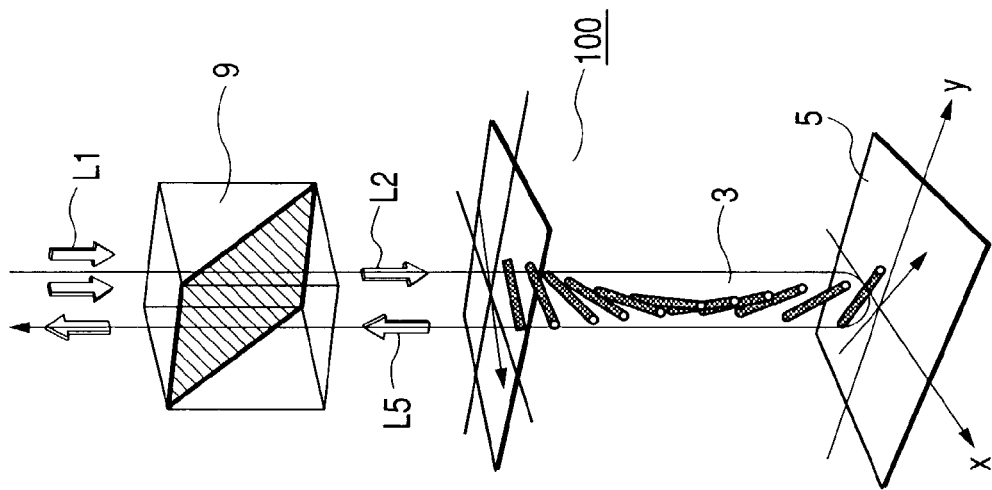
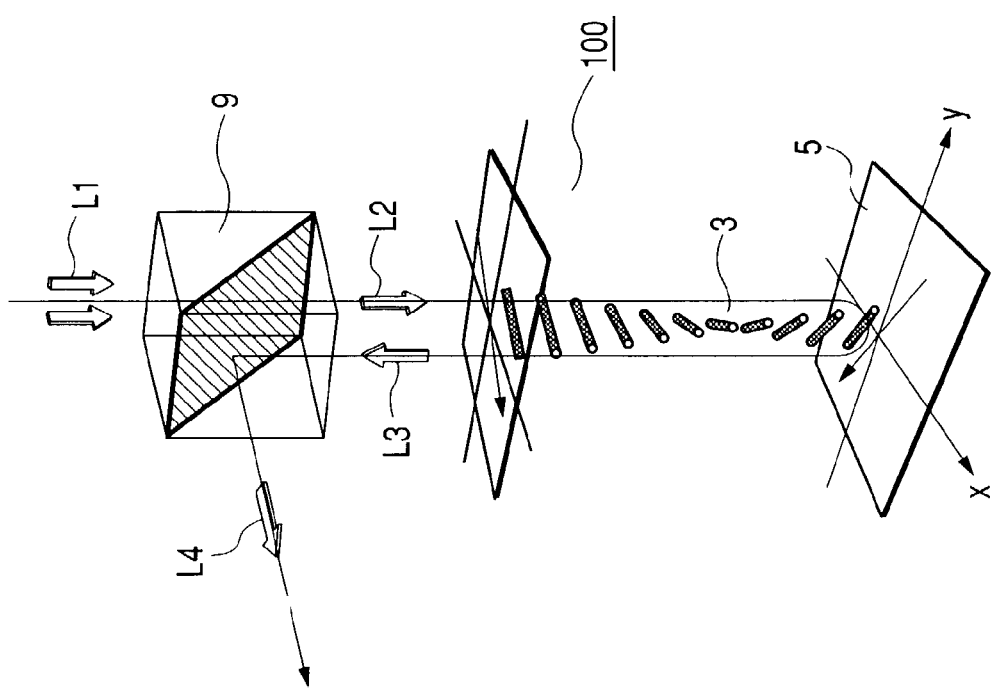

LIQUID CRYSTAL PROJECTOR

BACKGROUND OF THE INVENTION

The present invention relates to a display device, and more particularly to a technology that can be effectively applied to a liquid-crystal-panel drive circuit configuration in a liquid crystal display device incorporating plural display elements which receive higher frequency video signals.

In recent years, liquid crystal display devices have been rapidly increased in popularity of their use ranging from small display devices to display terminals such as office automation equipment. Basically, the liquid crystal display device is so configured to form a liquid crystal panel (also referred to as a liquid display element or a liquid crystal cell) which has a layer of liquid crystal composition (a liquid crystal layer) sandwiched between a pair of insulating substrates, at least one substrate of which is made of a transparent glass plate or a transparent plastic substrate.

The liquid crystal panel produces an image by selectively applying voltages to various pixel-forming electrodes, and thereby changing orientation of liquid crystal molecules of the liquid crystal composition in desired pixels. Among the liquid crystal panels, a type is known in which pixels are arranged in a matrix configuration to form a display section. Liquid crystal panels having the matrix configuration of pixels can be classified into two major types; a simple matrix type and an active matrix type. The simple matrix type forms pixels at intersections of two crossing strip electrodes which are respectively disposed on a pair of insulating substrates. On the other hand, the active matrix type has a pixel electrode and an active elements (for example, a thin-film transistor) for pixel selection in each pixel, and by selecting some of the active elements, it forms an image by pixel electrodes coupled to the selected active elements and a reference electrode facing the pixel electrodes.

An active matrix type liquid crystal display device employing an active element (for example, a thin film transistor) for each pixel and switching the active elements is widely used for a display device for notebook personal computers, etc. In general, the active matrix type liquid crystal display device adopts a so-called vertical electric field type which applies an electric field between two electrodes disposed on two substrates, respectively, to change the orientation of liquid crystal molecules in the liquid crystal layer. Also, a so-called horizontal electric field type (also referred to as an In-Plane Switching (IPS) type) has been put in practical use which applies electric fields in the liquid crystal layer such that the direction of the electric fields is approximately parallel with the substrate surface.

On the other hand, a liquid crystal projector has been in practical use which incorporates a liquid crystal display device. The liquid crystal projector irradiates illuminating light from a light source onto a liquid crystal panel and projects an image of the liquid crystal panel onto a screen. Types of liquid crystal panels employed for a liquid crystal projector include the reflective and transmissive types, and when the reflective type is used for the liquid crystal panel, the approximately entire area of a pixel can be used as a usable reflective surface, and therefore the reflective type is more advantageous than the transmissive type for the realization of small-sized, high-definition and high-luminance liquid crystal panels. In addition, among the active matrix type liquid crystal display devices, the driver-circuit-integrated liquid crystal display device is known in which a driver circuit for driving pixel electrodes is disposed on a substrate having the pixel electrodes formed thereon.

Furthermore, among the driver-circuit-integrated liquid crystal display devices, a reflective type liquid crystal display device (hereinafter sometimes referred to as Liquid Crystal on Silicon (LCOS)) is known in which pixel electrodes and a driver circuit are formed on a semiconductor substrate, but not on an insulating substrate.

In addition, in a method of driving the driver-circuit-integrated liquid crystal display device, a drive method is known in which external video signals are supplied in analog form to the liquid crystal display device, and the video signals are sampled by the drive circuit to be supplied to the liquid crystal panel.

In this case, in general, a method is employed in which video signals associated with three color primaries red (R), green (G), and blue (B), respectively, are generated on a single circuit substrate since they are processed by a common LSI, and then are distributed to respective liquid crystal display devices.

SUMMARY OF THE INVENTION

In the reflective type of liquid crystal display devices, a frame frequency of video signals to be supplied to the liquid crystal panel is increased to reduce flicker. More specifically, when the frame frequency of original video signals is 60 Hz, the original video signals are provisionally stored in a frame memory, video signals of positive-polarity and negative-polarity with respect to a voltage on a counter electrode are generated to avoid the DC voltage application on the liquid crystal layer, and also the frame frequency of the signals is converted to 120 Hz, which is twice 60 Hz, before the signals are input to the liquid crystal panel. With such an arrangement, video signals symmetrical with respect to a voltage on a counter electrode can always be applied across the liquid crystal layer. However, it was found that the increased frame frequency caused problems with electromagnetic interference (EMI) and electromagnetic compatibility (EMC), and thus causing some restrictions on designing the circuit board. More specifically, since the liquid crystal panel is disposed to fit the shape of optical system of a projector comprising a plurality of liquid crystal panels, the length of signal wiring to the liquid crystal panels from the circuit for increasing the frame frequency becomes longer, thus causing noise or problems with EMI or EMC. Further, considering slight changes in the shape of optical system and easiness of assembling work, it is necessary to have a longer flexible cable (FPC) for connection with the liquid crystal panels. This revealed a problem that the higher-frequency signal deteriorates video signals due to the wiring loading effects. This also causes another problem that it is difficult to equalize lengths of signal lines to three liquid crystal display panels associated with three primary colors, respectively.

In order to equalize lengths of signal lines to plural liquid crystal display panels, respectively, a circuit for increasing a frame frequency and a liquid-crystal-panel drive control circuit for controlling the liquid crystal panel are disposed on a separate circuit board to be independent from other circuits, and the circuit board is provided for each liquid crystal panel, and connected to it with a flexible cable, thus supplying small-amplitude video signals of the differential-mode. With such an arrangement, it is possible to suppress the problems of noise, EMI or EMC since slow-signal lines can be used to connect the other circuits with the circuit for increasing a frame frequency.

In accordance with an embodiment of the present invention, there is provided a liquid crystal display device having a liquid crystal display panel and a display control device coupled to said liquid crystal display panel, said display control device comprising a first section for receiving an externally supplied video signal, and a second section succeeding said first section and coupled to said liquid crystal display panel, wherein said second section comprises a circuit for amplifying and converting said video signal into an ac signal supplied from said first section, and a drive pulse circuit for outputting drive pulses for driving said liquid crystal display panel, said first section and said second section are fabricated on first and second substrates separate from each other, respectively, said second section is disposed proximately to said liquid crystal display panel, and said first section and said second section are coupled via a flexible cable.

In accordance with another embodiment of the present invention, there is provided a liquid crystal display device comprising: a plurality of liquid crystal display panels for producing three primary color images, each of said plurality of liquid crystal display panels having first and second substrates, a liquid crystal layer sandwiched between said first and second substrates, and a plurality of pixels formed on said first substrate; a plurality of drive circuits each provided for a corresponding one of said plurality of liquid crystal display panels and supplying a video signal to each of said plurality of pixels; and a plurality of liquid crystal display panel drive control circuits provided for a corresponding one of said plurality of liquid crystal display panels, each of said plurality of liquid crystal display panel drive control circuits supplying control signals and said video signals to a corresponding one of said plurality of drive circuits, wherein each of said plurality of liquid crystal display panel drive control circuits corresponding to one of said plurality of liquid crystal display panels is controlled independently of another of said plurality of liquid crystal display panel drive control circuits corresponding to another of said plurality of liquid crystal display panels.

BRIEF DESCRIPTION OF THE DRAWINGS

In the accompanying drawings, in which like reference numerals designate similar components throughout the figures, and in which:

FIG. 2A is a block diagram showing a liquid-crystal-panel drive control circuit, outputting analog signals, of the liquid crystal display device according to the preferred embodiment of the present invention;

FIG. 2C is a schematic block diagram showing the liquid-crystal-panel drive control circuit, outputting digital signals, of the liquid crystal display device according to the preferred embodiment of the present invention;

FIG. 15 is a data configuration of a look-up table of the liquid crystal display device according to the preferred embodiment of the present invention;

FIG. 16 is a schematic circuit diagram showing paths for transferring data to the look-up table of the liquid crystal display device according to the preferred embodiment of the present invention;

FIGS. 24A, 24B and 24C are diagrams for describing a method of adjusting luminance by using the look-up table of the liquid crystal display device according to the preferred embodiment of the present invention;

FIGS. 34A and 34B are respectively a schematic plan view and a schematic section view showing the liquid crystal display device according to the preferred embodiment of the present invention;

FIGS. 35A and 35B are respectively a schematic plan view and a schematic section view showing the liquid crystal display device according to the preferred embodiment of the present invention;

FIGS. 49A and 49B are waveform diagrams describing positive-polarity and negative-polarity waveforms of the liquid crystal display device according to the preferred embodiment of the present invention;

FIGS. 51A and 51B are schematic diagrams describing operations of the liquid crystal display device according to the preferred embodiment of the present invention;

DETAILED DESCRIPTION OF THE PREFERRED EMBODIMENTS

Hereinafter, preferred embodiments of the present invention will be described in detail with reference to the drawings. It should be noted that, in all figures for describing the preferred embodiments of the present invention, components having the same are denoted by like numerals, and the duplicated descriptions thereof are omitted.

Figure 1:
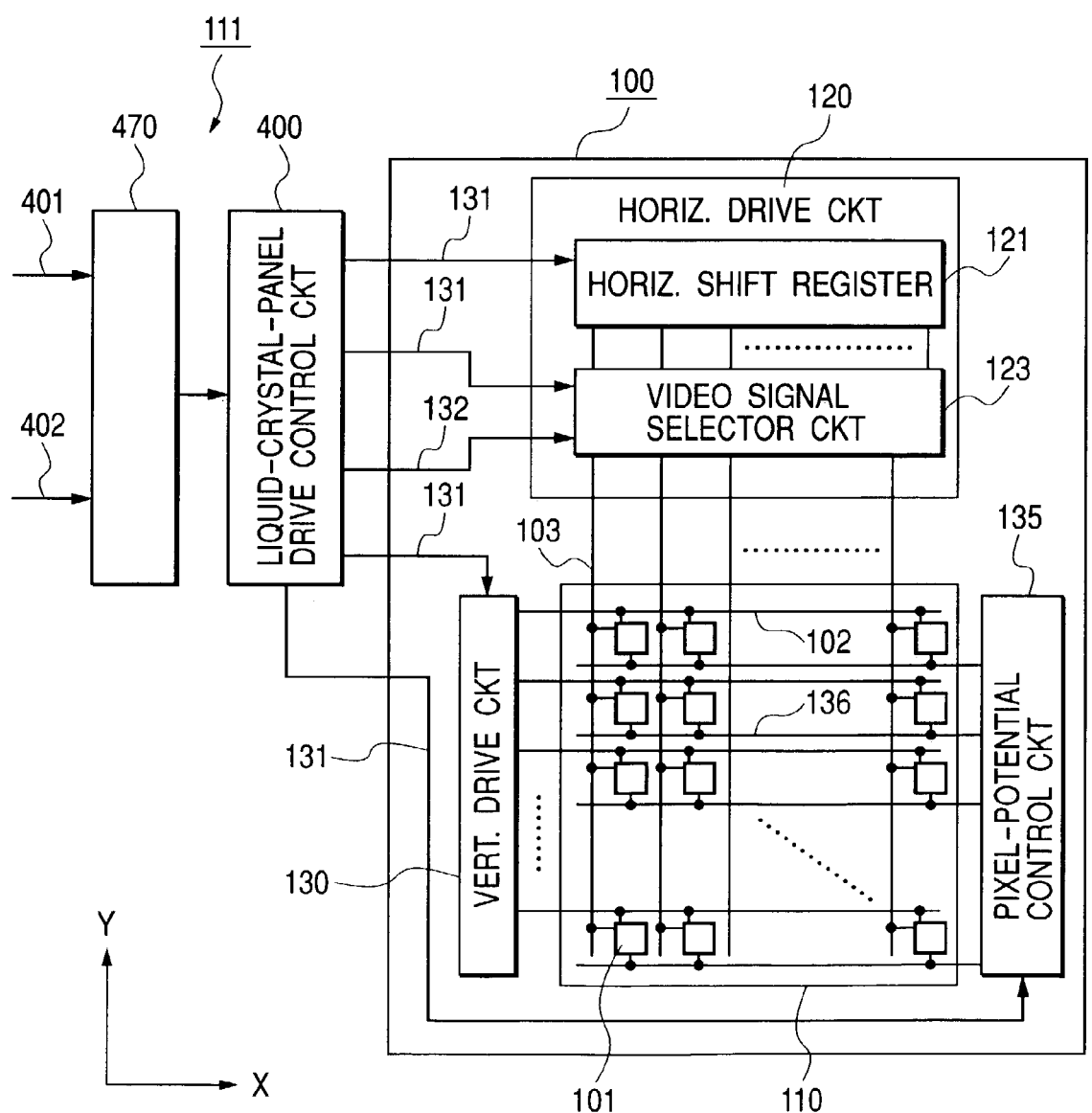
FIG. 1 is a block diagram showing a schematic configuration of a liquid crystal display device according to a preferred embodiment of the present invention.

FIG. 1 is a block diagram showing a schematic configuration of a crystal display device according to a preferred embodiment of the present invention.

The crystal display device according to the preferred embodiment of the present invention includes a liquid crystal panel (liquid crystal display element) 100 and a display control device 111. The display control device 111 is divided into a liquid crystal panel control circuit 400 and a preprocessor circuit 470.

The liquid crystal panel 100 includes a display section 110 where a pixel section 101 is disposed in a matrix arrangement, a horizontal drive circuit (video signal line drive circuit) 120, a vertical drive circuit (scanning-line drive circuit) 130, and a pixel-potential control circuit 135. In addition, the display section 110, the horizontal drive circuit 120, the vertical drive circuit 130 and the pixel-potential control circuit 135 are disposed on one substrate. A pixel electrode, a counter electrode and a liquid layer sandwiched between the pixel electrode and the counter electrode (not shown) are provided in the pixel section 101. Displaying is achieved by applying a voltage between the pixel electrode and the counter electrode to vary the orientation, etc. of liquid crystal molecules, and thereby changing properties of the liquid crystal layer relating to light. It should be noted, however, that the present invention can be effectively applied to a liquid crystal display device having the pixel-potential control circuit 135, but are not limited thereto.

The display control device 111 is connected to an externally-supplied-control-signal line 401 from external equipment (a personal computer, for example). The display control device 111 outputs signals to control the horizontal drive circuit 120, the vertical drive circuit 130, and the pixel-potential control circuit 135, by using control signals transmitted from an external source via the externally-supplied-control-signal line 401.

Further, the display control device 111 is connected to a display signal line 402 to receive display signals from external equipment. The display signals are transmitted in a specific order to form a video image to be displayed on the liquid crystal panel 100. For example, data corresponding to pixels arranged in one scanning line starting with a pixel located at the upper left of the liquid crystal panel 100 are transmitted in a sequential order, and then data corresponding to successive scanning lines from the top to the bottom of the liquid crystal panel are transmitted successively from external equipment. The display control device 111 generates video signals based on the display signals, and supplies the video signals to the horizontal drive circuit 120 in synchronism with video displaying of the liquid crystal display panel 100.

Reference numeral 131 denote control signal lines for outputting signals from the liquid crystal panel drive control circuit 400, and reference numeral 132 is a video signal transfer line. In FIG. 1, the video signal transfer line 132 is represented by a single line, but actually, video signals are phase-expanded into a plurality of phases, as described later by referring to FIGS. 2A and 2B, and a plurality of video signal transfer lines 132 equal in number to the number of the plural phases are provided. In a case where video signals are in the form of digital data, the required number of video signal transfer lines 132 for each of the plural phases is equal to the number required for transferring digital data.

The video signal transfer line 132 is used to output signals from the liquid crystal panel drive control circuit 400, and is coupled to the horizontal drive circuit 120 disposed around the display section 110. A plurality of video signal lines (also referred to as drain signal lines or vertical signal lines) 103 extend in a vertical direction (in a Y direction in FIG. 1) from the horizontal drive circuit 120, and are arranged in a horizontal direction (in an X direction). The video signal lines 103 transfer the video signals to the pixel section 101.

The vertical drive circuit 130 is disposed around the display section 110. A plurality of scanning signal lines (also referred to as gate signal lines or horizontal signal lines) 102 extend in the horizontal direction (in the X direction) From the vertical drive circuit 130, and are arranged in the vertical direction (in the Y direction). The scanning signal lines 102 transfer scanning signals to switch on or off the switching elements provided on the pixel section 101.

Furthermore, the pixel-potential control circuit 135 is disposed around the display section 110. A plurality of pixel-potential control lines 136 extend in the horizontal direction (in the X direction) from the pixel-potential control circuit 135, and are arranged in the vertical direction (in the Y direction). The pixel-potential control lines 136 transfer signals to control the potential of the pixel electrodes.

Power-supply lines for the respective circuits are omitted in FIG. 1, but it should be understood that necessary voltages are supplied to the respective circuits such as the liquid crystal panel 100 from the display control device 111.

The horizontal drive circuit 120 includes a horizontal shift register 121 and a video signal selector circuit 123. One of the control signal lines 131 from the display control device 111 is coupled to the horizontal shift register 121, and is supplied with control signals. Another of the control signal lines 131 and the video signal transfer line 132 from the display control device 111 are coupled to the video signal selector circuit 123, and are supplied with control signals and video signals, respectively.

In a case where the video signals supplied by the display control device 111 are in analog form, the horizontal drive circuit 120 samples voltages to be output among the video signals in timing with the control signal, and outputs the sampled voltages to the video signal line 103. In a case where the video signals is in digital form, the horizontal drive circuit 120 selects voltages represented by the digital signals and outputs the selected voltages to the video signal line 103.

The display control device 111 outputs a start pulse to the vertical drive circuit 130 via one of the control signal lines 131 when it receives the first display timing signal after receiving a control signal (for example, a vertical sync signal) indicating the start of displaying from an external equipment via the externally-supplied-control-signal line 401. Then, the display control device 111 outputs shift clocks successively to the vertical drive circuit 130 based on horizontal sync signals so that the scanning signal lines 102 can be selected successively with one horizontal scanning period (hereinafter referred to as 1 h). The vertical drive circuit 130 selects the scanning signal lines 102 successively in synchronism with the shift clock, and outputs a scanning signal to a selected one of the scanning signal lines 102. More specifically, the vertical drive circuit 130 outputs a signal for selecting one of the scanning signal lines 102 during 1 h successively in the order starting from the top scanning line in FIG. 1.

The display control device 111 judges a time of receipt of the display timing signal as a time of a start of displaying in the horizontal direction, and outputs video signals to the horizontal drive circuit 120. While the video signals are output sequentially from the display control device 111, the horizontal shift register 121 outputs timing signals in synchronism with the shift clocks transmitted from the display control device 111. The timing signals indicates a timing when the video signal selector circuit 123 takes in a video signal to be output to a corresponding one of the video signal lines 103.

In a case where video signals are in analog form, the video signal selector circuit 123 has sample-and-hold circuits, takes in a video signal for each of the video signal lines 103 and outputs the video signal to it. The display control device 111 outputs a video signal to be taken into a corresponding one of the sample-and-hold circuits in synchronism with a timing signal supplied to the corresponding one of the sample-and-hold circuits so that the video signal selector circuit 123 takes in a desired video signal. The video signal selector circuit 123 takes in a specified voltage (a specified gray scale voltage) from the video signal (analog signals) in synchronism with the timing signal, and outputs the taken-in gray scale voltage to the corresponding one of the video signal lines 103 as a video signal. The gray scale voltage supplied to the video signal line 103 is written into a pixel electrode of the pixel section 101 in synchronism with outputting of the scanning signal from the vertical drive circuit 130.

In a case where the video signals are in digital form, the video signal selector circuit 123 is provided with a circuit (a latch circuit) for taking in and storing a video signal (digital data) for each of the video signal lines 103, and the latch circuit stores the video signal in synchronism with the timing signal. The video signal selector circuit 123 is supplied with plural voltages (gray scale voltages) corresponding to plural gray scale levels to be displayed, selects one of the plural gray voltages based upon the stored video signal (digital data), and supplies the selected gray scale voltage to a corresponding one of the video signal lines 103 as a video signal.

The pixel-potential control circuit 135 controls a video signal voltage which has been written into a pixel electrode based upon a control signal from the display control device 111. A gray scale voltage written into the pixel electrode from the video signal line 103 has a potential difference from a reference voltage on the counter electrode. The pixel-potential control circuit 135 varies the potential difference between the pixel electrode and the counter electrode by supplying a control signal to the pixel section 101. The pixel-potential control circuit 135 will be described in detail later.

Figure 2B:
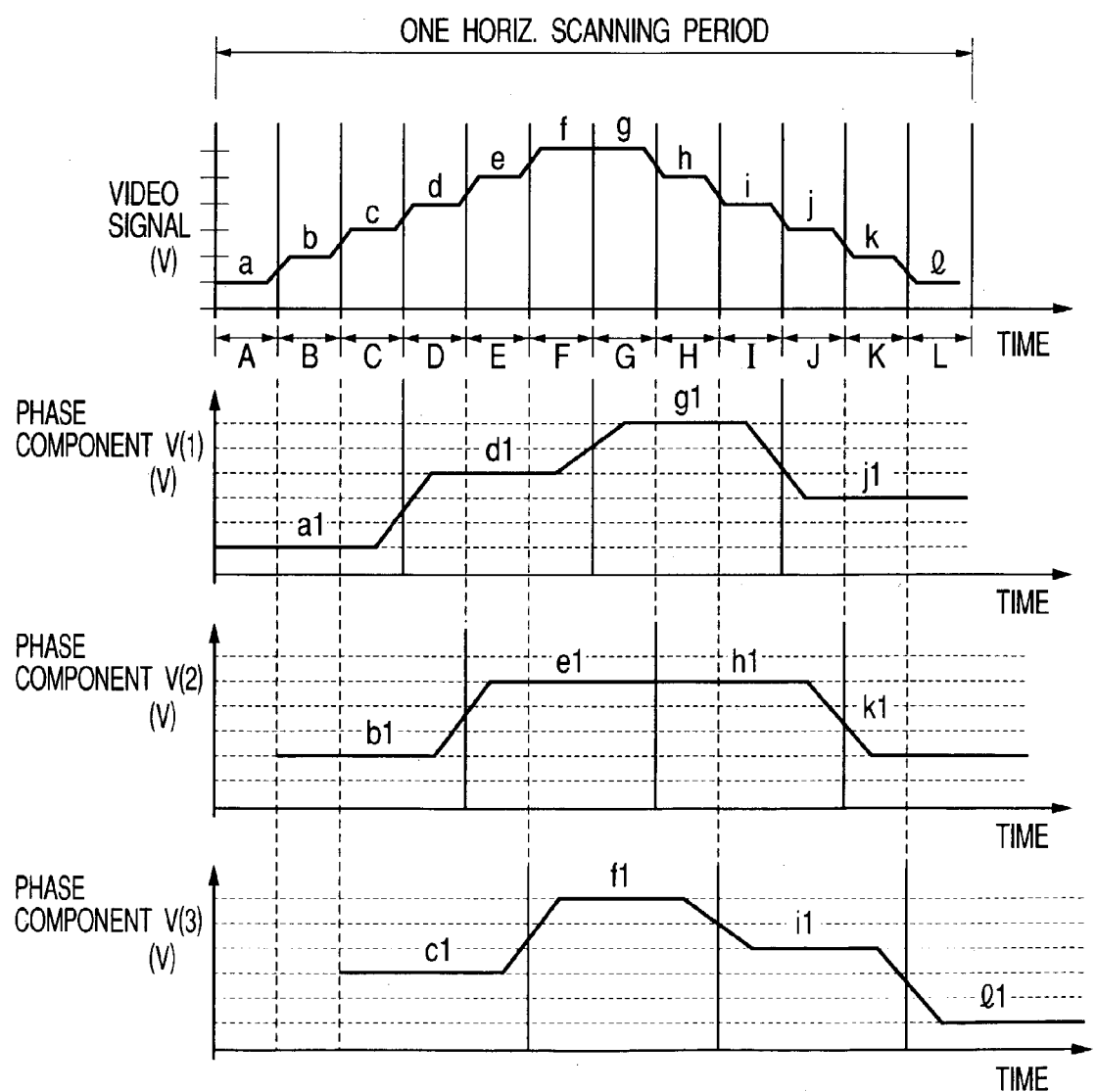
FIG. 2B illustrates timing charts for explaining the phase expansion of a video signal.

Next, the liquid crystal panel drive control circuit 400 will be described by referring to FIGS. 2A, 2B and 2C. FIG. 2A is a schematic block diagram showing a liquid crystal panel drive control circuit 400 which outputs analog signals as video signals. FIG. 2C is a schematic block diagram showing a liquid crystal panel drive control circuit 400 which outputs digital signals as video signals.

As described above, the display control device 111 is supplied with display signals via the display signal line 402 and control signals via the externally-supplied-control-signal line 401. Reference numeral 470 denotes a preprocessor circuit, and reference numeral 400 is a liquid-crystal-panel-drive control circuit. The liquid-crystal-panel-drive control circuit 400 is a circuit system which directly drives the liquid crystal panel 100, as by supplying pulse signals for driving the liquid crystal panel, and the preprocessor circuit 470 is a circuit system which does not directly drive the liquid crystal panel 100, but converts external signals into necessary signals for the liquid-crystal-panel-drive control circuit 400.

Reference numeral 403 denotes an external-signal input circuit which receives signals from external equipment. The external-signal input circuit 403 performs conversion of external data transmitted in various formats. FIGS. 2A and 2C each illustrate an A/D converter 408 as a circuit for converting external data. For example, in a case where a display signal from external equipment is in analog form, the A/D converter 408 converts the display signal into a digital signal. External data are formed in various established formats, and an appropriate converter adapted for a desired format is provided in the external-signal input circuit 403.

The preprocessor circuit 470 and the liquid-crystal-panel-drive control circuit 400 perform signal processings such as correction of signals, and the liquid-crystal-panel-drive control circuit 400 provides signals which meets a specification of the liquid crystal panel 100. Reference numeral 404 denotes a signal processing circuit which performs signal processing such as conversion of data rate of video signals and gamma correction of video signals. Further, the signal processing circuit 404 includes a drive pulse circuit 409 for generating and outputting various drive pulse (pulses to be supplied to the control signal line 131) required for driving the liquid crystal panel 100 in conformity with a formats of the liquid crystal panel 100.

Hereinafter, data rate conversion of a video signal will be described briefly. Signals required for displaying are transmitted per picture from external equipment to the liquid-crystal-panel-drive control circuit 400. A time for transferring signals required for displaying one picture is referred to as one frame period, and the reciprocal of the frame period is referred to as a frame frequency. In particular, in a case where signals are transmitted from external equipment to the liquid crystal device, its frame period shall be called an externally supplied frame period, and in a case where the display control device 111 transfers signals to the liquid crystal panel 100, its frame period shall be called a liquid-crystal-drive frame period.

In the signal processing circuit 404, the liquid-crystal-drive frame frequency is increased to several times the externally supplied frame frequency, which is called a data rate conversion. The frame-frequency multiplication is intended for prevention of flicker.

The liquid-crystal-panel-drive control circuit 400 shown in FIG. 2A is provided with a circuit for analog signals. Reference numeral 464 denotes an analog driver circuit for performing of analog processing necessary after conversion of digital signals into analog signals. Reference number 405 is a D/A converter for converting the digital signals which have been subjected to signal processing in the signal processing circuit 404, into analog signals. Reference numeral 406 is an amplifier-ac-generator circuit for amplifying the analog signal outputs from the D/A converter 405, and converting them into ac signals.

Generally, in liquid crystal display devices, ac-driving is employed which periodically inverts the polarity of voltages applied across the liquid crystal layer. The purpose of the ac-driving is to prevent deterioration of the liquid crystal caused by dc voltages applied across the liquid crystal layer. As explained above, the pixel section 101 is provided with the pixel electrode and the counter electrode. One method of ac driving applies a fixed voltage on the counter electrode, and applies on the pixel electrode, gray scale voltages alternately positive and negative with respect to the counter electrode.

It should be noted that, in this specification, positive-polarity and negative-polarity pixel voltages mean pixel voltages positive and negative with respect to a voltage on a counter electrode, respectively.

Reflective type liquid crystal display devices (LCOS) having pixel electrodes and a drive circuit formed on its semiconductor substrate perform the ac driving with a frame period (which is called a frame-period inversion driving). The reason that the reflective type liquid crystal display devices (LCOS) do not employ a line-period inversion driving or a dot inversion driving is that they do not employ a black matrix, and therefore they can not block light leakage caused by unnecessary transverse electric fields which occurs in the case of the line-period or dot inversion driving. However, flicker will occur in the display screen (area flicker) with the frame period in the case of the frame-period inversion driving. Therefore, the reflective type liquid crystal display device (LCOS) reduces the area flicker by performing the above-explained data rate conversion, and thereby making the frame period shorter than the response time of the human eye.

A sample-and-hold circuit 407 is provided at a stage following the amplifier-ac-generator circuit 406. The sample-and-hold circuit 407 takes in video signals from the amplifier-ac-generator circuit 406 at specified intervals of time, and outputs the signals to the video signal transfer lines 132.

Here a so-called phase expansion of a video signal will be explained briefly. We assume for simplicity that only 12 pixels are arranged in one horizontal scanning line. By way of example, consider a case in which a video signal corresponding to one horizontal scanning line is divided into three groups (phases) of signals, and each of the divided video signals of the three groups (phases) is expanded along the time axis during the one horizontal scanning period. The sample-and-hold circuit 407 is supplied with a video signal VIDEO SIGNAL illustrated in FIG. 2B, and outputs three phase components V(1), V(2), and V(3) as illustrated in FIG. 2B, to three separate video signal transfer lines 132, respectively. The phase component V(1) is composed of signal portions (a1), (d1), (g1) and (j1) which are derived from signal portions (a), (d), (g) and (j) of the video signal VIDEO SIGNAL corresponding to time intervals (A), (D), (G) and (J), respectively, and which are expanded along the time axis. The phase component V(2) is composed of signal portions (b1), (e1), (h1) and (k1) which are derived from signal portions (b), (e), (h) and (k) of the video signal VIDEO SIGNAL corresponding to time intervals (B), (E), (H) and (K), respectively, and which are expanded along the time axis. The phase component V(3) is composed of signal portions (c1), (f1), (i1) and (l1) which are derived from signal portions (c), (f), (i) and (l) of the video signal VIDEO SIGNAL corresponding to time intervals (C), (F), (I) and (L), respectively, and which are expanded along the time axis. The signal portions (a1), (b1), (c1), (d1), (e1), (f1), (g1), (h1), (i1), (j1), (k1) and (l1) are expanded along the time axis by a factor of 3 compared with the original signal portions (a), (b), (c), (d), (e), (f), (g), (h), (i), (j), (k) and (l) of the video signal VIDEO SIGNAL, and consequently, the video signal selector circuit 123 incorporated in the liquid crystal display panel 100 is provided with longer time for taking in the video signal.

In this specification, the above signal processing will hereinafter be referred to as a phase-expansion of a video signal into three phases. Similarly, if a video signal corresponding to one horizontal scanning line is divided into n groups (phases) of signals, and each of the divided video signals of the n groups (phases) is expanded along the time axis during the one horizontal scanning period, this signal processing will be referred to as a phase-expansion of a video signal into n phases. For the purpose of circuit configuration and operation, U.S. Pat. No. 5,406,304 issued to Shirayama on Apr. 11, 1995, and U.S. Pat. No. 5,973,661 issued to Kobayashi et al. on Oct. 26, 1999 are hereby incorporated by reference.

As explained above, the video signal transfer lines 132 are plural in number, and the sample-and-hold circuit 407 outputs the taken-in voltages to the video signal transfer lines 132 successively. A video signal is phase-expanded into a plurality of phases and then the phase-expanded signals are output to the video signal transfer lines 132.

Figure 3:
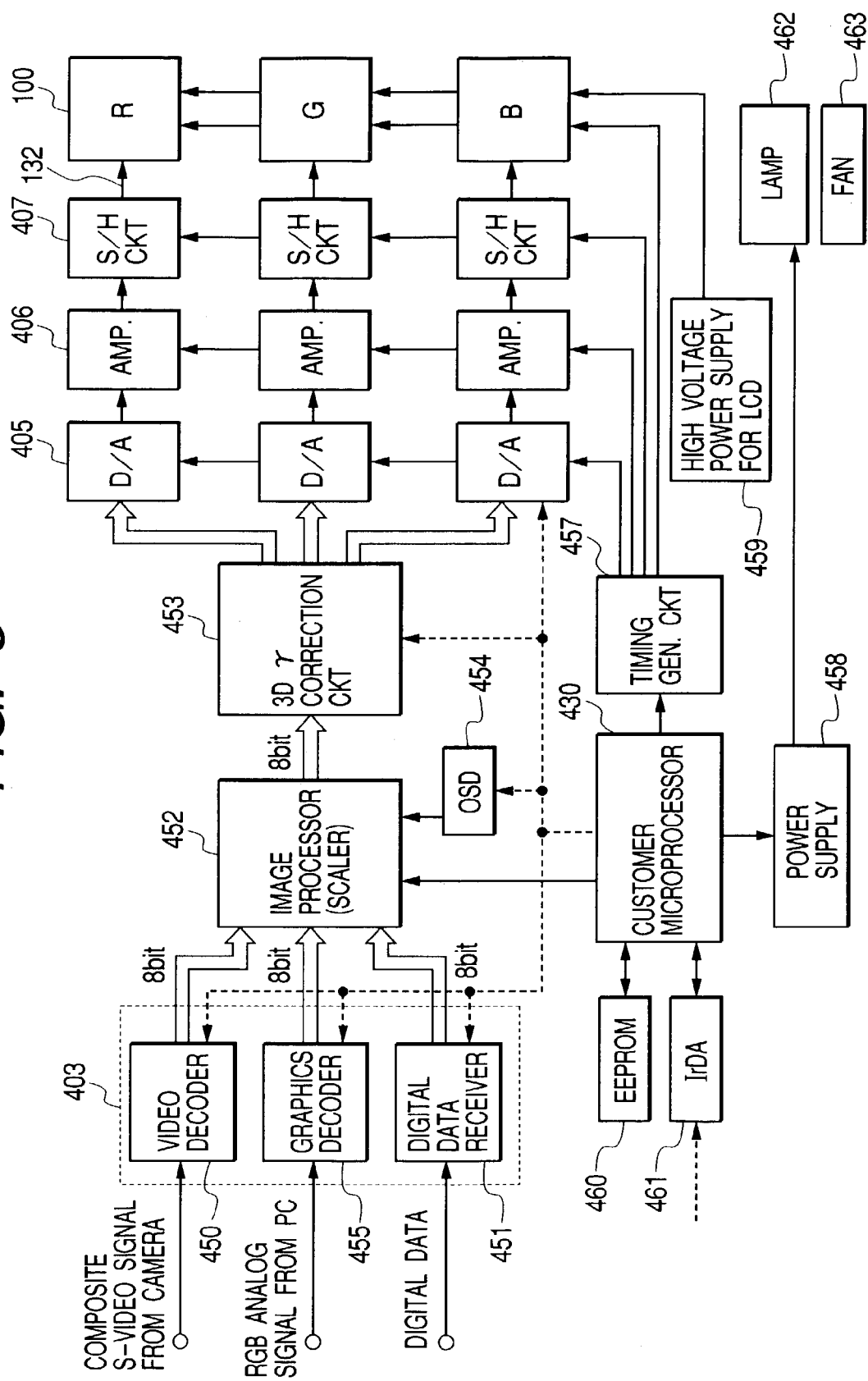
FIG. 3 is a circuit block diagram of a projector using the liquid crystal display device according to the preferred embodiment of the present invention.

A circuit configuration of a projector will be described by referring to FIG. 3. FIG. 3 illustrates a relationship among circuits without considering a geometrical layout of such circuits.

FIG. 3 illustrates a configuration of a three-panel type projector. Video signals are supplied in several formats from the outside of the projector, and various types of take-in circuits each adapted for one of those formats are provided in the external-signal input circuit 403. Reference numeral 450 denotes a video signal decoder for separating an analog composite signal or a color-difference signal in the TV signal formats such as NTSC, PAL and SECAM into a color signal and a luminance signal, and then converts them into digital signals. Reference numeral 451 is an interface which receives digital signals in the form such as the DVI (Digital Visual Interface), the TMDS (Transition Minimized Differential Signaling), the LVDS (Low Voltage Differential Signaling) and the IEEE 1394. Reference numeral 455 is an analog signal input circuit for red, green and blue signals which receives analog signals for red, green and blue, respectively, from a personal computer or the like and converts them into digital signals.

Reference numeral 452 denotes a scaler (a resolution converter circuit). In order to deal with signals in a different input format, the signals to be supplied to a liquid crystal display element must be converted into signals in a format which is acceptable to the liquid crystal display element. In general, a scaler, i.e., a resolution converter circuit is employed which calculates and generates a desired output format (the numbers of pixels in horizontal and vertical directions, respectively) from an input format (the numbers of pixels in horizontal and vertical directions) by digital processing.

Reference numeral 453 denotes a color-nonuniformity correction circuit. Generally, in a display element using liquid crystal, nonuniformity in luminance sometimes occurs in its display area due to variations in thickness of its liquid crystal layer, or stress applied to the optical system. Such nonuniformity can be corrected through computations by a certain circuit. More specifically, a correction value corresponding to each of the plane coordinates of a display is calculated based on information about nonuniformity obtained in advance, and then image processing is performed to eliminate nonuniformity in the displayed image.

Reference numeral 454 denotes an OSD (On Screen Display) controller for superimposing desired letters or characters on a displayed image. Reference numeral 430 is a microprocessor which controls the entire circuit. Reference numeral 457 is a timing signal generator for generating drive timing signals for the liquid crystal display elements, the D/A converters 405, the amplifier-ac-generator circuits 406, and the sample-and-hold circuits 407. Reference numeral 458 is a power supply circuit which supplies electric power to the respective circuits. The microprocessor 430 performs the on-or-off control of supply voltages supplied to the liquid crystal elements and the respective circuits.

A power supply 459 generates a voltage which determines amplitudes of the video signals used, in particular, by the liquid crystal elements, the D/A converters 405 and the amplifier-ac-generator circuits 406. Reference numeral 460 is a non-volatile electrically erasable programmable read-only memory (EPROM) which stores operational conditions of each of the circuits. The microprocessor 430 reads out the operational conditions and sets them in each of the circuits when power is turned on. Reference numeral 461 is an infrared data communication interface, which is used in general for communication with a remote controller near at hand for controlling operation. Reference numeral 462 is a lamp for an optical system. Reference numeral 463 is a fan for air-cooling the lamp 462 and the circuit.

Figure 4:
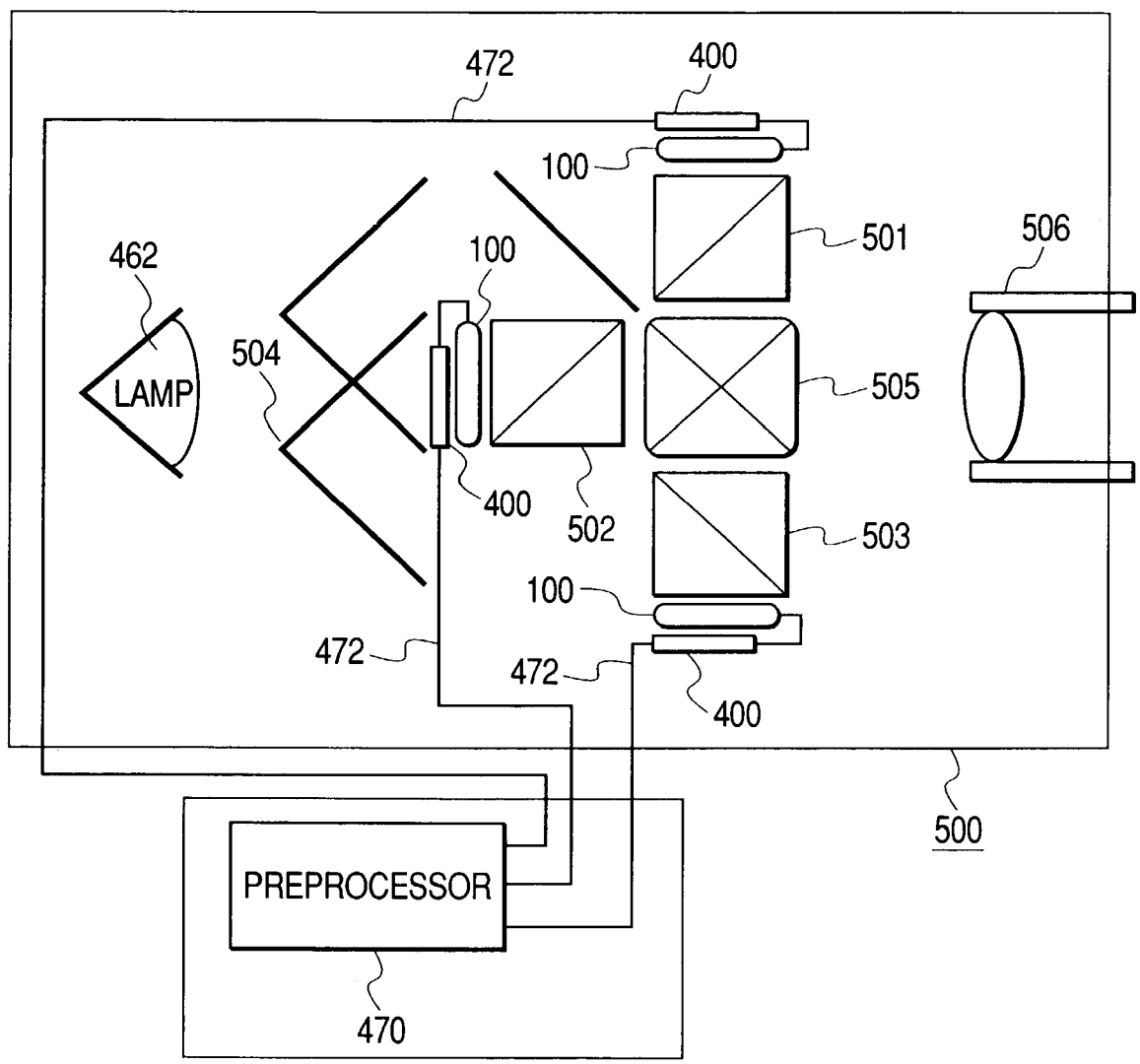
FIG. 4 is a diagram showing an example of an optical system used for the projector using the liquid crystal display device according to the preferred embodiment of the present invention.

FIG. 4 is a schematic block diagram including an optical engine 500 which employs a cross-dichroic prism and polarizing beam splitters (PBS) for three primary colors. Reference numeral 462 denotes a light source lamp. Reference numerals 501, 502 503 are polarizing beam splitters (PBS) associated with the three primary colors, respectively. Reference numeral 504 is a cross-dichroic mirror that splits light from the light source into the three primary colors. Reference numeral 505 is a cross-dichroic prism that combines three primary-color images from three associated light paths. Reference numeral 506 is an optical system lens which enlarges the image that is combined by the cross-dichroic prism 505, and projects it onto a screen.

As is apparent from the configuration of the optical engine 500 illustrated in FIG. 4, three respective liquid crystal panels 100 associated with the three primary colors (R, G, B) are arranged in positions relatively away from each other and in directions different from each other. Such positions and directions change depending on the type and others of the optical engine 500. More specifically, the arrangement of the liquid crystal panels 100 is restricted by the design of optical system. Therefore, there is a demand for a liquid crystal display device which provides more degrees of freedom in the design of the optical system. Further, as described earlier, the reflective type liquid crystal display device (LCOS) needs to increase the frame frequency to reduce flicker, and the data transfer rate will increase further as resolution of the liquid crystal panel is increased. For example, in the case of a UXGA (Ultra Extended Graphics Array) using a 60 Hz refresh rate for input images, the data rate is 162 MHz, and when the frame frequency is doubled, the data rate will be 324 MHz.

Since the input signals to the scaler 452 are luminance signals and color-difference signals, the circuits for the three primary colors (R, G, B) are housed in a single package. Likewise, the color-nonuniformity correction circuits 453 for the three primary colors (R, G, B) are generally housed in a single package. Therefore, while the three liquid crystal panels 100 for the three primary colors, respectively, positioned at different positions away from each other, determined by the optical system, the circuits up to the color-nonuniformity correction circuit 453 are put together at a single location. Consequently, the signal paths from the color-nonuniformity correction circuit 453 to the liquid crystal panels 100 must be lengthened and formed of wiring lines.

There are two cases; one case where analog signals are carried on lengthened wiring lines, and another case where digital signals are carried on lengthened wiring lines. In the case where the wiring lines for analog signals are lengthened, it is conceivable to elongate the wiring paths extending from the D/A converter 405 shown in FIG. 2A. However, if the wiring paths from the D/A converter 405 are elongated, they are easily influenced by their wiring loading effects, and consequently, deterioration in the video images are pronounced. This means that it is difficult to flexibly deal with design changes or the like of the optical system.

On the other hand, in the case where wiring lines for digital signals entering the D/A converter 405 are lengthened, if each of the signals is composed of 10 bits, for example, 10 wiring lines are necessary for each of the R, G and B signals. Further, if the operating frequency is lowered by the phase-expansion into two phases, 20 digital signal lines are required for the R, G and B signals, and problems with the electromagnetic interference (EMI) and electromagnetic compatibility (EMC) are liable to occur. In addition, in general, the timing signal generator 457 is also composed of a single drive circuit for the purpose of operating the three liquid crystal panels associated with the three primary colors, respectively, in synchronism with each other, and therefore, the wiring paths up to the three liquid crystal panels located at positions separate from each other determined by the optical system are different from each other.

Consequently, the liquid-crystal-panel-drive control circuits 400 are disposed proximately to the liquid crystal panel 100, and circuits such as the scaler 452 and the color-nonuniformity correction circuit 453 are put together as the preprocessor circuit 470, and this preprocessor circuit 470 is disposed at a position away from the liquid crystal panel 100. The wiring lines from the preprocessor circuit 470 to the liquid-crystal-panel-drive control circuit 400 were formed as a small-amplitude-signal line 472.

Figure 5:
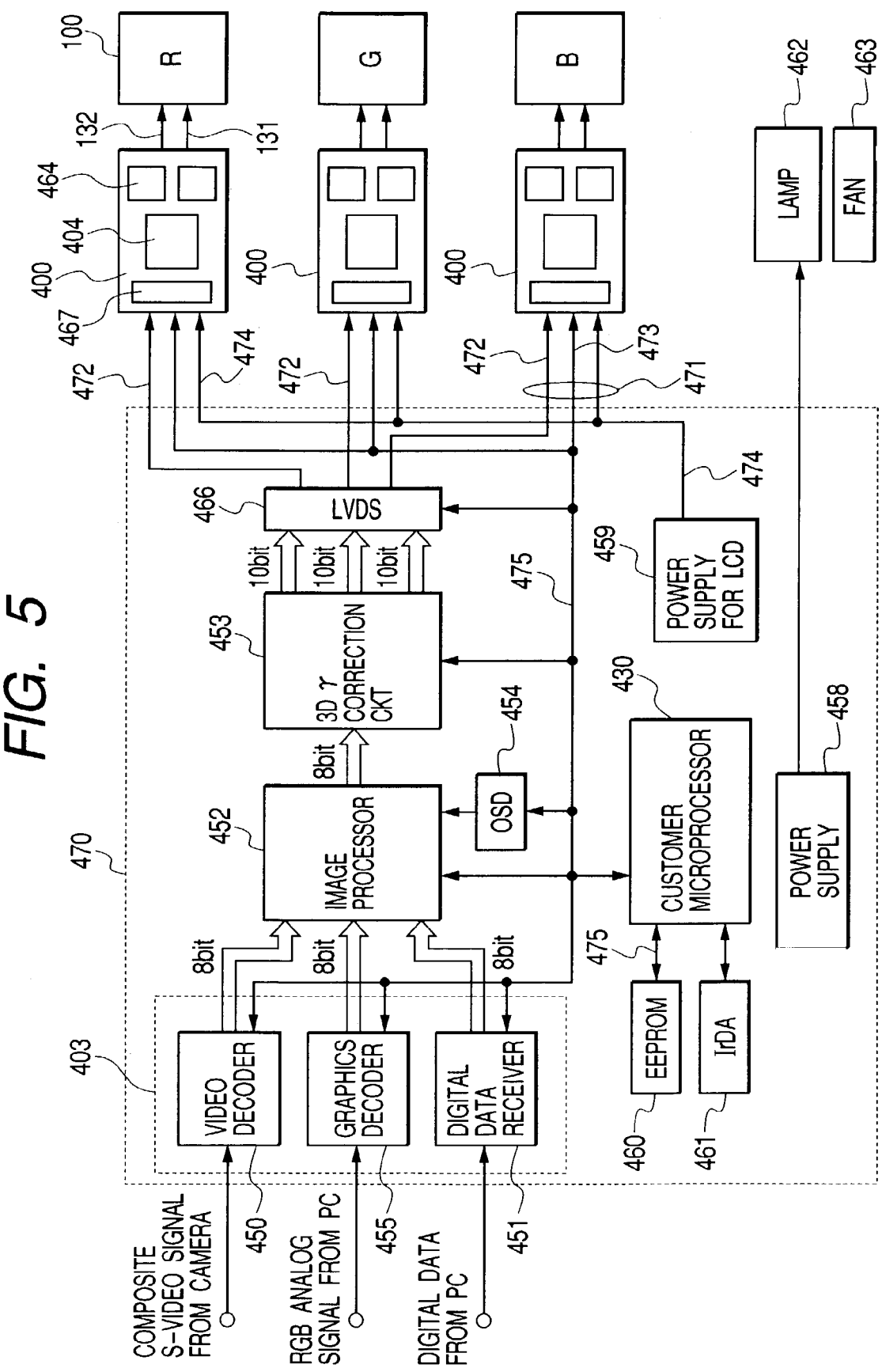
FIG. 5 is a circuit block diagram of the projector using the liquid crystal display device according to the preferred embodiment of the present invention.

Hereinafter, a circuit configuration in which the wiring path is carefully considered will be described. FIG. 5 shows a configuration where locations of respective circuits are carefully considered in the block diagram of the projector illustrated in FIG. 3. The three liquid-crystal-panel-drive control circuits 400 which directly drive the liquid crystal panels 100 are formed on three substrates separate from each other, and are disposed proximately to corresponding ones of the liquid crystal panel elements, respectively, and the three liquid-crystal-panel-drive control circuits 400 are coupled to the preprocessor circuit 470 composed of the circuits which do not directly drive the liquid crystal panels 100, via cables 471. The cables 471 may be those that can be bent flexibly in conformity with the structure of the optical system, and for this purpose, flexible cable or the like are often used as required.

The preprocessor circuit 470 includes the take-in circuits 450, 451 and 455 for receiving external video signals, the scaler 452, the color-nonuniformity correction circuit 453, the microcomputer 430, the power supply circuits 458 and 459. The signals from the preprocessor circuit 470 are transmitted to the liquid-crystal-panel-drive control circuits 400 which directly drive the liquid crystal panels 100 via low-amplitude signal lines 472.

Reference numeral 466 denotes a transmitter, and reference numeral 467 is a receiver. The transmitter 466 converts signals to low-amplitude signals, and outputs the signals to the low-amplitude signal lines 472. The receivers 467 receive the low-amplitude signals, and convert them into signals to be used in the liquid-crystal-panel-drive control circuits 400. For example, the low-amplitude signal lines 472 are capable of handling the LVDS (Low Voltage Differential Signaling). The LVDS cables transmit video signals, clocks and sync signals by using differential-amplitude-mode signals having a potential difference of several hundred millivolts. In a case where the differential-amplitude-mode signals are transmitted by the low-amplitude signal lines 472, each of the low-amplitude signal line 472 is formed of a pair of two wires.

On the boards mounting the liquid-crystal-panel-drive control circuits 400, the signal processing circuit 404 are formed. Therefore, it is possible to perform signal processing such as the data rate conversion and gamma correction of video signals at positions in the vicinity of the liquid crystal panels 100, and thus it is not necessary to elongate high-speed signal lines on the substrates. In addition, the signal processing circuit 404 is provided with the drive pulse circuit 409 which generates various types of drive pulses required for driving the liquid crystal panels 100, in conformity with video signals. When the drive pulse circuits 409 are provided independently of each other for each of the liquid crystal display panels 100, the video signal lines to the three liquid crystal panels 100 associated with the three primary colors, respectively, can be routed under the same conditions irrespective of the arrangement of the optical system, and the problems with the EMI, the EMC and the like can be avoided, it is possible to deal with developmental stages of the optical engine 500, and changes in shapes of the optical engine 500 without the need for revaluing of characteristics and costs, in particular.

Also, each of the boards mounting the liquid-crystal-panel-drive control circuits 400 mounts thereon the analog driver 464 in which the D/A converter 405, the amplifier-ac-generator circuit 406 and the sample-and-hold circuit 407 are integrated as integrated circuits.

The cable 471 includes, in addition to the low-amplitude signal line 472, a power-supply line 474 and a signal-processing control line 473 which transfers signals for controlling the signal processing circuit 404.

Figure 6:
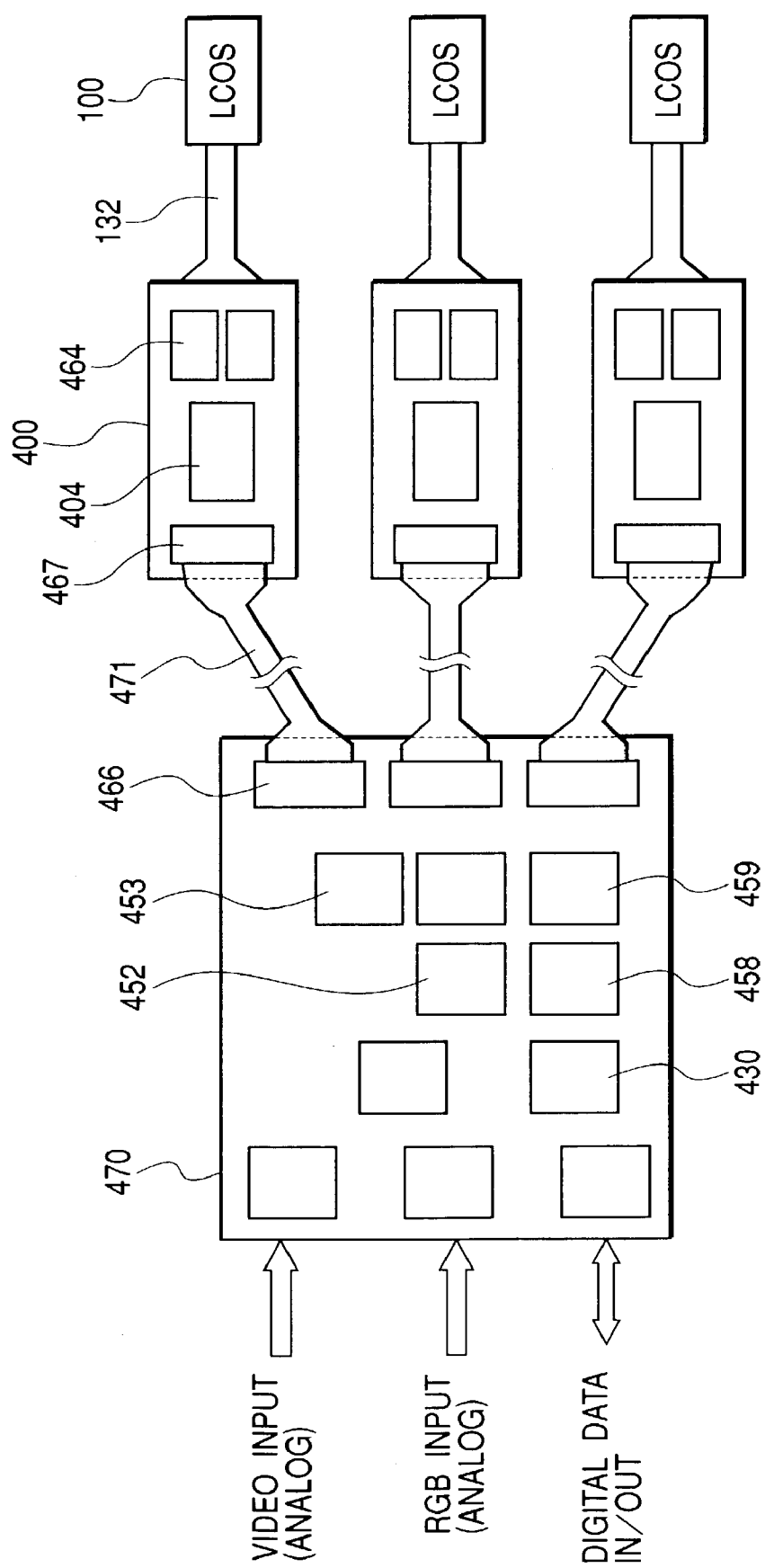
FIG. 6 is a configuration diagram of the projector using the liquid crystal display device according to the preferred embodiment of the present invention.

FIG. 6 shows a configuration wherein the preprocessor circuit 470 is a main board, and flexible cables are used for the cables 471 which connect the preprocessor circuit 470 and the liquid-crystal-panel-drive control circuits 400. The preprocessor circuit 470 constitutes an electrical main board including the power supply circuits 458 and 459. The liquid-crystal-panel-drive control circuits 400 are provided separately for each of the liquid crystal panels 100 independently of each other, and the preprocessor circuit 470 and the liquid-crystal-panel-drive control circuits 400 are connected with flexible cables 471. The flexible cables 471 can change shapes comparatively flexibly to follow changes of the arrangement of the liquid crystal panels 100. The flexible cables 471 include, in addition to the low-amplitude signal lines 472, necessary signal lines such as power supply lines and signal-processing control line 473 which controls the signal processing circuits 404.

Next, the signal processing circuit 474 will be described. As explained above, the signal processing circuit 404 performs the signal processing such as the gamma correction, resolution conversion (scaling) and the multiplication of the frame frequency.

Figure 7:
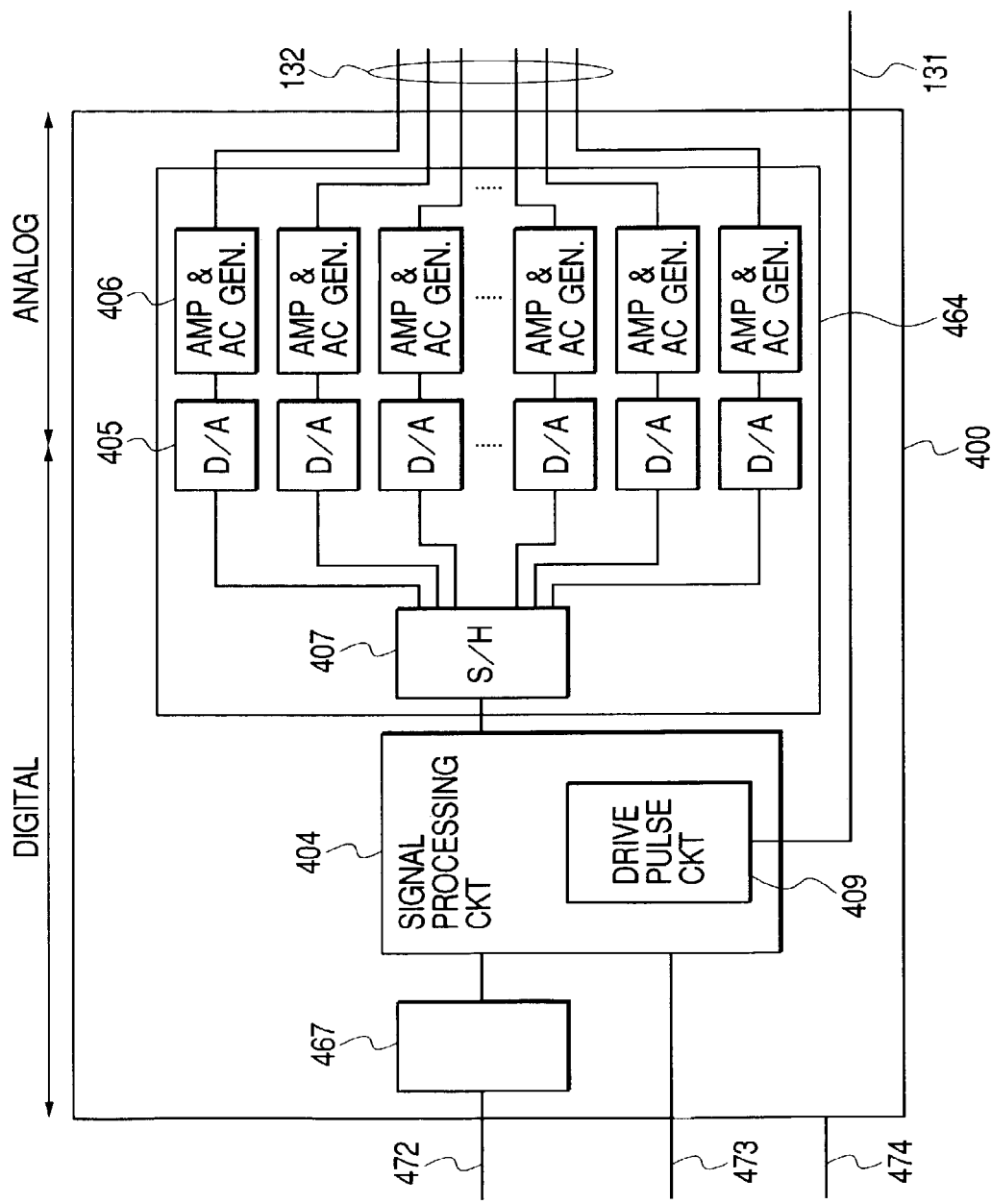
FIG. 7 is a block diagram showing the liquid-crystal-panel drive control circuit of the liquid crystal display device according to the preferred embodiment of the present invention.

FIG. 7 is a schematic block diagram of the liquid-crystal-panel-drive control circuit 400 which employs a system of sampling and holding digital data. Digital signals which have been subjected to signal processing such as gamma correction, resolution conversion, frame-rate conversion, etc. by the signal processing circuit 404 are input to the analog driver circuit 464. In the analog driver circuit 464, the digital signals are phase-expanded in digital form by the sample-and-hold circuit 407, digital signals of respective phase components are D/A-converted in the D/A converter 405, and are amplified and converted into ac signals in the amplifier-ac-generator circuit 406.

With the circuit configuration illustrated in FIG. 7, variations in timing period will not occur since the sampling and holding is performed the form of digital signals. Therefore, this circuit configuration is particularly effective in a case where signal frequencies are increased. With the system of phase-expanding signals by sampling and holding digital signals, the video signals are digital signals having "1" or "0", and even if a voltage supplied to a signal line fluctuates, signals are taken in as a value of either "1" or "0", and therefore the fluctuation does not cause variations which cause problems in the case of analog signals.

Also, in assigning video signals to a plurality of signal lines, the data storage can be made more easily than analog signals since the signals are in digital form. Video signals having a repetition period according to resolution of an image to be displayed are supplied in the order of forming the image from external equipment, and also the digital signals supplied to the liquid-crystal-panel-drive control circuit 400 have the same repetition period and data order as with the video signals supplied from the external equipment. Therefore outputting of the received digital signals to a plurality of signal lines sequentially makes possible the phase-expansion of the signals in digital form.

However, the phase expansion has a problem in that the number of signal lines increases to that equal to the number of phases. More specifically, in the case of the phase expansion into six phases, the number of signal lines is increased to about six times the original number of signal lines. In particular, digital signals are used between the sample-and-hold circuit 407 and the D/A converter 405, and the required number of the signal lines is equal to the number of bits capable of representing the number of gray scale steps to be displayed, thus requiring a larger of cables. Therefore, the phase expansion in the liquid-crystal-panel-drive control circuit 400 provides more advantageous results than a combination of the phase expansion in the preprocessor circuit 470 and then transferring of the digital signals obtained by the phase expansion. In addition, the inventors found a problem that variations occur among signals of different phase components due to variations in characteristics among circuits associated with respective phase-component signals after the phase expansion. Hereinafter, variations which occur among circuits subsequent to the phase expansion will be described.

Figure 8A:
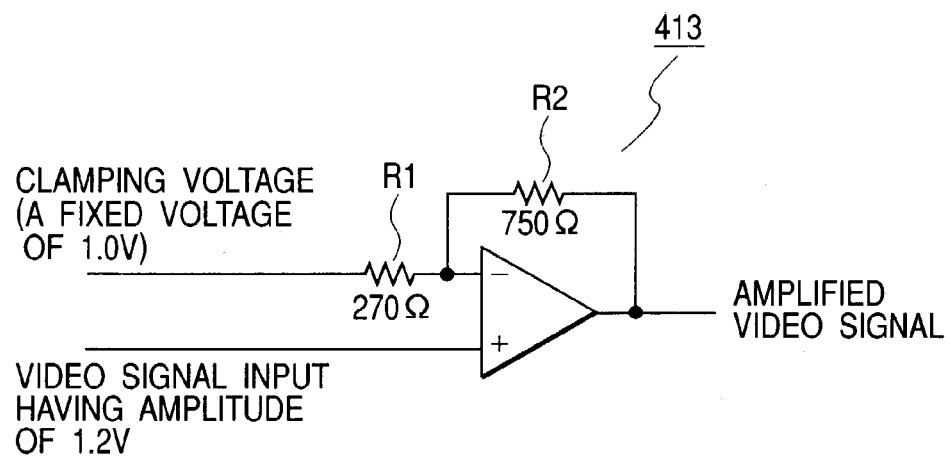
FIGS. 8A and 8B are a schematic circuit diagram and a graph, respectively, explaining effects of variations in amplification of an amplifier circuit.
Figure 8B:
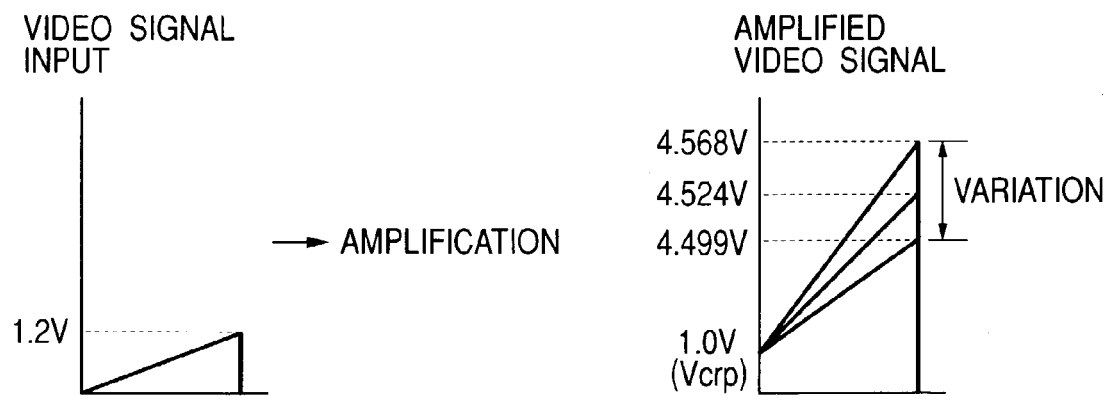

Components for forming circuits have inevitably variations in their characteristics. FIGS. 8A and 8B show an example of a case where an amplifier circuit is formed of an operational amplifier 413. The following calculates variations of signals due to variations in characteristics of components using the example illustrated in FIG. 8A. In the circuit shown in FIG. 8A, we are assuming that a resistance of a resistor R1 is 270 ohms, a resistance of a resistor R2 is 750 ohms, variations in their resistances are ±0.5%, a variation in the gain of the operational amplifier 413 is ±0.025% and an amplitude of a video signal is 1.2 V. The gain of the operational amplifier 413 is determined by the ratio R2/R1. The amplitudes of the output voltages corresponding to the maximum and minimum of the gain caused by variations in characteristics of are as follows:

The amplitude in the case of the maximum gain=1.2 V×((750×1.005)÷(270×0.995)+1)×1.00025=4.568 V; and the amplitude in the case of the minimum gain=1.2 V×((750×0.995)÷(270×1.005)+1)×0.99975=4.499 V.

Therefore, a difference in amplitude between the maximum and the minimum gains is 4.568 V−4.499 V=0.069 V, thus causing the maximum variation of 69 mV. The variation in gain is illustrated as waveforms in FIG. 8B. A constant voltage is supplied as a clamping voltage Vcrp, and it was selected to be 1.0 V in the case shown in FIGS. 8A and 8B.

Figure 9:
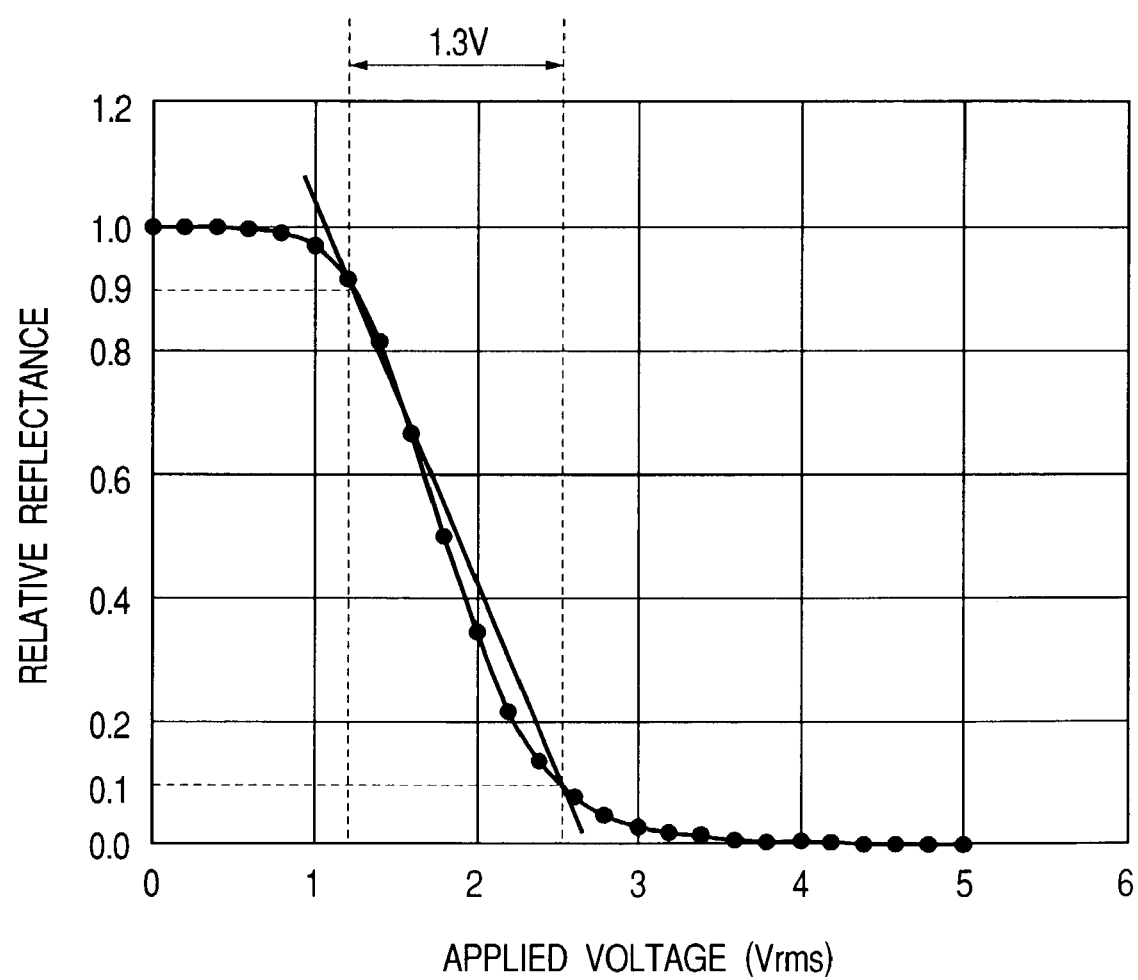
FIG. 9 is a diagram showing the applied voltage-reflectance characteristics of the liquid crystal display device according to the preferred embodiment of the present invention.

FIG. 9 shows relative reflectance-applied voltage characteristics of the reflective type liquid crystal display device (LCOS). An applied voltage of 1.1 V provides a 90% relative reflectance, and an applied voltage of 2.4 V provides a 10% relative reflectance. For example, 256 gray-scale steps must be produced by using a voltage difference of 1.3 V, and therefore the slope of a line in FIG. 9 represents 1.3 V÷256 gray-scale steps=5.1 mV/(gray-scale step). A voltage per gray-scale step is approximately 5 mV.

Therefore, in a case where a variation in amplitude is 69 mV as explained above, this variation produces 69 mV÷(5 mV/gray-scale step)=13.8 gray-scale steps. Thus, in this case, the variation of 69 mV in amplitude will produce a variation in luminance equivalent to about 14 gray-scale steps.

The variations in gain among the amplifier circuits result in variations in characteristics among the video signal transfer lines 132. The variations in characteristics among the video signal transfer lines 132 will appear as differences in luminance in the form of periodic vertical lines on an image displayed on the liquid crystal panel 100, causing a problem of sever deterioration in display quality.

Figure 10:
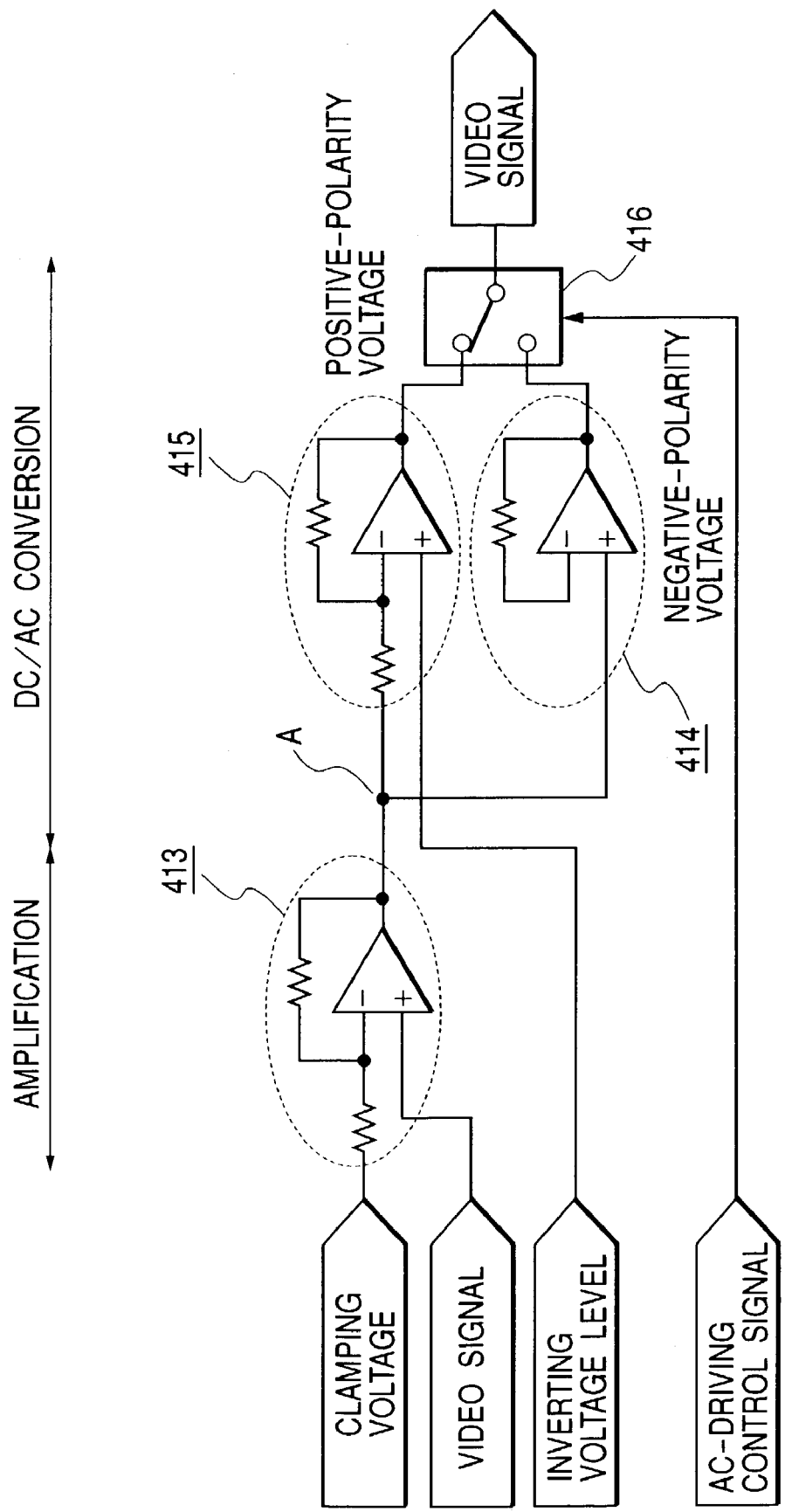
FIG. 10 is a schematic circuit diagram used for explaining variations in characteristics of an ac-voltage generator circuit.

In the amplifier-ac-generator circuit 406, as shown in FIG. 10, in addition to the operational amplifier in the amplifier circuit, an ac-voltage generator circuit also has an operational amplifier, and therefore distortions of waveforms reversed in the ac-voltage generator circuit may also occur. In addition, variations in characteristics of the transistors and others in the liquid crystal panels 100 may cause spurious vertical lines.

Figure 11A:
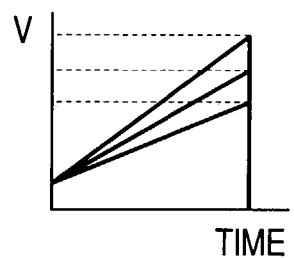
FIGS. 11A, 11B and 11C are waveform diagrams explaining variations in characteristics of an ac-voltage generator circuit.
Figure 11B:
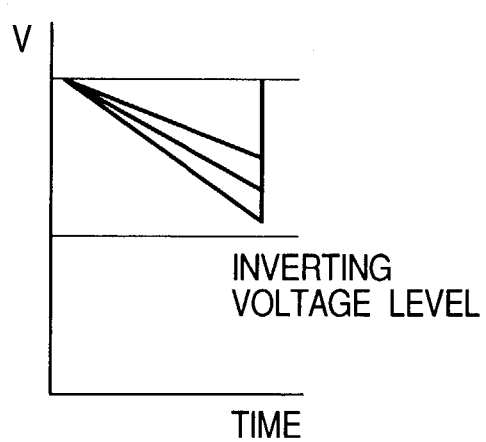
Figure 11C:
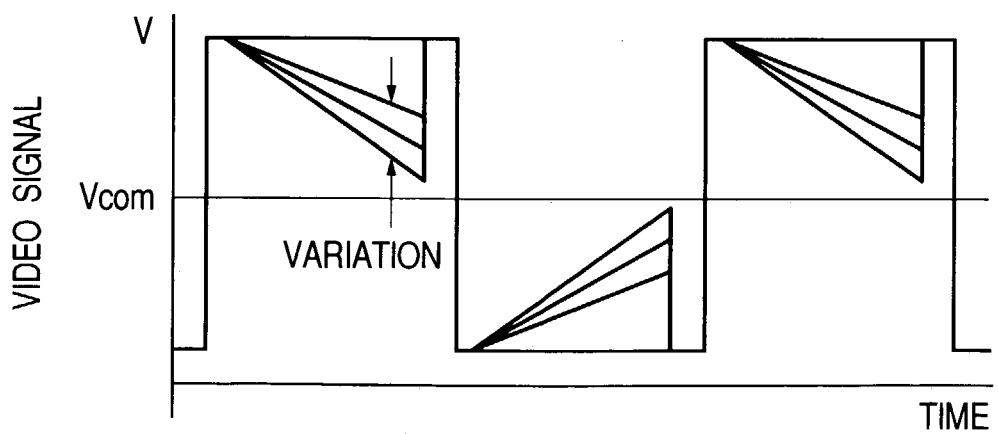

FIGS. 11A, 11B and 11C show variations in characteristics among the circuits illustrated in FIG. 10. FIG. 11A shows signal waveforms output to a node A in FIG. 10 in a case where the input waveforms illustrated in FIG. 8B are input to the operational amplifier 413. FIG. 11B shows the output of a positive-polarity-voltage-associated operational amplifier 415. The positive-polarity-voltage-associated operational amplifier 415 is an inverting amplifier whose gain is 1.0, and the output is equal to a value obtained by subtracting an input voltage from a fixed voltage serving as an inverting voltage level, as shown in FIG. 11B. A negative-polarity-voltage-associated operational amplifier 414 is a buffer amplifier having a gain of 1.0, and outputs its input waveforms without changing them.

FIG. 11C illustrates how the outputs of the negative-polarity-voltage-associated operational amplifier. 414 and the positive-polarity-voltage-associated operational amplifier 415 are alternatively output by using an analog switch 416. FIG. 11C illustrates video signals in the case of driving in the normally white mode. Signals having a smaller potential with respect to the reference voltage Vcom on the counter electrode produces a higher luminance (a white image). As shown in FIG. 11C, variations in characteristics among the circuits result in variations in characteristics among video signal transfer lines 132. For example, in a case where there are n video signal transfer lines 132, and variations are such that the first video signal transfer line 132 is supplied with a minimum video signal and the nth video signal transfer line 132 is supplied with a maximum video signal, vertical lines appear for each nth video signal transfer line 132 in an image displayed on the liquid crystal panel 100, thus deteriorating its display quality severely.

It is of course possible to correct such variations by adjusting respective analog circuits, but, since there are many components to be adjusted, such a method will significantly impair mass production. Therefore, the present inventors have employed a method of reducing variations in characteristics among the analog circuits by correcting the signals in digital form before the signals are input to the respective analog circuits.

The following explains a configuration which has a look-up table 420 (hereinafter sometimes referred to as LUT) for each of the signal lines for phase-components obtained by phase expansion and corrects the respective phase components independently of each other.

Figure 12:
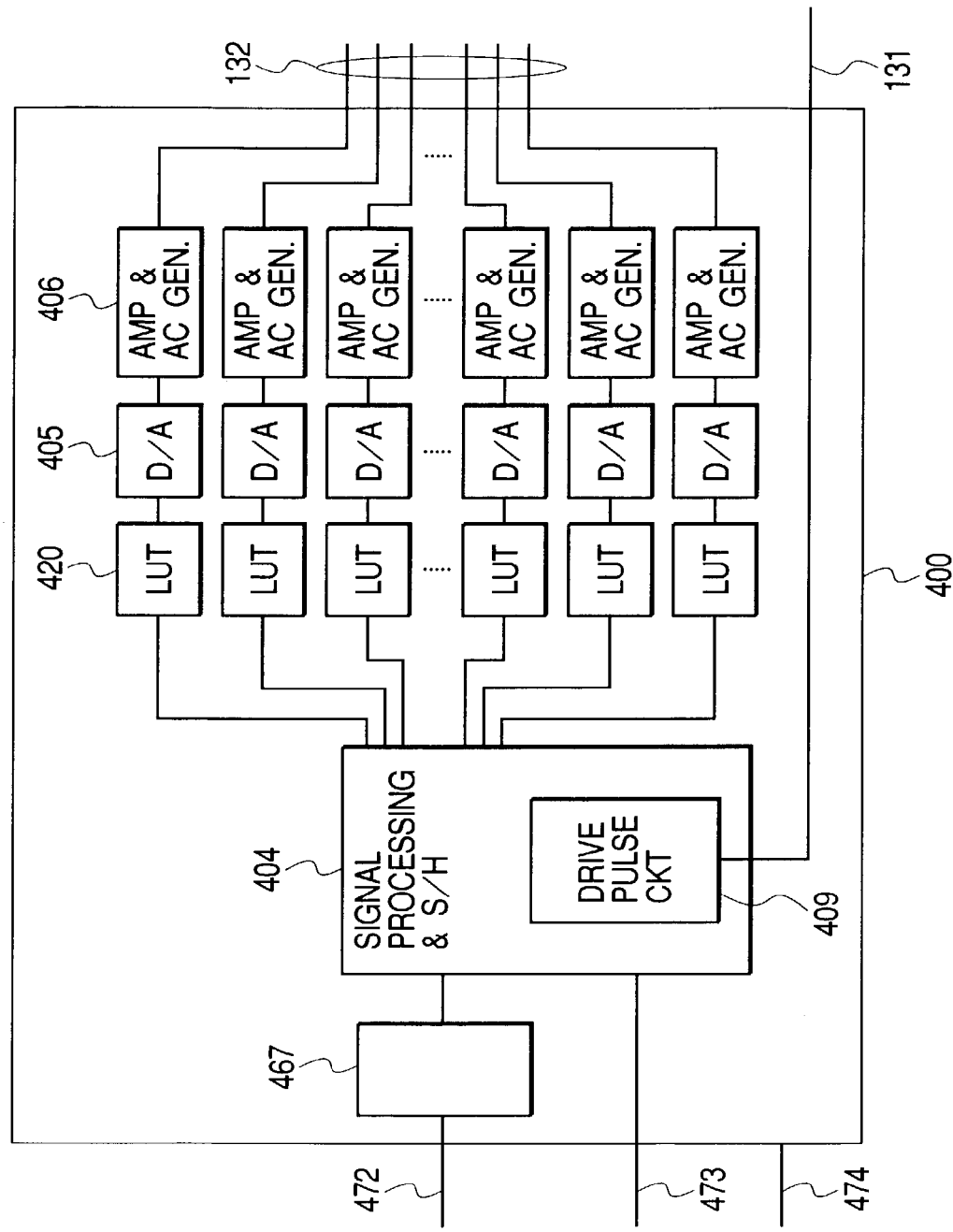
FIG. 12 is a block diagram showing the liquid-crystal-panel drive control circuit of the liquid crystal display device according to the preferred embodiment of the present invention.

In FIG. 12, the signal processing circuit 404 performs signal processing such as the gamma correction, the resolution conversion, and frame rate conversion, and then, outputs digital signals which have been sampled and held, and which have been phase expanded. The phase-expanded digital signals are input to the look-up tables 420 for correction. Upon receipt of the digital signals, the look-up tables 420 output digital data corresponding to the input data, to the D/A converter 405 as correction data. The D/A converters 405 convert the digital data into analog signals, and outputs them to the amplifier-ac-generator circuit 406.

Data for correcting variations in each of phase components are stored in the look-up tables 420. Setting of the correction data stored in the look-up tables 420 is performed by observing and evaluating a display image. First, standard data are stored in the look-up tables 420 and thereby a display is produced, and is observed for variations among the phase components. Based on the observation results, data obtained by multiplying the above standard data by a factor which increases luminance are set as correction data for phase components having reduced luminance, and, on the other hand, data obtained by multiplying the above standard data by a factor which decreases luminance are set as correction data for phase components having increased luminance. The factors having been selected for equalizing luminance for each phase component are stored as optimum factors in the liquid-crystal-panel-drive control circuit 400 or the memory device 460 in the preprocessor circuit 470.

Figure 13:
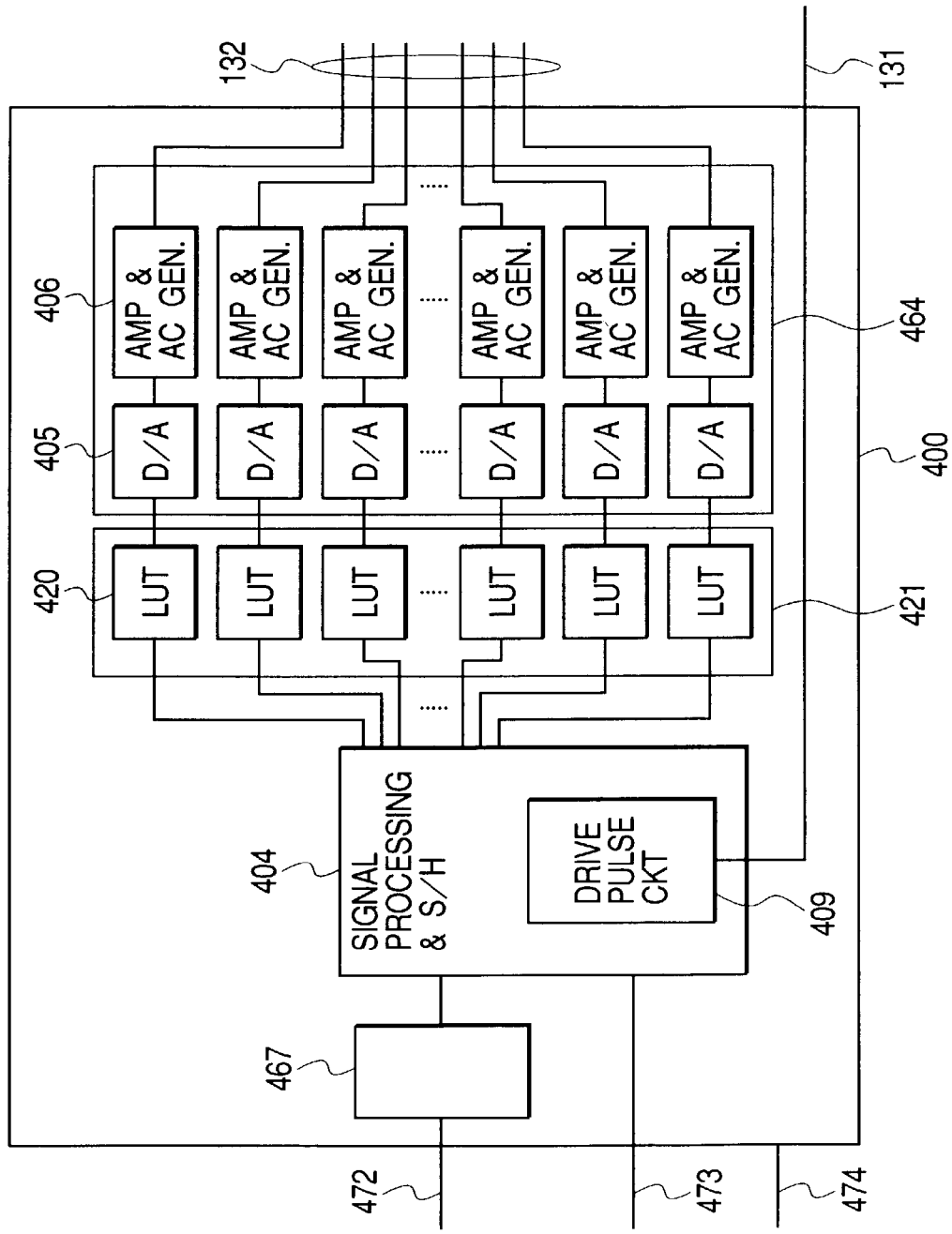
FIG. 13 is a block diagram showing the liquid-crystal-panel drive control circuit of the liquid crystal display device according to the preferred embodiment of the present invention.

FIG. 13 shows a configuration where the look-up tables 420 in the circuit illustrated in FIG. 12 is formed in a single package and a postprocessing circuit is formed as an IC (Integrated Circuit). Reference numeral 464 denotes an analog driver IC, and reference numeral 421 is a one-packaged look-up table into which a plurality of look-up tables are fabricated using a gate array or the like. Digital signals of all the phase components having been subjected to signal processing such as the gamma correction, the resolution conversion (scaling), and the frame rate conversion in the signal processing circuit 404 are input to the one-packaged look-up table 421. The one-packaged look-up table 421 corrects data, and then output them to the analog driver 464. The analog driver 464 performs D/A conversion, amplification and dc/ac conversion. With the configuration explained above, it is possible to one-package each stage so as to simplify the circuits.

Besides, it is also possible to one-package the sample-and-hold circuit and the look-up table by separating the signal processing circuit from the sample-and-hold circuit. It is also possible to form a package by using a single-chip gate array or a plurality of gate array chips.

Figure 14:
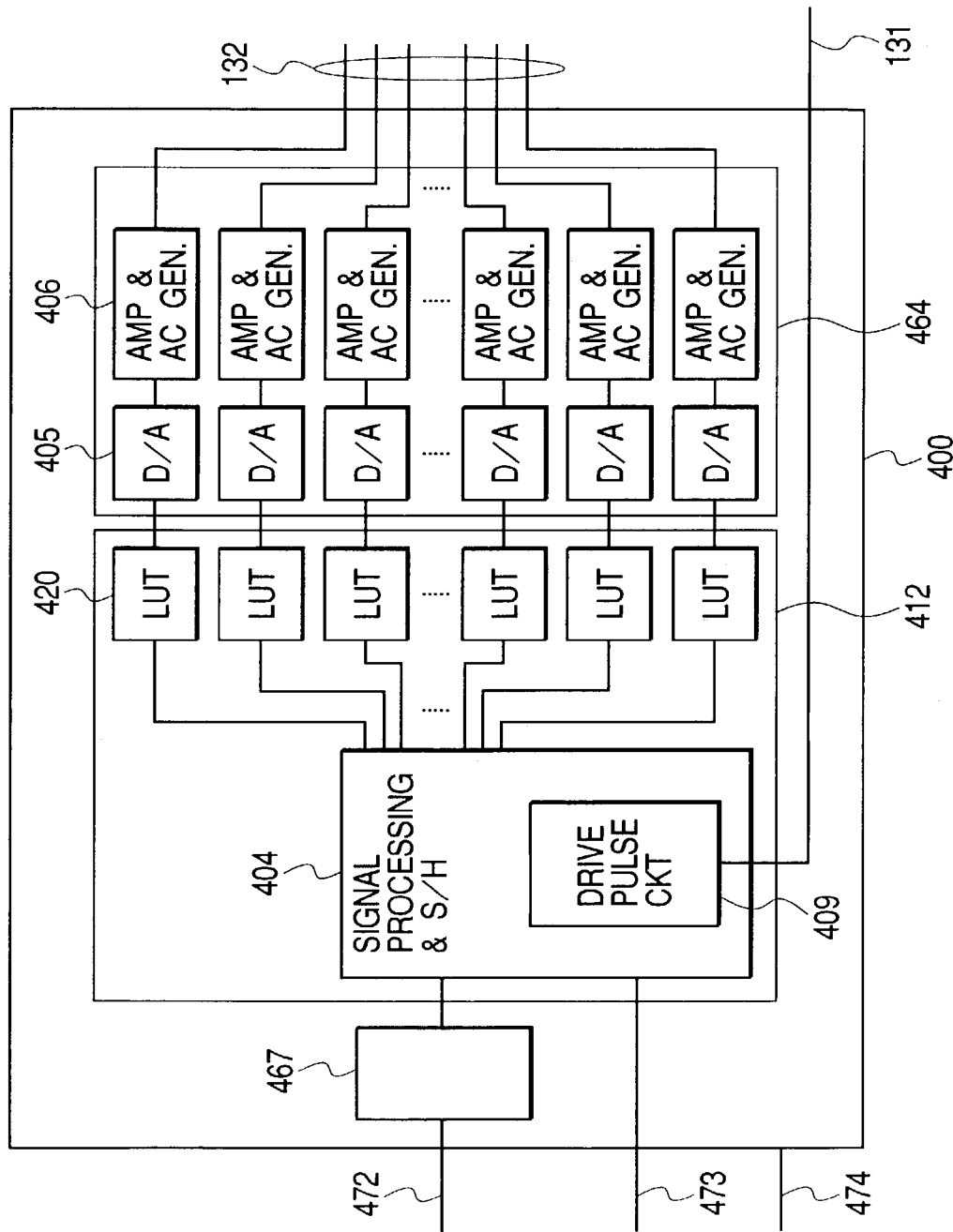
FIG. 14 is a block diagram showing the liquid-crystal-panel drive control circuit of the liquid crystal display device according to the preferred embodiment of the present invention.

FIG. 14 shows an embodiment where the signal processing circuit 404 and a plurality of look-up tables 420 are fabricated in a single package. Reference numeral 412 denotes a flat package which incorporates the signal processing circuit 404 and the plural look-up tables 420. The signal processing circuit 404 and the plural look-up tables 420 can be formed by using a single-chip gate array or plural chips.

FIG. 15 shows a preferred embodiment of a data configuration of the look-up table 420 which corrects data for producing 256 gray-scale steps per primary color. Each of input data are formed of 8 bits and each of correction data is formed of 10 bits. Each of the correction data is provided with the number of bits required for representing the number of gray-scale steps capable of reproducing satisfactory gray-scale images. The look-up table 420 includes memories capable of being read and written into (for example, random access memories), and by using a 256-gray-scale-representing video signal input as an address, the look-up table 420 outputs a 10-bit data stored in the corresponding address as a correction data for the signal input.

Any configuration can be employed for outputting correction data which has a function of outputting correction data in accordance with input data. For example, it is possible to use a signal processing circuit which calculates a correction factor for input data and outputs correction data. Further, a configuration can be used for the look-up table which is capable of storing addresses and data in respective ones of the addresses, and the look-up table can be formed by using memories such as RAMs (Random Access Memories) or ROMs (Read-Only Memories), or using logical circuits.

Figure 17:
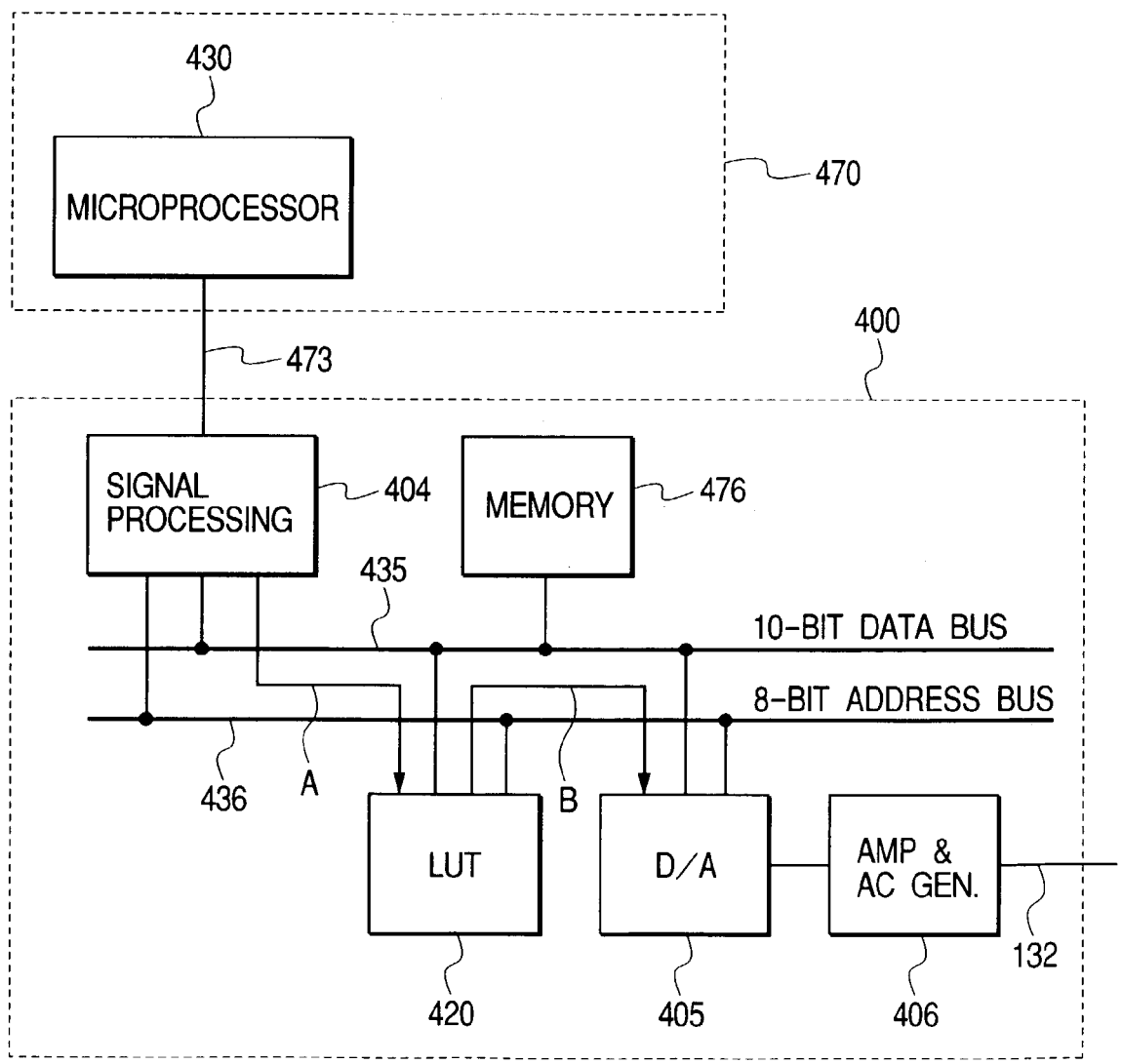
FIG. 17 is a schematic circuit diagram showing paths for transferring data to the look-up table of the liquid crystal display device according to the preferred embodiment of the present invention.

Two exemplary methods of setting correction data in the look-up table 420 shown in FIG. 15 are shown in FIGS. 16 and 17, respectively. In the configuration of signal lines in the liquid-crystal-panel-drive control circuit 400, a data bus 435 is configured for 10 bits, and an address bus 436 is configured for 8 bits. The preprocessing circuit 470 is provided with the microprocessor 430 and the memory 460 for an initial setup and controlling of the projector equipment. In FIG. 16, factors for setting up correction data are stored in the memory 460.

First, the microprocessor 430 reads out factors stored in the memory 460 via an internal bus line 475. Then, the microprocessor 430 calculates correction data based on the factors. The microprocessor 430 transfers the correction data to the signal processing circuit 404 via the signal-processing control line 473. The signal processing circuit 404 transmits the correction data formed of 10 bits×256 to the data bus 435 and sets them in the RAM for the look-up table 420 (a path A in FIG. 16).

When the correction data are to be read out from the look-up table 420, the phase-expanded digital signals are set at the address bus 436, and the look-up table (RAM) 420 outputs the correction data at the address designated by the address bus 436 onto the data bus 435 (a path B in FIG. 16). The D/A converter 405 converts the digital data inputted from the data bus 435 into analog signals, and then outputs the analog signals to the amplifier-ac-voltage-generator circuit 406.

On the other hand, a circuit shown in FIG. 17 has a memory 476 disposed in the liquid-crystal-panel-drive control circuit 400, and at the time of initial setting, the memory 476 outputs factors to the microprocessor 430 from the liquid-crystal-panel-drive control circuit 400 via the signal-processing control line 473. The microprocessor 430 calculates correction data based on the factors, and transfers the correction data to the signal processing circuit 404 via the signal-processing control line 473. In the case where the memory 476 is disposed in the liquid-crystal-panel-drive control circuit 400, a configuration can be such that the correction data are calculated based on the factors stored in the memory 476, by using the signal processing circuit 404. Since the factors are specific to respective ones of the liquid crystal panels 100, it is possible to eliminate problems such as use of wrong factors when the factors is stored in the liquid-crystal-panel-drive control circuit 400 associated with each of the liquid crystal panels 100.

Figure 18A:
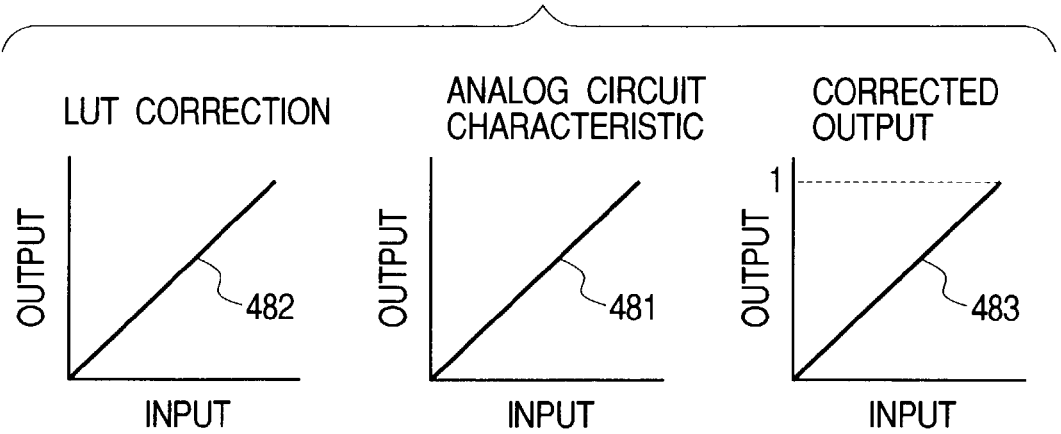
FIGS. 18A, 18B and 18C are graphs showing output-input characteristics indicating a method of correcting by using the look-up table of the liquid crystal display device according to the preferred embodiment of the present invention.
Figure 18B:
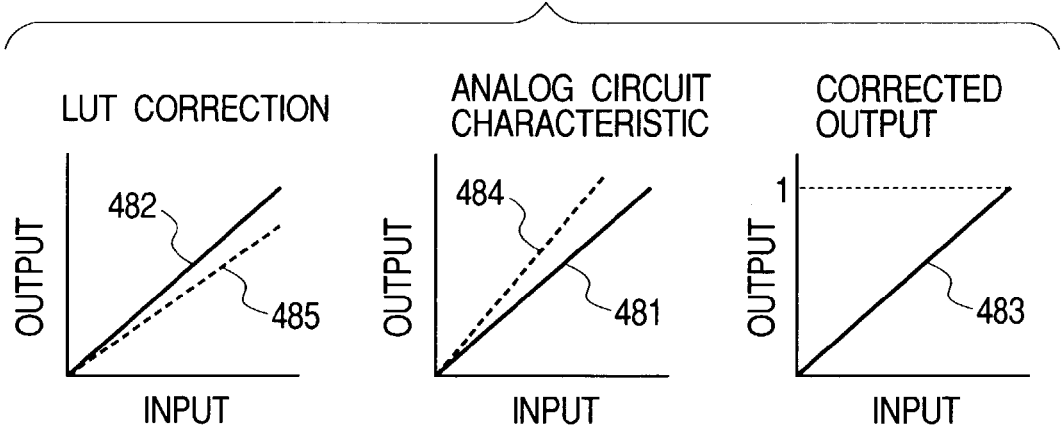
Figure 18C:
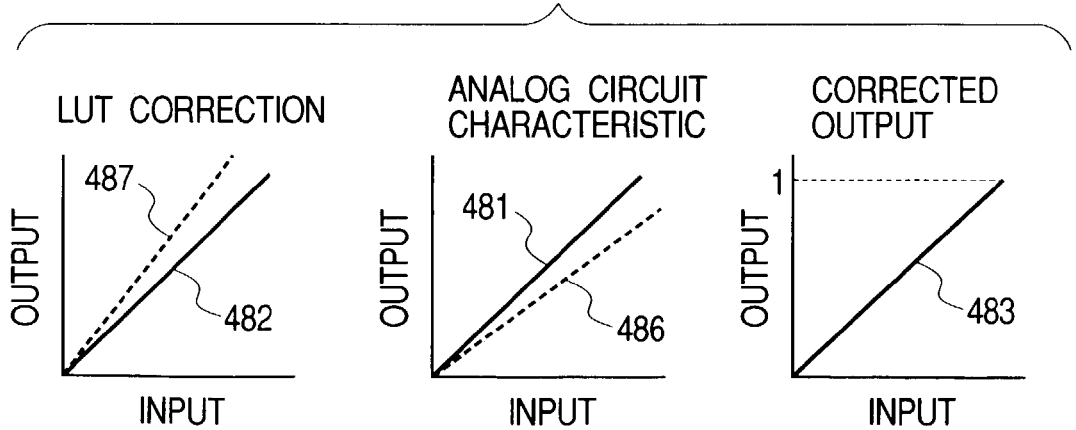

FIGS. 18A through 18C show a method of correcting data by using the look-up tables 420. The correction method compensates for variations in characteristics among the analog circuits by using the look-up table 420 such that variations in corrected outputs are minimized.

FIG. 18A shows a case where analog circuit characteristics are ideal, and normal outputs are obtained for inputs. A line 481 shows normal output-input characteristics. Since the characteristics represented by the line 481 are normal, values selected in the look-up table 420 are uncompensated values. A line 482 shows output-input characteristics of the look-up table 420 where no compensation is applied, and a line 483 shows an output after compensation.

FIG. 18B shows a case where analog circuit characteristics produce outputs higher than the normal values. A line 484 shows characteristics which produce outputs higher than the input values. Since the output-input characteristics represented by the line 484 produce the output higher, correction data which make the output lower will be selected in the look-up table 420. Characteristics of the look-up table 420 are represented by values which make the output lower than the uncompensated line 482 as shown by a line 485.

A method of compensating variations in the case shown in FIG. 18B is performed by observing an image displayed on the liquid crystal panel 100, and inputting factors which change characteristics of a look-up table provided in a circuit associated with a phase component exhibiting higher luminance such that the characteristics of the look-up table follow the line 485 shown in FIG. 18B, to the microprocessor 430 from external equipment. The microprocessor 430 creates correction data based on the factors thus input and the reference data, and create data for the look-up table 420. The above-explained method creates the correction data, compensates by using the look-up table 420, and thus displays a corrected image on the liquid crystal panel 100. Further, if the factors are not appropriate, and needs re-compensation, the similar operations will be repeated until nonuniformity in luminance can not be observed on the screen.

FIG. 18C shows a case where the analog circuit characteristics produce outputs lower than the normal values. Reference numeral 486 denotes a line showing characteristics which provide outputs lower than the inputs. Since the output-input characteristics represented by the line 486 produce lower outputs, correction data which make the outputs higher are selected in the look-up table 420. Characteristics in the look-up table 420 are chosen to be values which make the outputs higher than the line 482, as represented by the line 487.

When an adjustment is conducted to determine the factors, the microprocessor 430 is operated in the factor-adjusting mode. Further, an interface section is provided for inputting of factors from external equipment such that the factors can be input to the microprocessor 430.

The established factors are stored in the memory 460 of the preprocessor circuit 470 or the memory 476 provided in the liquid-crystal-panel-drive control circuit 400. Correction data are created by the microprocessor 430 or the signal processing circuit 404 based on the standard data and the factors during the initializing operation of the liquid crystal display device, and are then stored in the look-up table 420.

In another correction method, an image on the liquid crystal panel 100 is input by using a pickup camera, a phase component is detected which exhibits nonuniformity in luminance among the input display data, the above-explained factors are automatically calculated, and then correction data in are created in the look-up table 420 based on the calculated factors.

In the case where variations in characteristics among analog circuits are those in gain, as illustrated in FIGS. 18A, 18B and 18C, variations in the outputs have linear relationships with the inputs, and therefore, correction data for correcting the variations have linear relationships with the inputs. Therefore, it is possible in this case to obtain the correction data by multiplying the standard data by factors.

Figure 19:
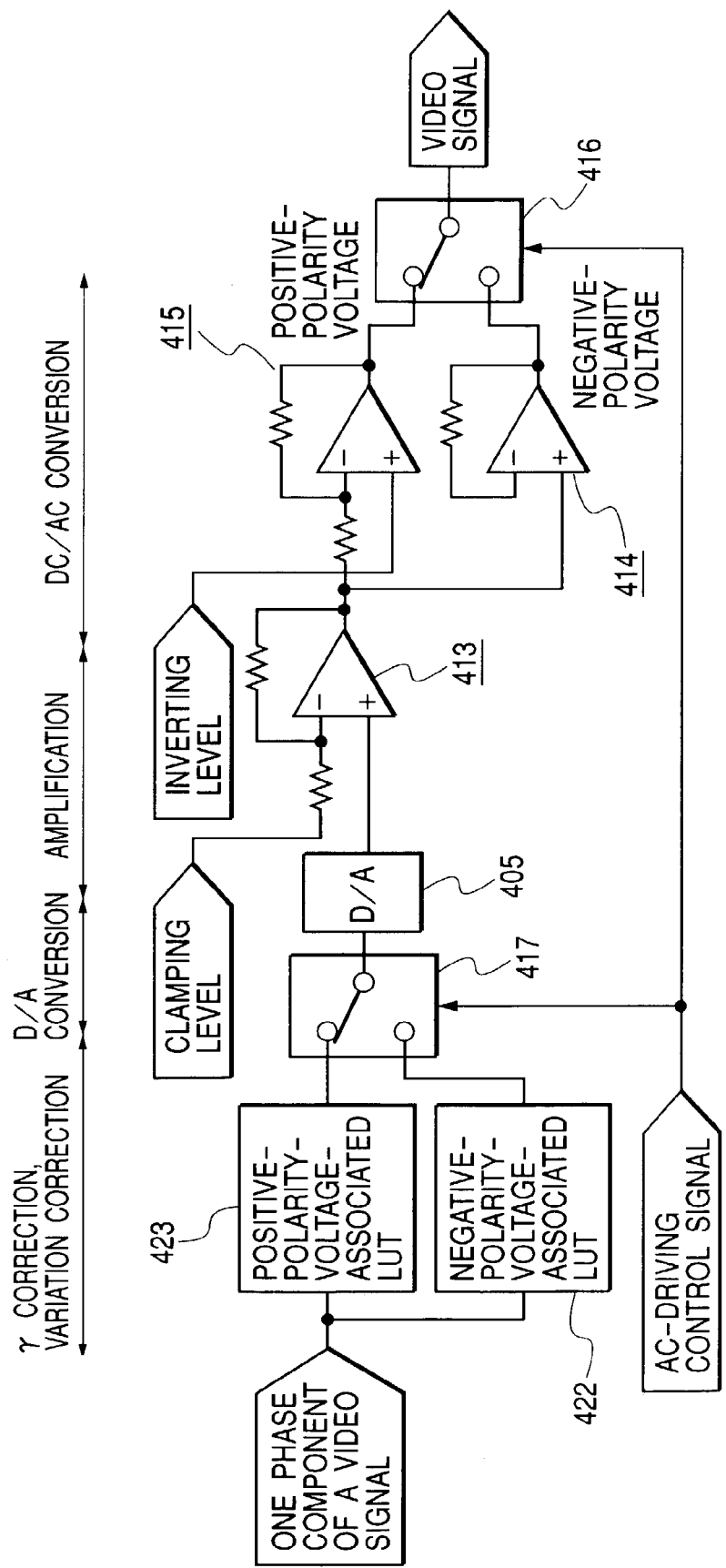
FIG. 19 is a schematic circuit diagram for correcting variations in ac voltage generation by using the look-up table of the liquid crystal display device according to the preferred embodiment of the present invention.

FIG. 19 shows a configuration for correcting variations occurring in the ac-voltage generator circuit. The circuit has two look-up tables for one phase component, a positive-polarity-voltage-associated look-up table 423 and a negative-polarity-voltage-associated table 422, and one of the two look-up tables is selected by an analog switch 417 in synchronization with an ac-driving control signal. When a video signal is to be output from the negative-polarity-voltage-associated operational amplifier 414, its correction is performed by using the negative-polarity-voltage-associated look-up table 422, and when a video signal is to be output from the positive-polarity-voltage-associated operational amplifier 415, its correction is performed by using the positive-polarity-voltage-associated look-up table 423. By setting correction data in the positive-polarity-voltage-associated look-up table 423 and the negative-polarity-voltage-associated look-up table 422 in advance, it is possible to correct variations among the positive-polarity voltages, and among the negative-polarity voltages.

Figure 20A:
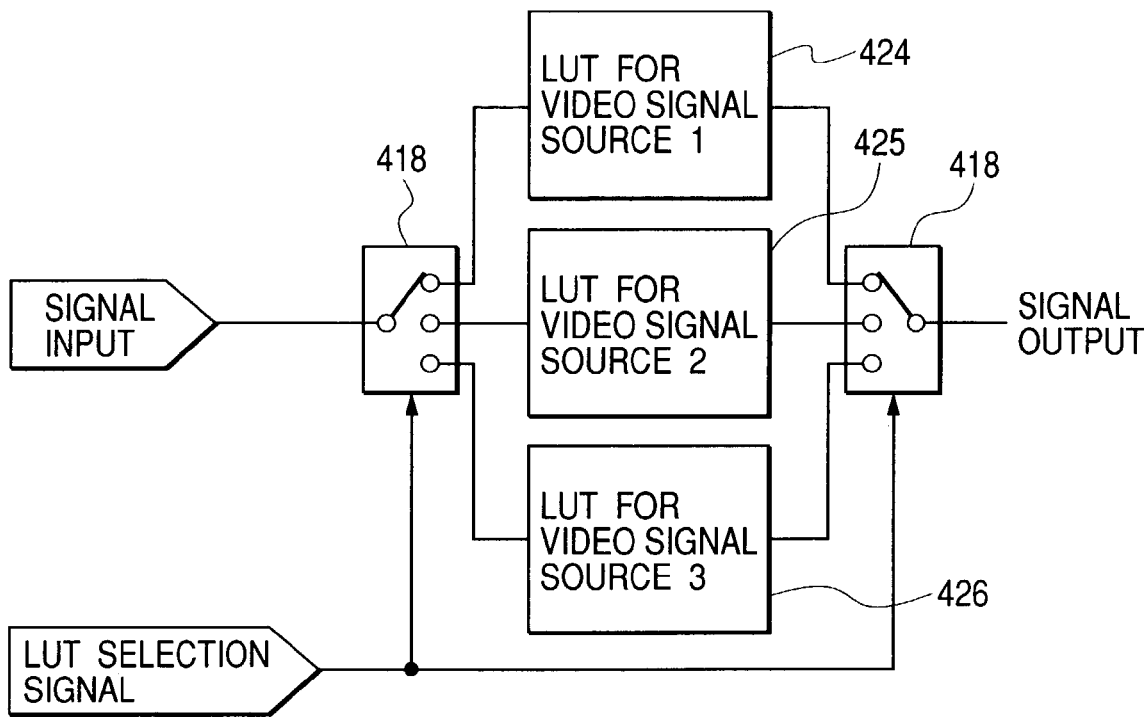
FIGS. 20A and 20B are schematic block diagrams illustrating correction of discrepancies among a plurality of video signal sources by using the look-up table of the liquid crystal display device according to the preferred embodiment of the present invention.

FIG. 20A shows a method of selecting one among a plurality of look-up tables in accordance with an intended one of video signal sources. Typical signal sources include graphic images such as windows of a personal computer, motion pictures, and natural objects. A plurality of look-up tables, etc. such as gamma correction tables suitable to a plurality of video signal sources are created in advance, and one of these look-up tables are selected by switching in accordance with an intended video signal source. FIG. 20A shows a case where three look-up tables are provided for three types of video signal sources, respectively. It is of course possible to provide plural look-up tables for plural video signal sources, respectively. Reference numeral 424 denotes a look-up table for a first video signal source, reference numeral 425 is a look-up table for a second video signal source, and reference number 426 is a look-up table for a third video signal source. An intended one of the three look-up tables is selected by using a switch 418.

Figure 20B:
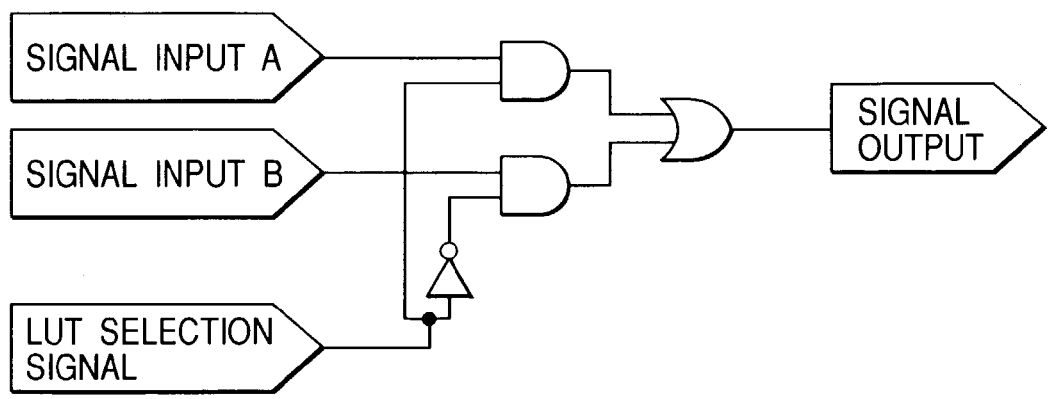

Any switches can be used as the switch 418 which are capable of selecting one from among plural transfer paths for digital signals. FIG. 20B shows a case where the switch 418 is formed of logic circuits.

Figure 21A:
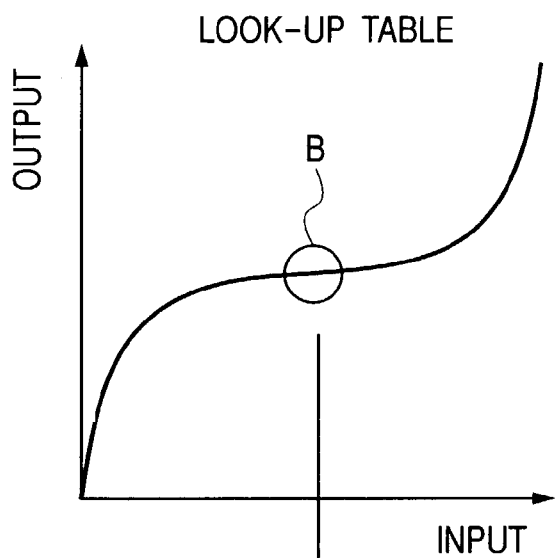
FIGS. 21A and 21B are diagrams for describing a method of adding pseudo-gray-scale steps by using the look-up table of the liquid crystal display device according to the preferred embodiment of the present invention.

A method of adding pseudo-gray-scale steps by using a plurality of look-up tables is described referring to FIGS. 21A, 21B, and 22A to 22D. In the case of a look-up table for the gamma correction, for example, changes in outputs for changes in inputs are small as shown in FIG. 21A, the number of gray-scale steps which can be displayed by the liquid crystal panel is reduced, resulting in deterioration in image quality.

Figure 21B:
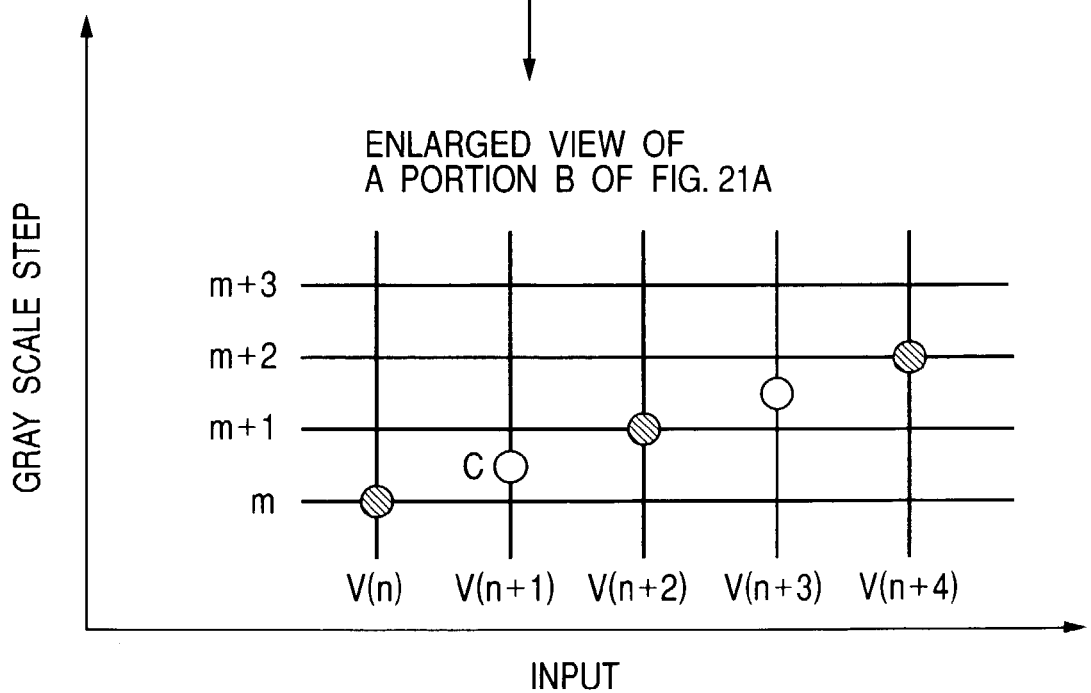

FIG. 21B shows an enlarged view of a portion B where changes in outputs are small. In the example shown in FIG. 21B, when it is desired to produce a gray scale step between the mth and (m+1)st gray scale steps for an input of V(n+1), only one of the mth and (m+1)st gray scale steps can sometimes be represented because of the limited number of bits. Therefore, a gray scale intermediate between the mth and (m+1)st gray scale steps is produced by switching between two look-up tables outputting the mth gray scale and the (m+1)st gray scale, respectively, with a frame period.

Figure 22A:
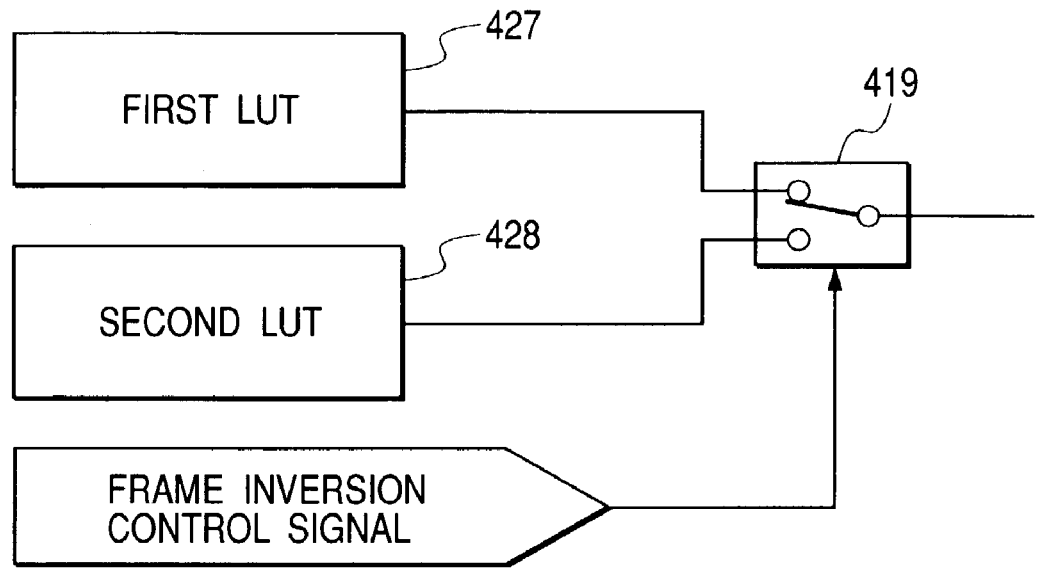
FIGS. 22A, 22B, 22C and 22D are diagrams for describing a method of adding pseudo-gray-scale steps by using the look-up table of the liquid crystal display device according to the preferred embodiment of the present invention.
Figure 22B:
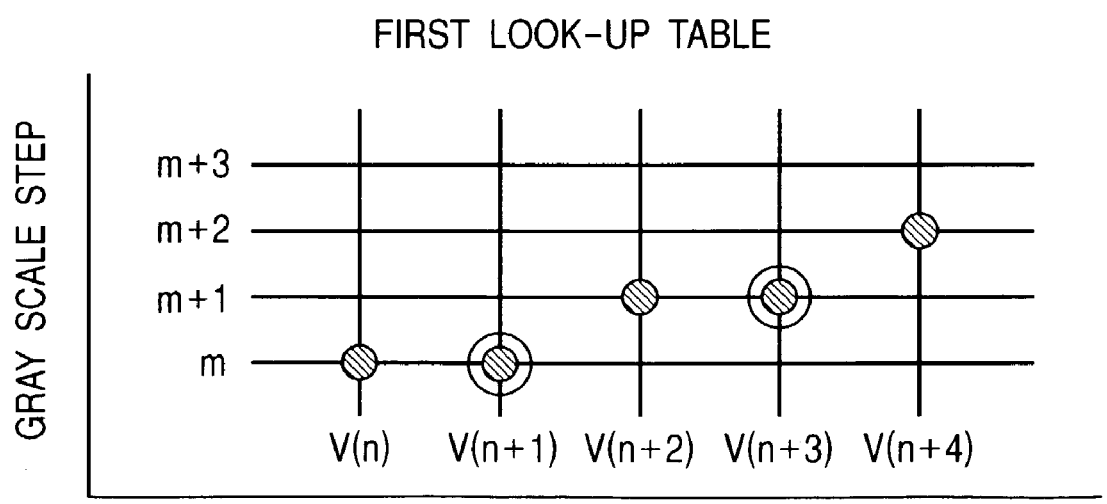
Figure 22C:
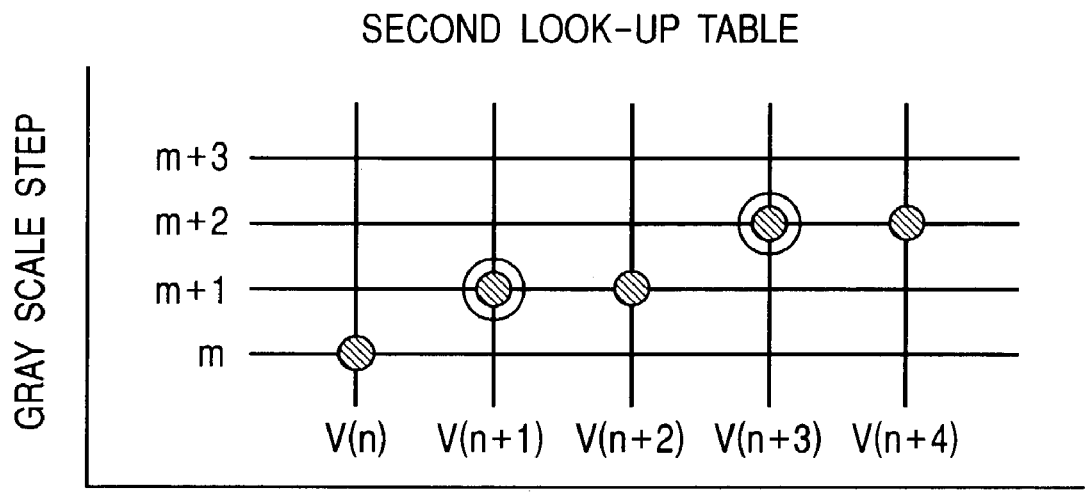
Figure 22D:
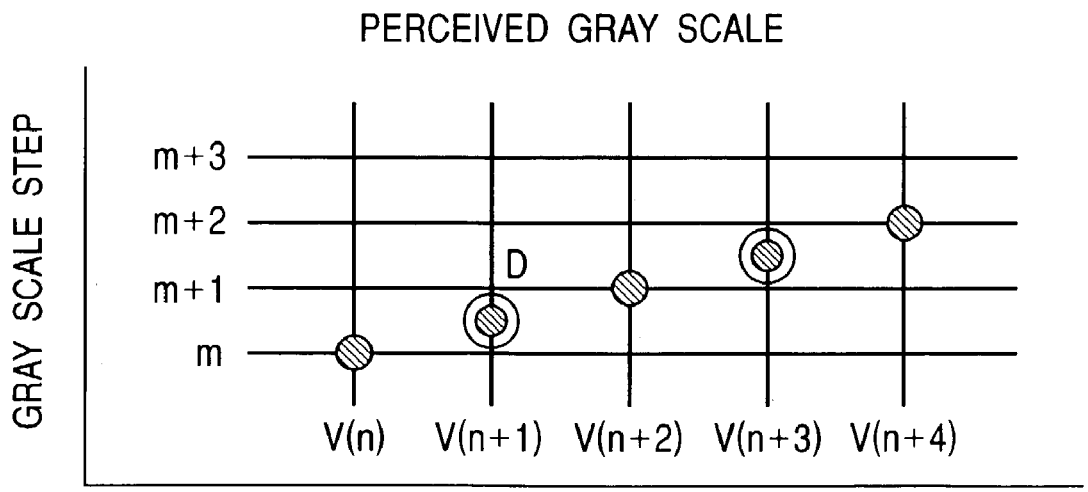

In FIG. 22A, reference numeral 427 denotes a first look-up table, reference numeral 428 is a second look-up table, and reference numeral 419 is an analog switch for switching. As shown in FIG. 22B, the first look-up table 427 outputs the mth gray scale step for of the input V(n+1). As shown in FIG. 22C, the second look-up table 428 outputs the (m+1)st gray scale step for the input V(n+1). An output from the first look-up table 427 and an output from the second look-up table 428 are alternately nd output with the frame period by using the analog switch 419. With such an arrangement, it is possible to create an illusion of a pseudo gray scale step (denoted by D in FIG. 22D) intermediate between the mth and the (m+1)st gray scale steps, as shown in FIG. 22D.

Figure 23C:
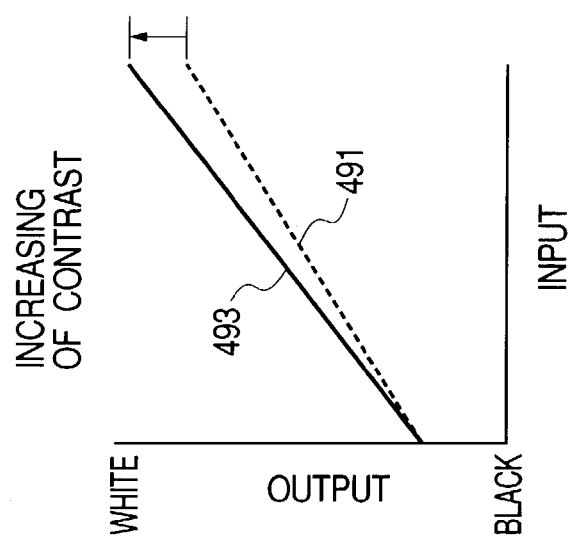
FIGS. 23A, 23B and 23C are diagrams for describing a method of adjusting contrast by using the look-up table of the liquid crystal display device according to the preferred embodiment of the present invention.
Figure 23B:
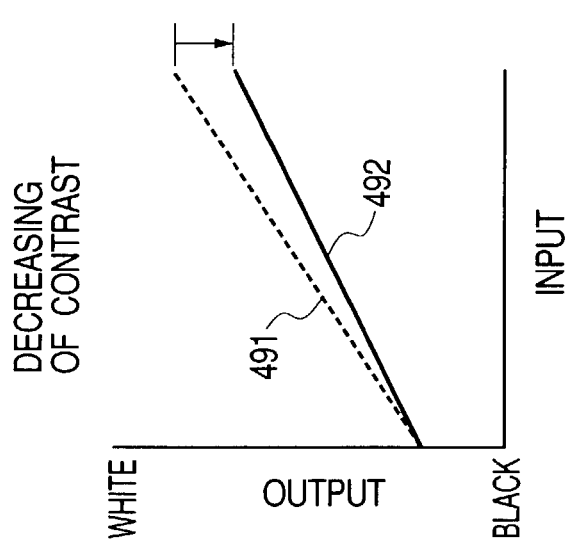
Figure 23A:
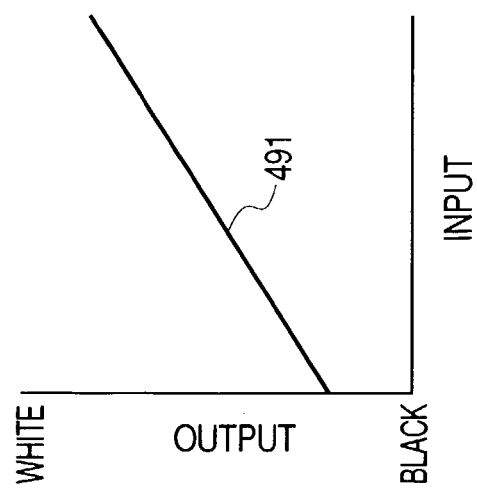

A method of adjusting contrast and luminance by using look-up tables is described by referring to FIGS. 23A to 23C, and 24A to 24C. In FIGS. 23A to 23C and 24A to 24C, the description will be made by referring to a case of the normally black display mode to simplify the description. More specifically, when a voltage applied across a liquid crystal layer is large, a higher-luminance image (a white image) is obtained. FIGS. 23A to 23C are diagrams for describing a method of adjusting contrast.

To reduce the contrast of data represented by a line 491 which shows output-input characteristics illustrated in FIG. 23A, the slope of the output-input characteristic curve is reduced by performing a correction using a look-up table, as shown by a line 492 in FIG. 23B. To increase the contrast, the slope of the output-input characteristic curve is increased by performing a correction using a look-up table, as shown by a line 493 in FIG. 23C.

FIGS. 24A through 24C are diagrams for describing a method of adjusting luminance. To reduce the luminance of data represented by a line 491 which shows output-input characteristics in FIG. 24A, the output-input characteristic curve is shifted toward the black as indicated by a line 494 in FIG. 24B by performing a correction using a look-up table, and to increase the luminance, the output-input characteristic curve is shifted toward the white as indicated by a line 495 in FIG. 24C.

Figure 25:
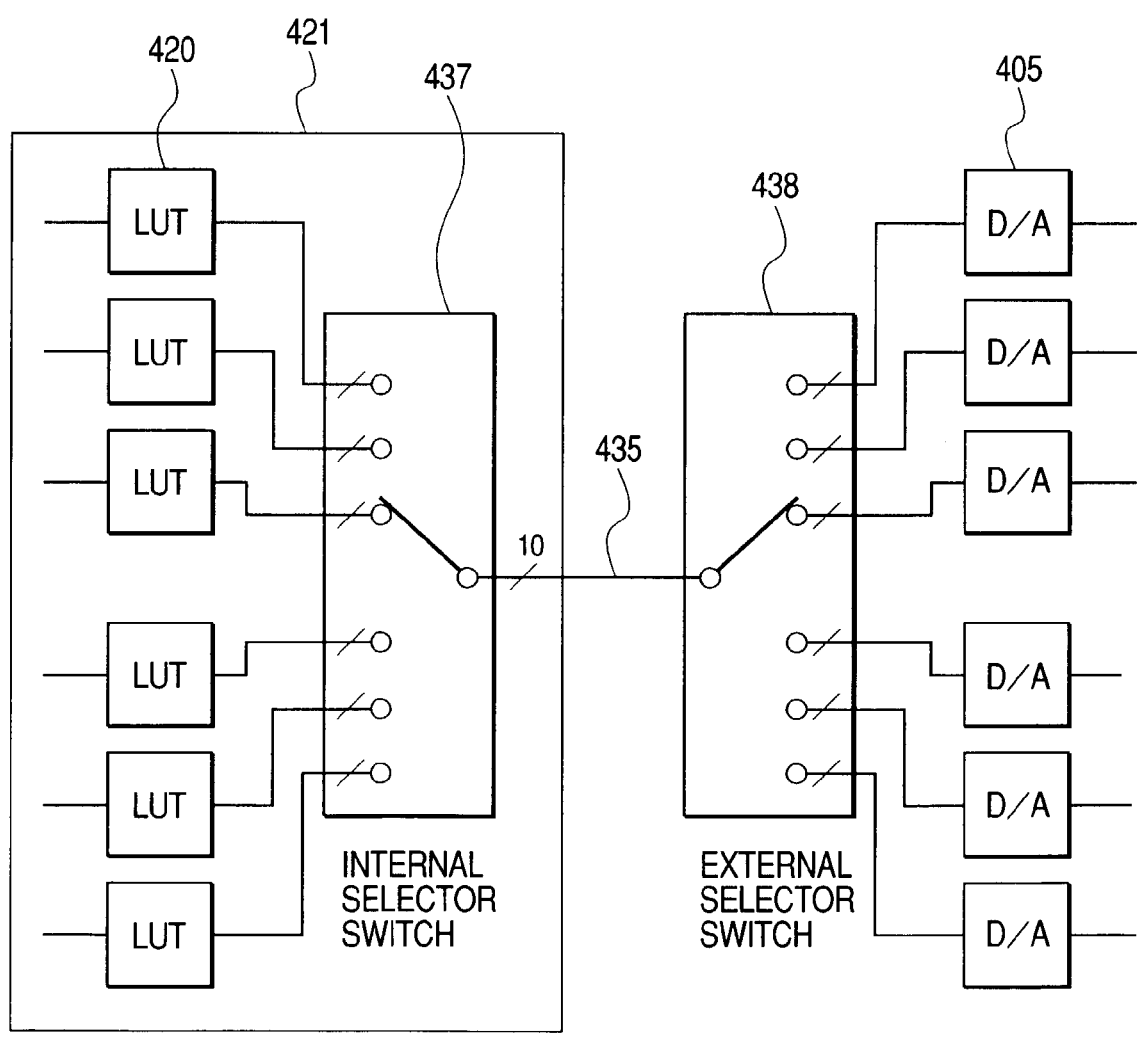
FIG. 25 is a schematic circuit diagram for describing a method of reducing the number of pins of the look-up table of the liquid crystal display device according to the preferred embodiment of the present invention.

FIG. 25 shows a circuit configuration for reducing the number of pins of a one-packaged look-up table 421 by providing analog switches. It is also possible to reduce the number of wiring lines and pins of internal and external interfaces using a similar configuration. In a case where a plurality of look-up tables 420 are incorporated into a single package, the circuit configuration can be simplified, but a problem arises in that the number of pins of the package increases. The data bus 435 connecting the look-up tables 420 with the D/A converters 405 is configured for 10-bit data, a provision of a data bus for each of the phase components will significantly increase the number of pins of the one-packaged look-up tables 421 coupled to the data bus. For example, in the case of 12-phase expansion and 10-bit data for each of the phase components, the number of pins is is 120. In this circuit configuration, one of the look-up tables is selected for outputting by an internal switch 437, and its destination is selected by an external switch 438 in synchronism with the selection of the look-up table. In the case of 12-phase expansion and 10-bit data for each of its phase components, for example, this circuit configuration reduces the number of pins to 10 from 120, the size of a package incorporating the circuit configuration can be minimized.

Figure 26:
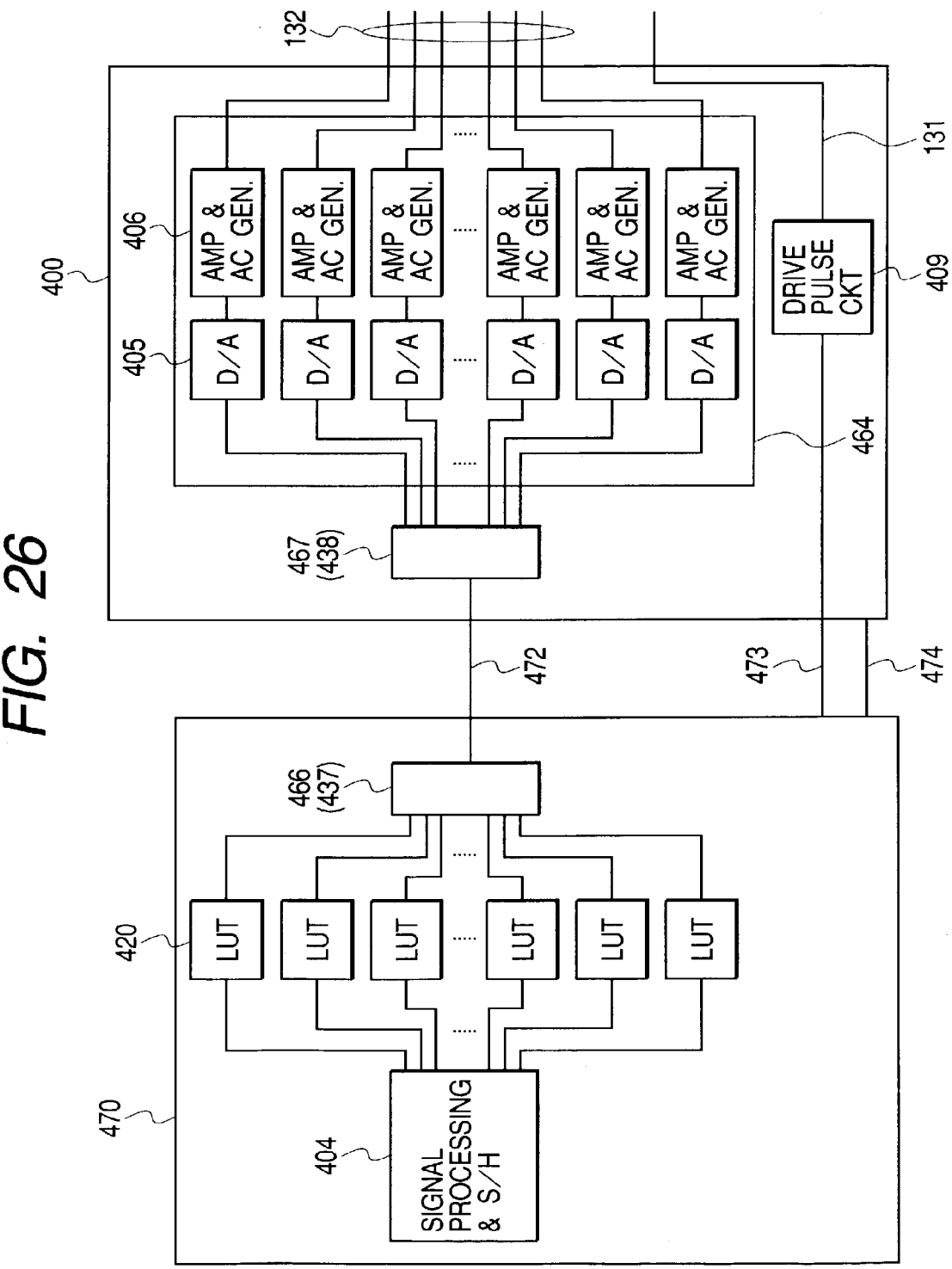
FIG. 26 is a schematic circuit diagram for describing a method of reducing the number of wiring lines of the liquid crystal display device according to the preferred embodiment of the present invention.

FIG. 26 shows a configuration for suppressing an increase in the number of wiring lines between the preprocessing circuit 470 and the liquid-crystal-panel-drive control circuit 400, by placing signal processing circuits such as the look-up tables 420 in the preprocessor circuit 470, and using the configuration for reducing the number of pins as illustrated in FIG. 25. In FIG. 26, a transmitter 466 has a function of the switch 437 for selecting one of the look-up tables 420 for outputting, and a receiver 467 has a function of the switch 438 for selecting its destination. When a phase expansion circuit is provided in the preprocessing circuit 470 and corrections are performed by using with look-up tables 420 in the preprocessing circuit 470, there arises a problem in that the number of wiring lines between the preprocessing circuit 470 and the liquid-crystal-panel-drive control circuit 400. However, it is possible to suppress the increase in the number of wiring lines by employing the circuit illustrated in FIG. 25.

Figure 27:
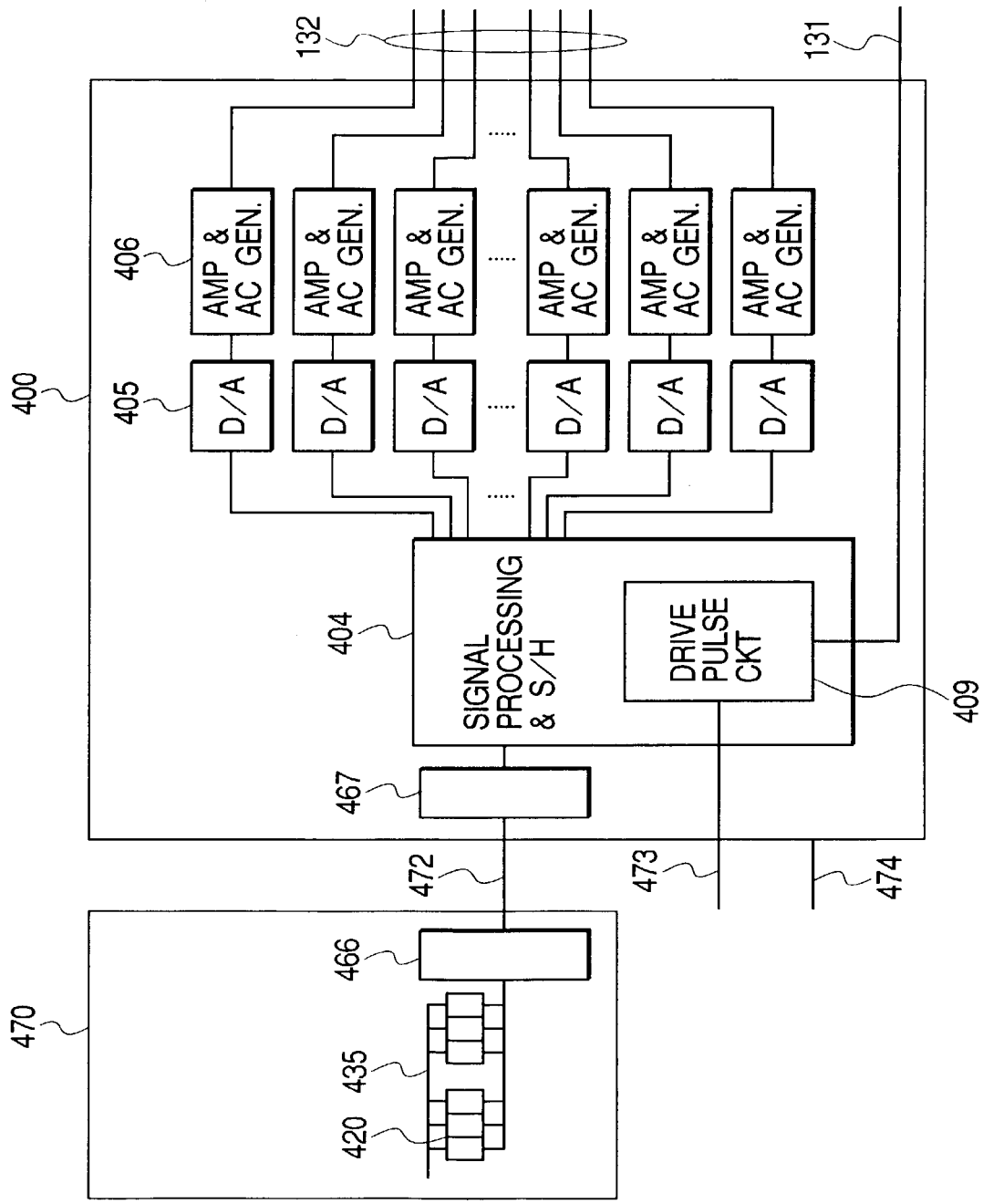
FIG. 27 is a schematic circuit diagram for describing a method of reducing the number of wiring lines of the liquid crystal display device according to the preferred embodiment of the present invention.

The following explains a configuration which enables a reduction in the number of wiring lines by referring to FIG. 27. In FIG. 27, the look-up tables 420 are located before the sample-and-hold circuit 404 for phase expansion. With the configuration illustrated in FIG. 27, it is possible to significantly reduce the number of wiring lines between the look-up tables 420 and the sample-and-hold circuit 404. As described above, the number of wiring lines is increased after the phase expansion. For example, the configuration shown in FIG. 12 needs data-transferring signal lines equal in number to the number of phases obtained by the phase expansion, between the sample-and-hold circuit 404 and the look-up tables 420. In the 12-phase expansion and 10-bit data for each of its phase components, the number of wiring lines is 120. On the other hand, in the case explained in connection with FIG. 27, only 10 wiring lines for 10 bits are needed.

For the look-up tables 420 shown in FIG. 27, display signals are transmitted to the video signal control circuit from external equipment in a specified order via the display signal line 402 (see FIG. 1). Therefore, if the order of arrangement of phase components obtained by the phase expansion is fixed in accordance with the order of the display signals, positions of the circuit configuration for the phase expansion and the correction circuit configuration can be interchanged without any problems. More specifically, when the data concerned are identified to be of the nth-phase component, it is possible to perform correction required for variations of the nth-phase component before its phase expansion.

The 10-bit data bus 435, for example, extends from the A/D converter 403. There are provided look-up tables 420 in number equal to the number of phases obtained by the phase expansion, and the data bus 435 is coupled to each of the look-up tables 420. The liquid-crystal-panel-drive control circuit 400 selects one to be corrected from among the plural look-up tables 420 by identifying the data of a phase component based upon the order in which data are output from the A/D converter 403.

In the circuit illustrated in FIG. 27, it is possible to place the look-up tables 420 in the preprocessing circuit 470. In this case, after performing a correction in the look-up table 420, the data are converted into small-amplitude signals in the transmitter 466, and are then input, via the cable 472, to the receiver 467 provided in the liquid-crystal-panel-drive control circuit 400. In the circuit shown in FIG. 27, it is also possible to perform the signal processing using the look-up tables 420 in the preprocessing circuit 470, and therefore, its control by the microprocessor 430 can be facilitated.

Figure 28:
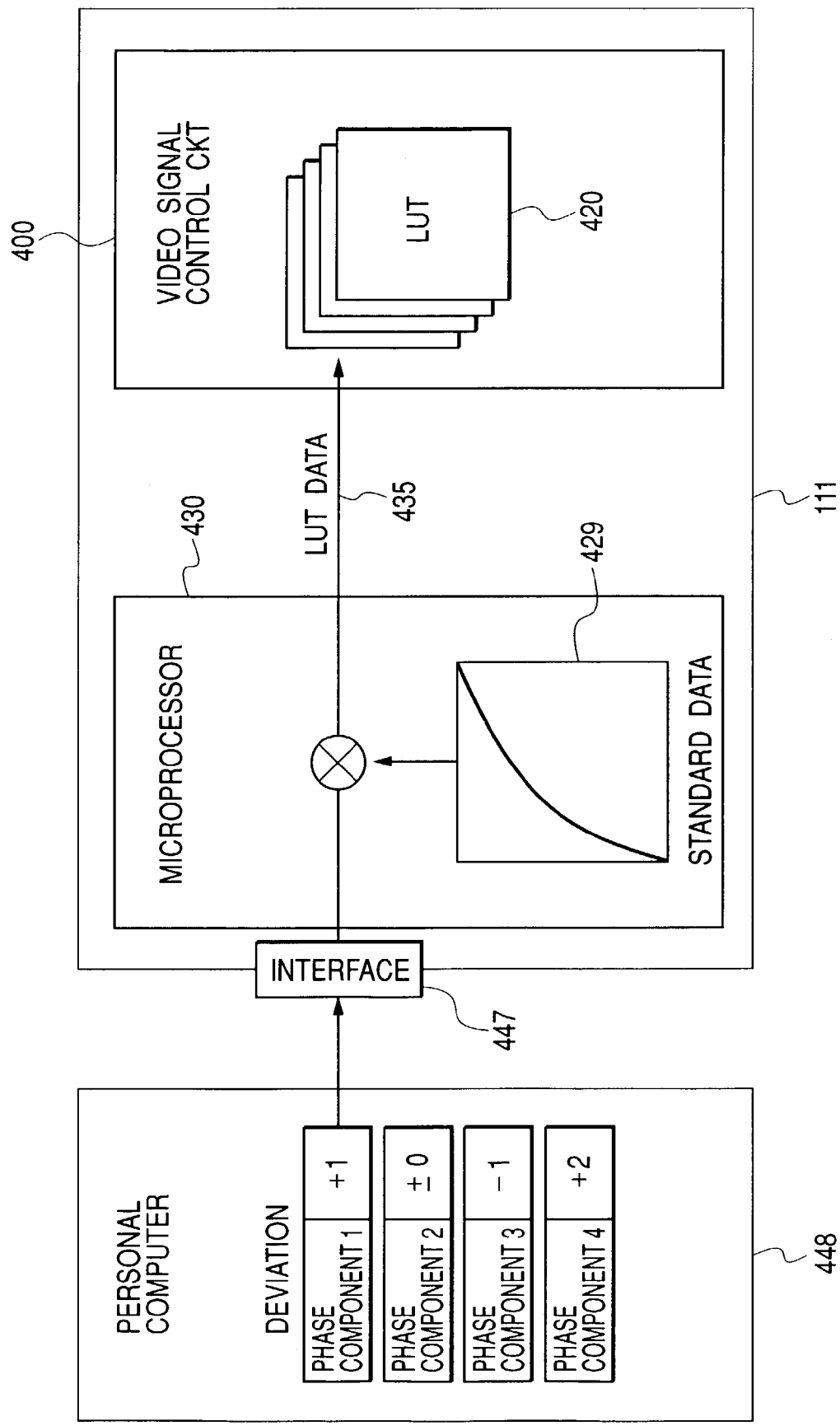
FIG. 28 is a schematic circuit diagram for describing a method of obtaining data in the look-up table of the liquid crystal display device according to the preferred embodiment of the present invention.

Next, data communication of look-up tables will be described by referring to FIG. 28. Consider a case in which the number of phase components obtained by phase expansion is 12 per primary color, 10-bit-data (2-byte-data) are provided for each of the phase components, and the number of gray scale steps is 256. Then, the amount of data to be set in the look-up tables is as follows:

for one primary color, 12 phases/color×2 bytes/phase×256 gray-scale steps=6,144 bytes; and for three primary colors, 6,144 bytes×3 colors=18,432 bytes.

For example, when a method is employed in which look-up table data are stored in an external personal computer 448, and the data are taken into the look-up tables 420 by using data communication with the microprocessor 430 in the preprocessing circuit 470, it will take at least 15 seconds if the communication between the personal computer 448 and the microprocessor 430 is performed at the rate of 9,600 bps using the RS-232C (Recommended Standard by the Electronics Industries Association). Reference numeral 447 denotes an interface section for data communication. The data communication between the personal computer 448 and the microprocessor 430 is not limited to the RS-232C (Recommended Standard by the Electronics Industries Association), but it can also use other means (e.g., USB (Universal Serial Bus), IEEE 1,394, SCSI (Small Computer System Interface), Bluetooth, etc.).

If a case is considered in which the above-explained amount of the data is stored in a memory such as a RAM or a ROM incorporated in the display control device 111, a problem arises in that the data occupy a memory area equivalent to as many as 18,432 bytes.

To reduce the required communication time and save internal memory, a method is employed in which the data are divided into standard data 429 for gamma correction and deviations from the standard data. As explained above, the deviations are set as optimum factors by observing the image display transmitted from external equipment (a personal computer). As explained above, the look-up table data are created by multiplying the standard data 429 by factors within the display control device 111. With this arrangement, it is possible to take data into the look-up tables without increasing the amount of data of communication between the personal computer and the microprocessor, or using a large portion of the internal memory area.

Figure 29:
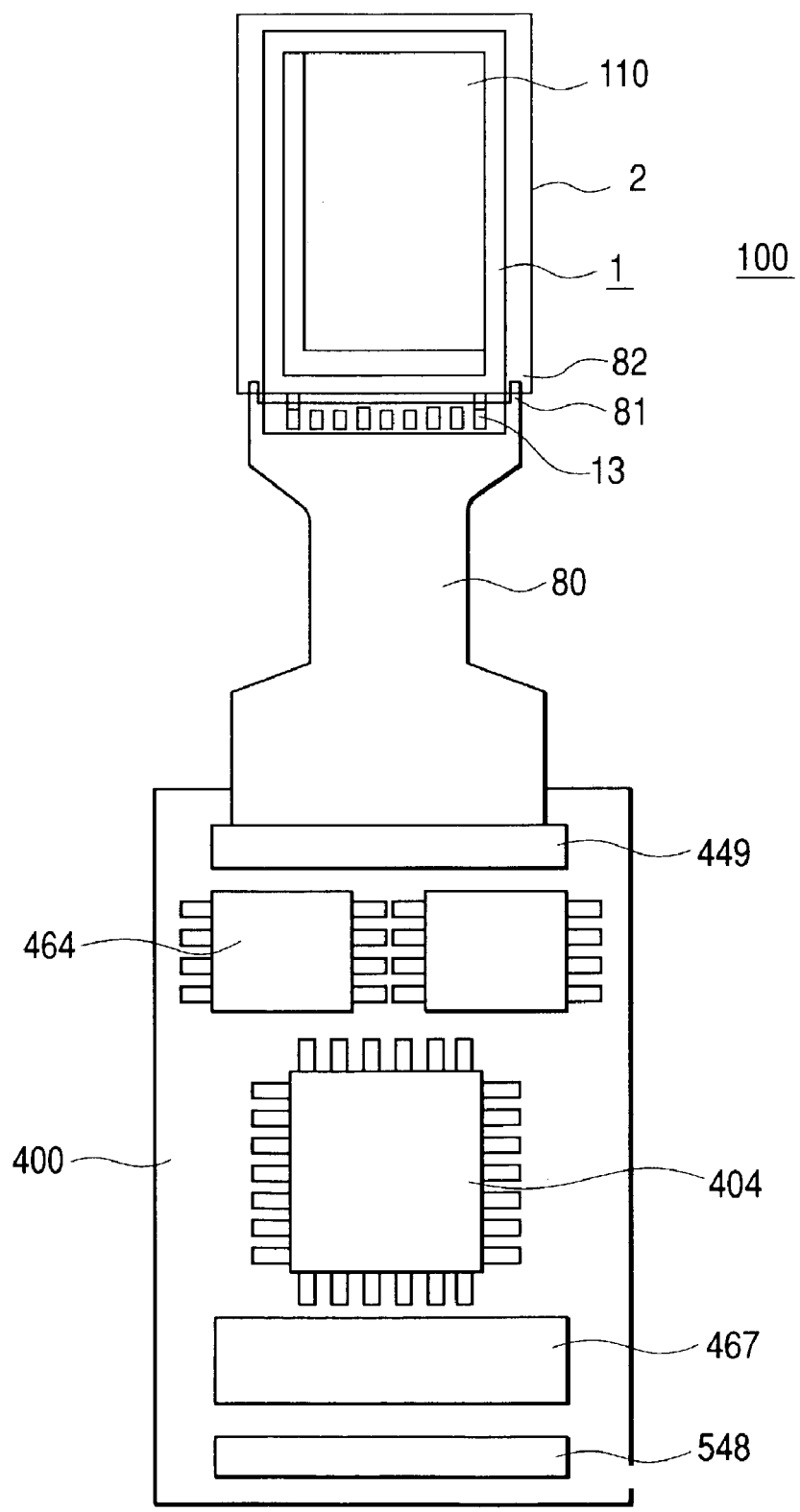
FIG. 29 is a schematic plan view showing the liquid crystal display device according to the preferred embodiment of the present invention.

FIG. 29 illustrates a configuration where the, liquid-crystal-panel-drive control circuit 400 is connected to the liquid crystal panel 100 via a flexible substrate 80. The receiver 467, the signal processing circuit 404 and the analog driver circuit 464 are disposed on a substrate to constitute the liquid-crystal-panel-drive control circuit 400. Reference numeral 548 denotes a connector adapted to be coupled to the cable 471 (not shown in FIG. 29, but see FIG. 6). Reference number 449 is also a connector coupled to the flexible substrate 80 which transmits outputs from the liquid-crystal-panel-drive control circuit 400 to the liquid crystal panel 100. The flexible substrate 80 is coupled to a terminal 13 provided on a substrate 1 using an anisotropic conductive film or the like. Furthermore, a terminal 81 is formed on the flexible substrate 80 and is also coupled to a transparent conductive film 82 disposed on a substrate 2 using another anisotropic conductive film or the like.

Figure 30:
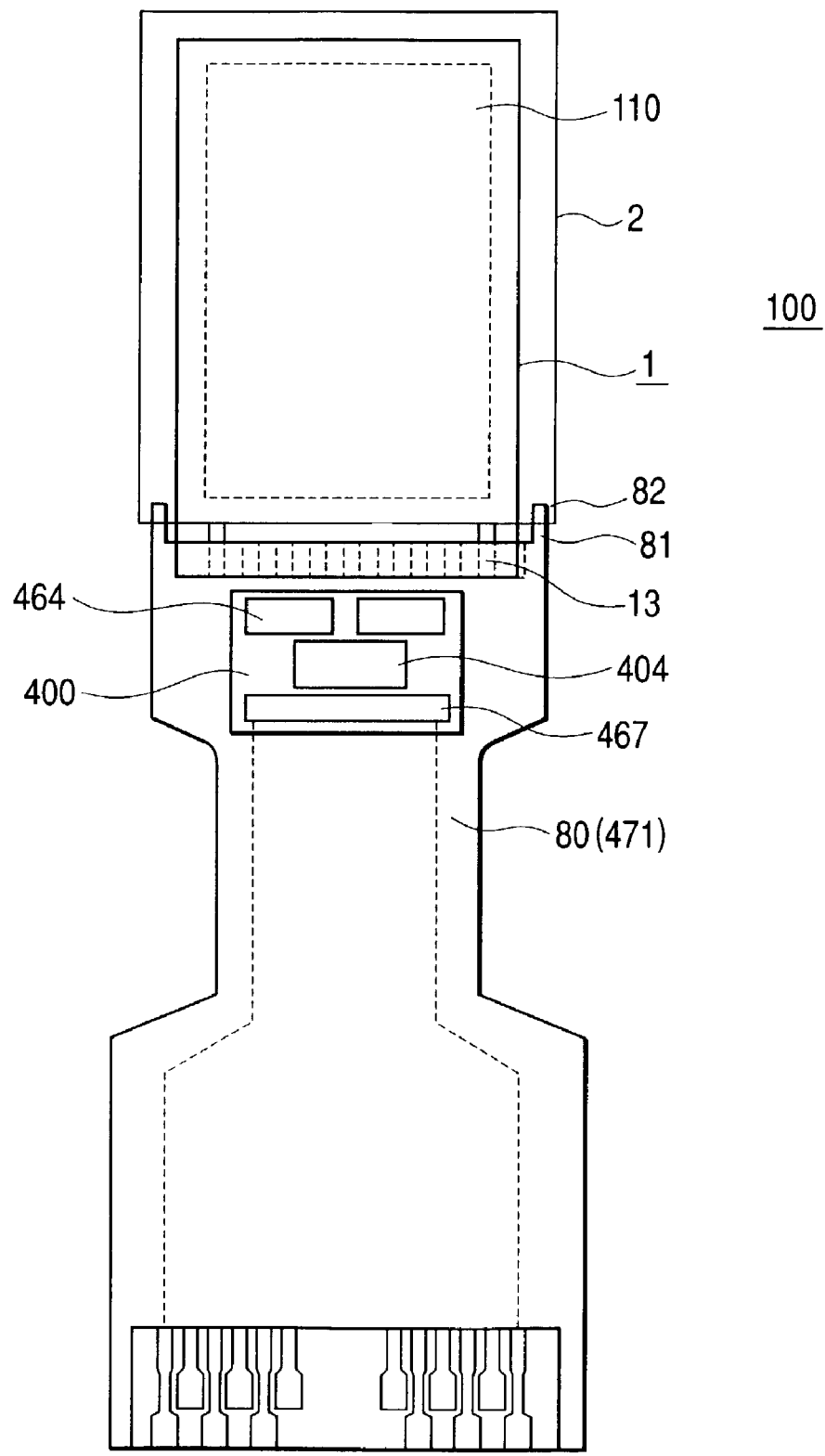
FIG. 30 is a schematic plan view showing the liquid crystal display device according to the preferred embodiment of the present invention.

FIG. 30 illustrates a configuration in which the liquid-crystal-panel-drive control circuit 400 is formed on the flexible substrate 80. The flexible substrate 80 coupled to the liquid crystal panel 100 also plays the role of the cable 471 to be coupled to the preprocessor circuit 470, and a substrate on which the liquid-crystal-panel-drive control circuit 400 is disposed is coupled to the flexible substrate 80. Incidentally, it is possible to mount the receiver 467, the signal processing circuit 404 and the analog driver circuit 464 directly on the flexible substrate 80. Further, it is also possible to fabricate the receiver 467, the signal processing circuit 404 and the analog driver circuit 464 into a single chip and mount it on the flexible substrate 80.

Figure 31:
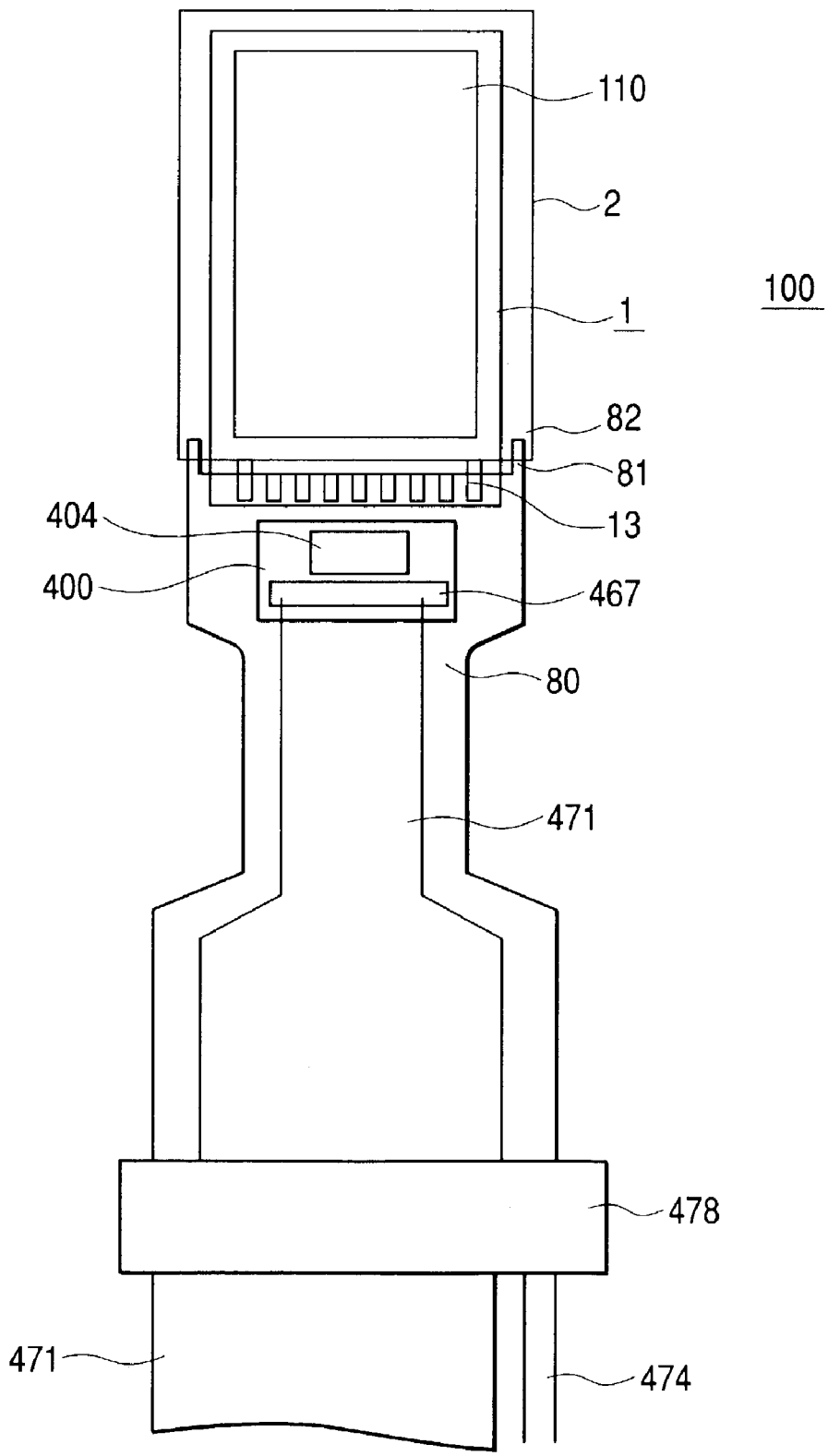
FIG. 31 is a schematic plan view showing the liquid crystal display device according to the preferred embodiment of the present invention.

FIG. 31 shows a configuration in which an A/D converter is provided in the liquid crystal panel 100 and digital signals are output from the liquid-crystal-panel-drive control circuit 400. The liquid-crystal-panel-drive control circuit 400 is not provided with the analog driver circuit 464. Reference number 474 denote power-supply lines, and reference number 478 is a connector. The liquid crystal panel 100 generates gray-scale voltages for the D/A conversion, and the power-supply lines 474 provided separately from the cable 471 are capable of supplying stable voltages the liquid crystal panel 100.

Figure 32:
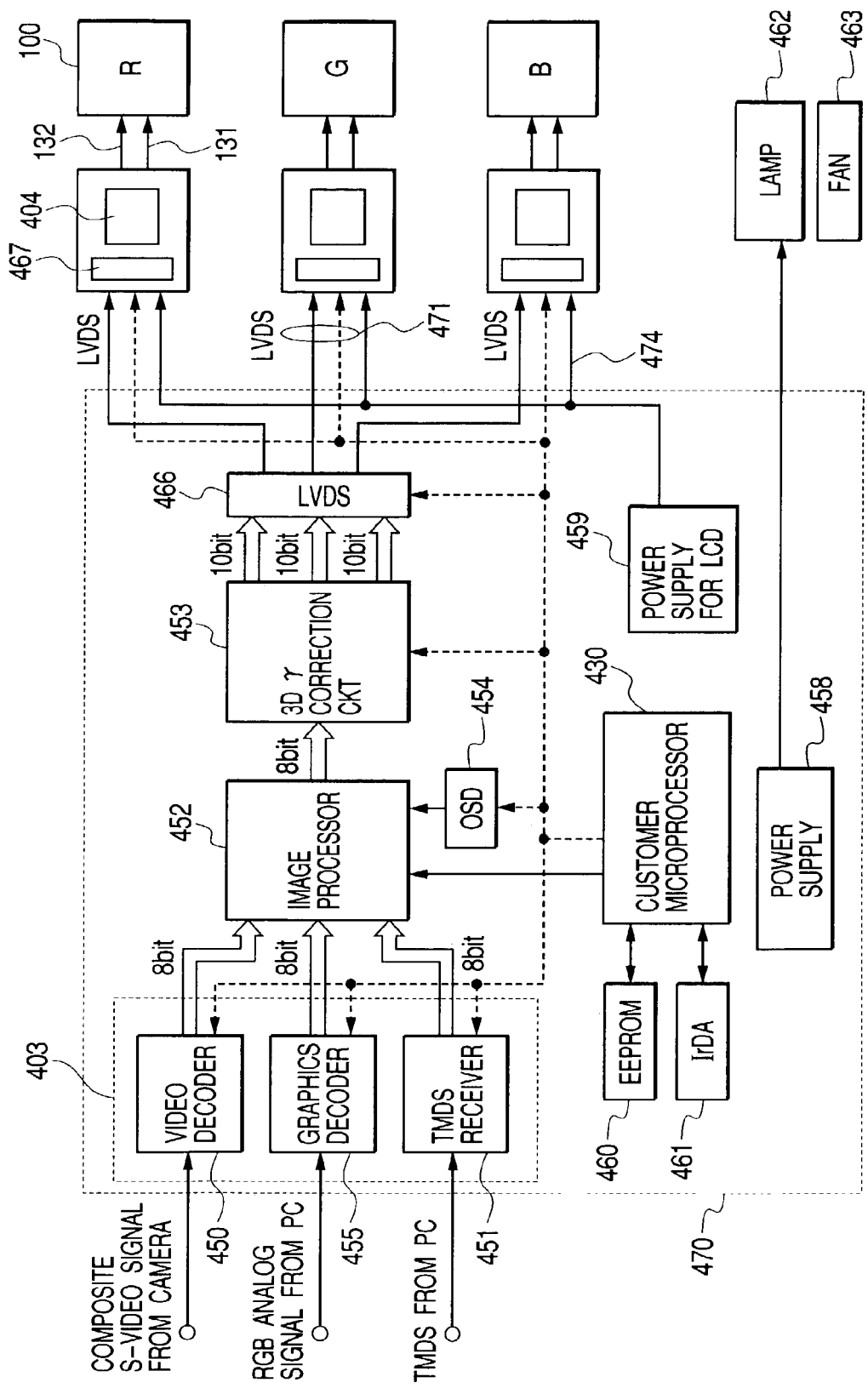
FIG. 32 is a circuit configuration diagram of the projector which uses the liquid crystal display device according to the preferred embodiment of the present invention.

FIG. 32 shows a block diagram of a liquid crystal projector in which the liquid crystal panels 100 are supplied with input signals in digital form. The liquid-crystal-panel-drive control circuits 400 each are provided with the receiver 467 and the signal processing circuit 404, and power-supply lines 474 are provided separately from the cables 471, and the power is supplied from the power supply 459 through the power-supply lines 474.

Figure 33:
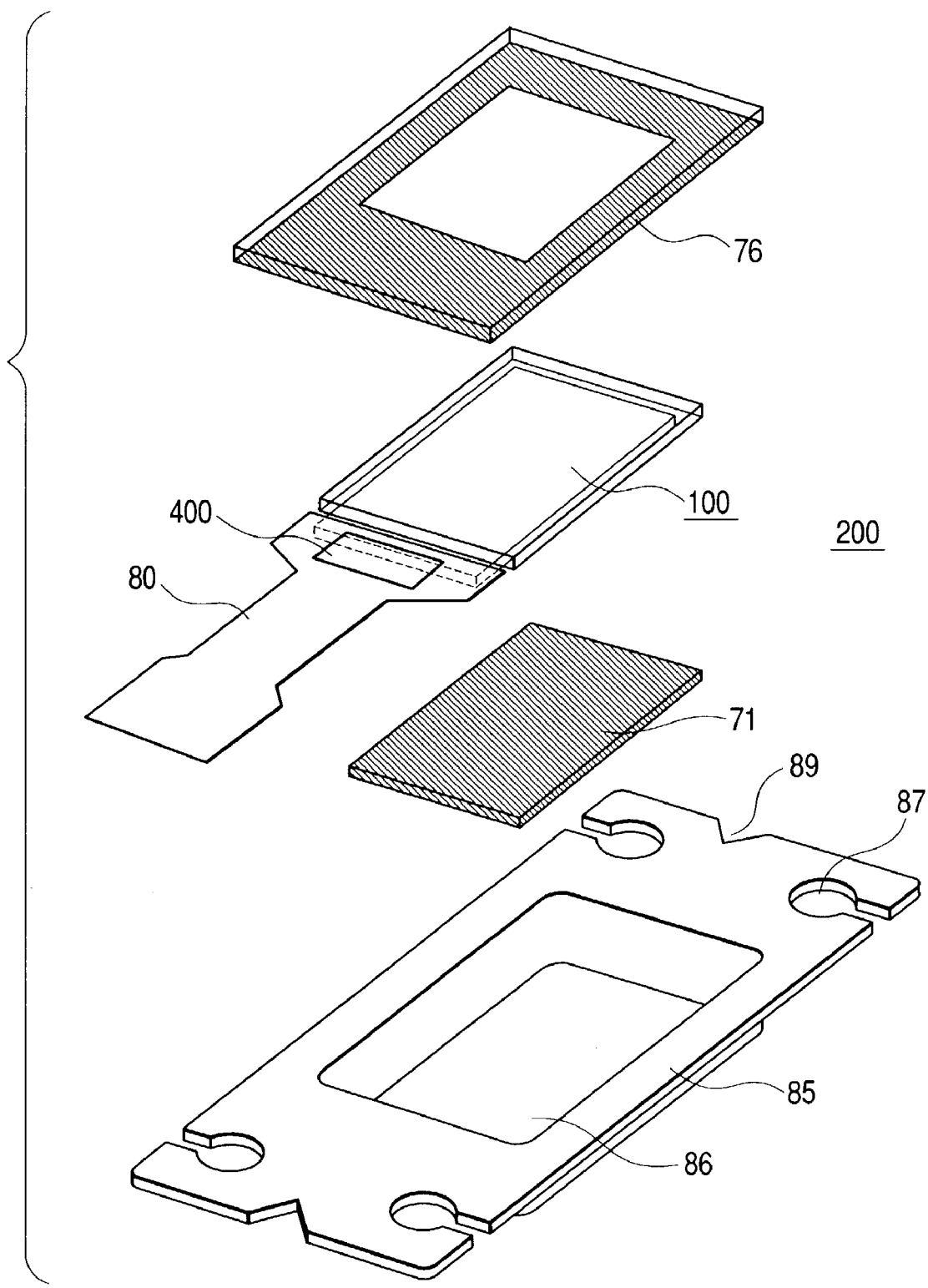
FIG. 33 is a schematic exploded view of the liquid crystal display device according to the preferred embodiment of the present invention.

FIG. 33 is an exploded view of components constituting a liquid crystal display device 200. Reference numeral 85 is a case made of an Sn-plated 42 Alloy (ASTM F30). A recess 86 is formed on the case 85, and the liquid crystal panel 100 is housed in the recess 86. Reference numeral 71 is a heat sink compound and delivers heat from the liquid crystal panel 100 to the case 85 for radiation of the heat. Reference numeral 87 is a fixation hole through which the liquid crystal display device 200 is fixed to external equipment. An opening is bored in a light-blocking peripheral frame 76 so that it defines the display section 110. Reference numeral 89 is an outside reference notch and provides an outside dimension reference of the liquid crystal display device 200. The liquid-crystal-panel-drive control circuit 400 is mounted on the flexible substrate 80.

FIG. 34A is a schematic plan view of the liquid-crystal-panel-drive control circuit 400 coupled to the liquid crystal display device 200, and FIG. 34B is a schematic sectional view of the liquid-crystal-panel-drive control circuit 400 of FIG. 34A folded over the liquid crystal display device 200. In FIGS. 34A and 34B, the liquid-crystal-panel-drive control circuit 400 is formed on a substrate, and the liquid-crystal-panel-drive control circuit 400 is connected to the liquid crystal panel 100 via the flexible substrate 80. FIG. 34B shows a case where the flexible substrate 80 is folded back so that the liquid-crystal-panel-drive control circuit 400 is disposed at the back of the liquid crystal display device 200. As explained above, the opening is made in the light-blocking peripheral frame 76 to expose the display section 110.

As shown in FIG. 34B, folding back of the flexible substrate 80 makes it possible to use the back side of the liquid crystal display device 200 so as to set up the liquid-crystal-panel-drive control circuit 400 thereon. Since the liquid crystal display device 200 is of the reflective type, light comes enters the front surface of the liquid crystal panel 100. Therefore, it is probable that the back side of the liquid crystal display device 200 will not be used in the optical system. Although the components of the optical system are placed in a complex arrangement in the vicinity of the liquid crystal panel 100, it becomes possible to obtain a space for placing the liquid-crystal-panel-drive control circuit 400 in the optical engine, by placing the liquid-crystal-panel-drive control circuit 400 behind the liquid crystal display device 200.

FIGS. 35A and 35B are a plan view and a cross-sectional view, respectively, of the liquid crystal display device 200 having the liquid-crystal-panel-drive control circuit 400 disposed on the flexible substrate 80. Irradiation of intense light onto the liquid-crystal-panel-drive control circuit 400 is prevented by providing the liquid-crystal-panel-drive control circuit 400 below the light-blocking peripheral frame 76. In addition, with the arrangement shown in FIGS. 35A and 35B, it is possible to incorporate the liquid-crystal-panel-drive control circuit 400 in the liquid crystal display device 200, thus increasing flexibility in design of the optical system. In FIGS. 34A, a portion of the light-blocking peripheral frame 76 is omitted to facilitate of understanding of the location of the liquid-crystal-panel-drive control circuit 400.

Figure 36A:
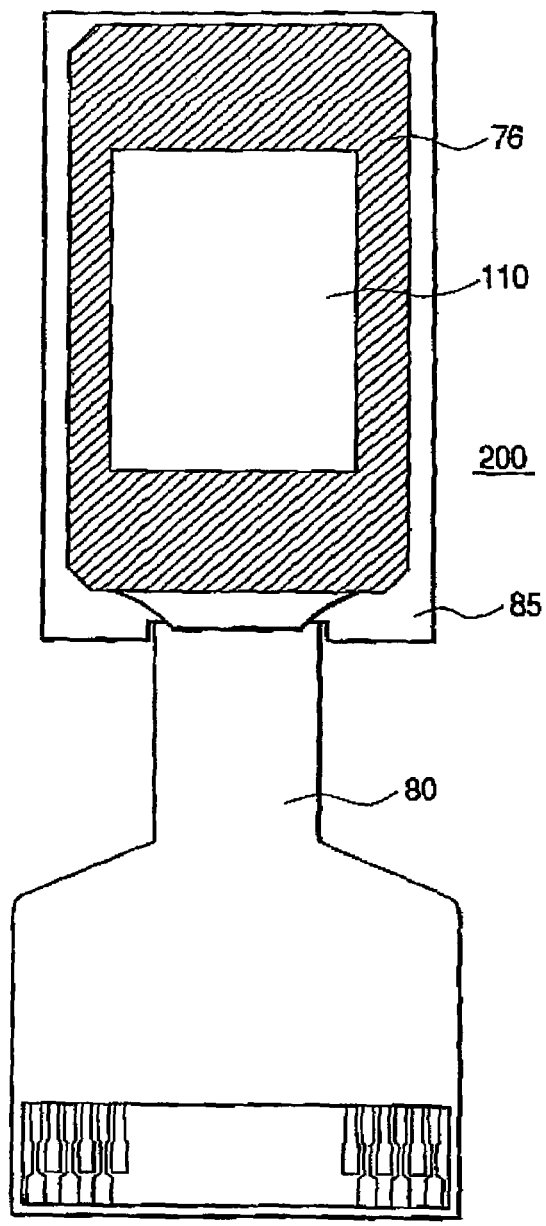
FIGS. 36A and 36B are respectively a schematic plan view and a schematic section view showing the liquid crystal display device according to the preferred embodiment of the present invention.
Figure 36B:
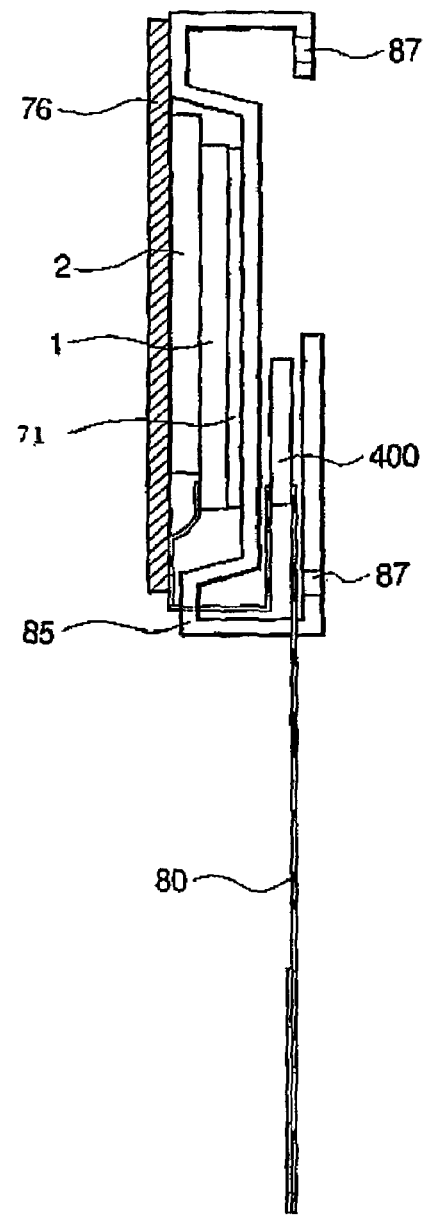

FIGS. 36A and 36B are a plan view and a cross-sectional view, respectively, of a configuration in which a portion of the package 85 is folded over the back of the liquid crystal panel 100 to support the liquid-crystal-panel-drive control circuit 400. fixation holes are provided in the portion folded back over the back of the liquid crystal panel 100. The configuration illustrated in FIGS. 36A and 36B reduces the area occupied by the liquid crystal display device 200 such that the area is approximately equal to that of the display section 110, thus realizing a compact liquid crystal display device.

Figure 37:
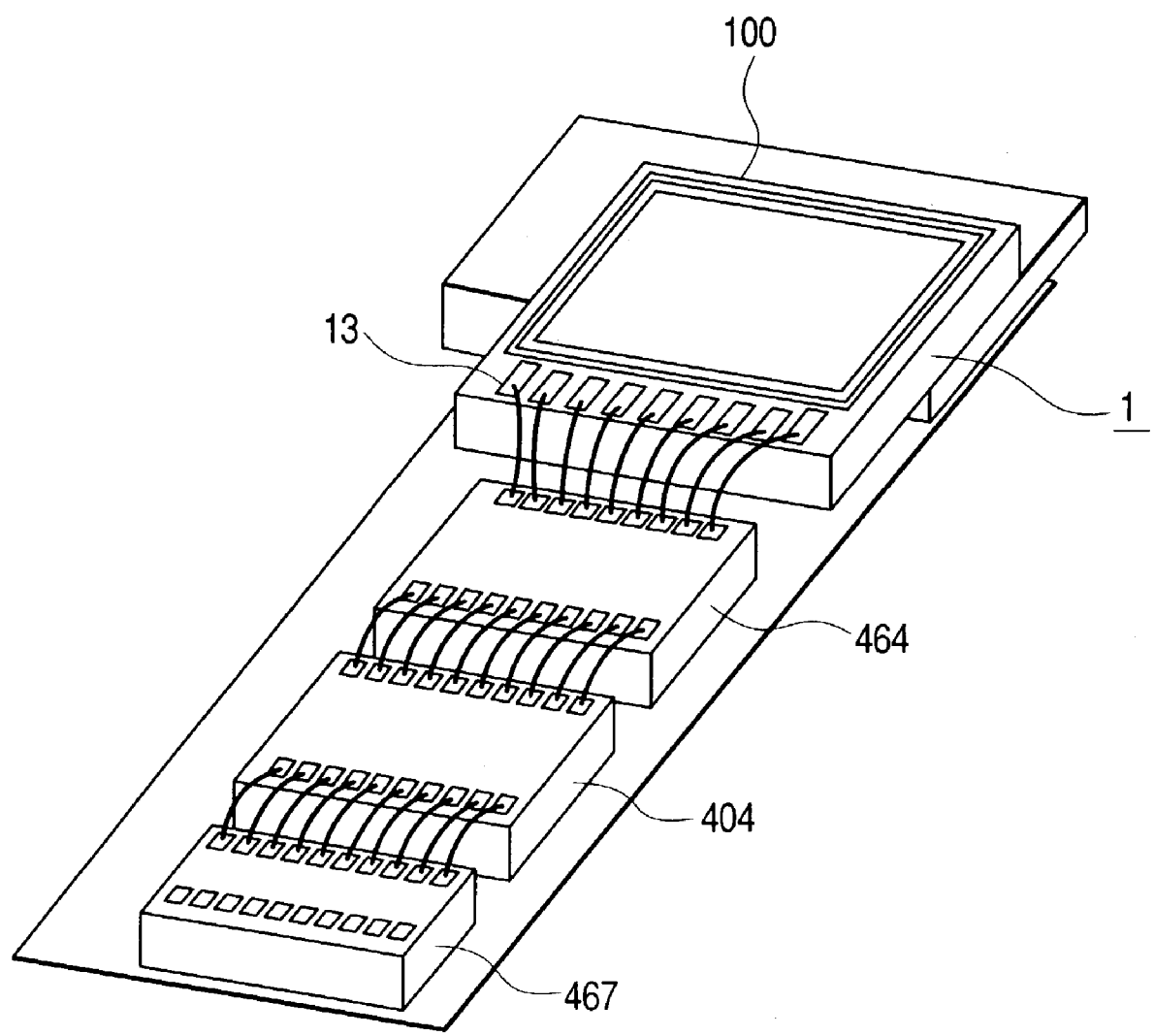
FIG. 37 is a schematic perspective diagram showing the liquid crystal display device according to the preferred embodiment of the present invention.

FIG. 37 is a schematic perspective view of the liquid-crystal-panel-drive control circuit 400 is arranged in a plane containing the liquid crystal display panel 100 by forming the liquid-crystal-panel-drive control circuit 400 in multi-chip structure. The substrate 1 of the liquid crystal panel 100 is a semiconductor substrate, it is possible to use a mounting method similar to that for the receiver 467, the signal processing circuit 404 and the analog driver circuit 464. In FIG. 37, IC (Integrated Circuit) chips are wire-bonded together.

Figure 38:
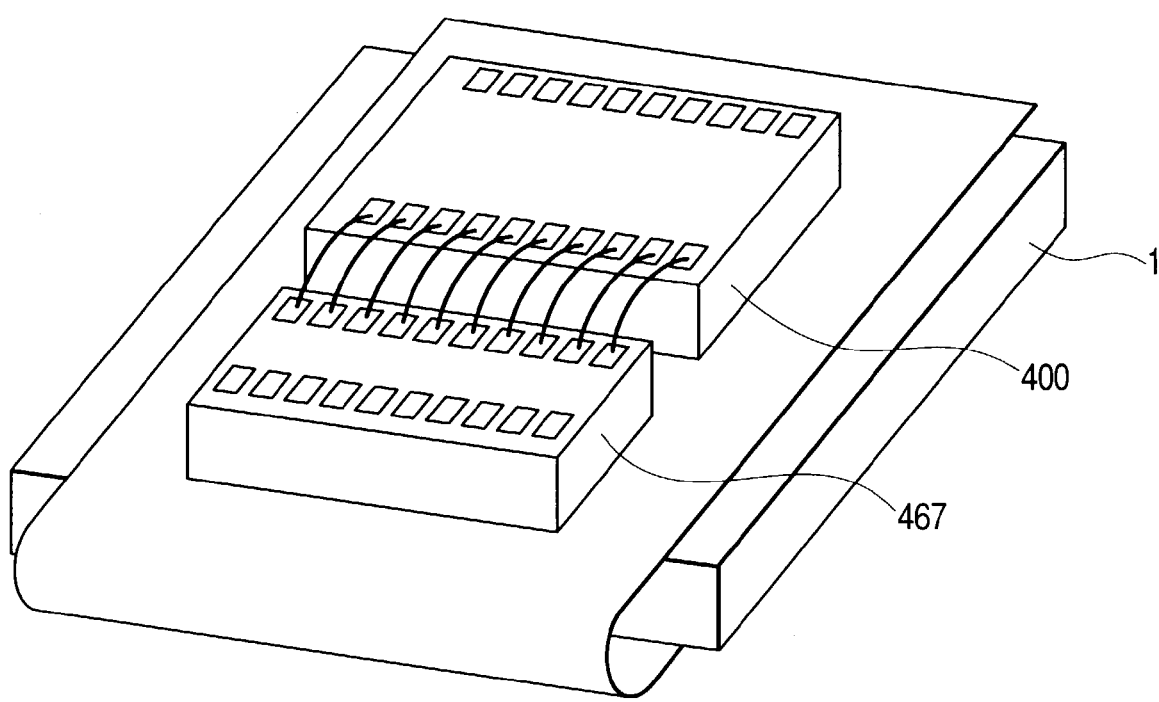
FIG. 38 is a schematic perspective diagram showing the liquid crystal display device according to the preferred embodiment of the present invention.

FIG. 38 illustrates an example in which the liquid-crystal-panel-drive control circuit 400 is disposed behind the liquid crystal panel 100. The liquid-crystal-panel-drive control circuit 400 is fabricated as a single chip.

Figure 39A:
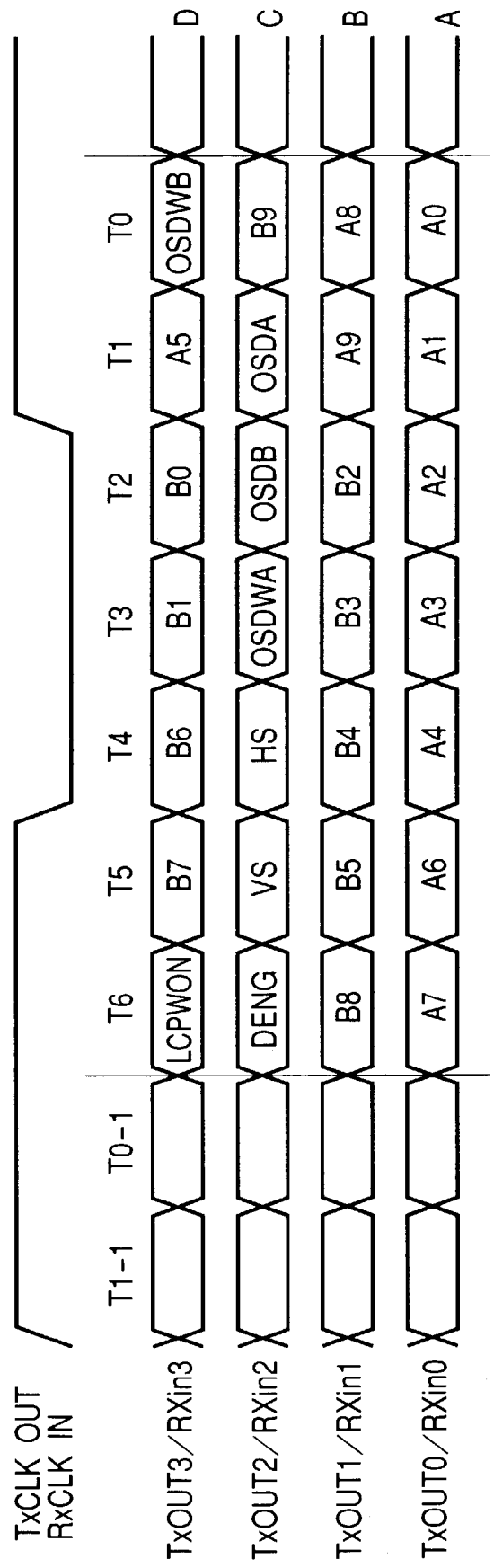
FIGS. 39A, 39B and 39C are schematic diagrams showing a method of transferring signals of the liquid crystal display device according to the preferred embodiment of the present invention.

FIG. 39A shows an example of input signals supplied to the liquid-crystal-panel-drive control circuit 400 complying with the LVDS (Low Voltage Differential Signaling) system. The example of the input signals shown in FIG. 39A is an example applicable to the present invention, and the present invention can be applied in a variety of manners, of course, without departing from the spirit of the present invention.

Figure 39B:
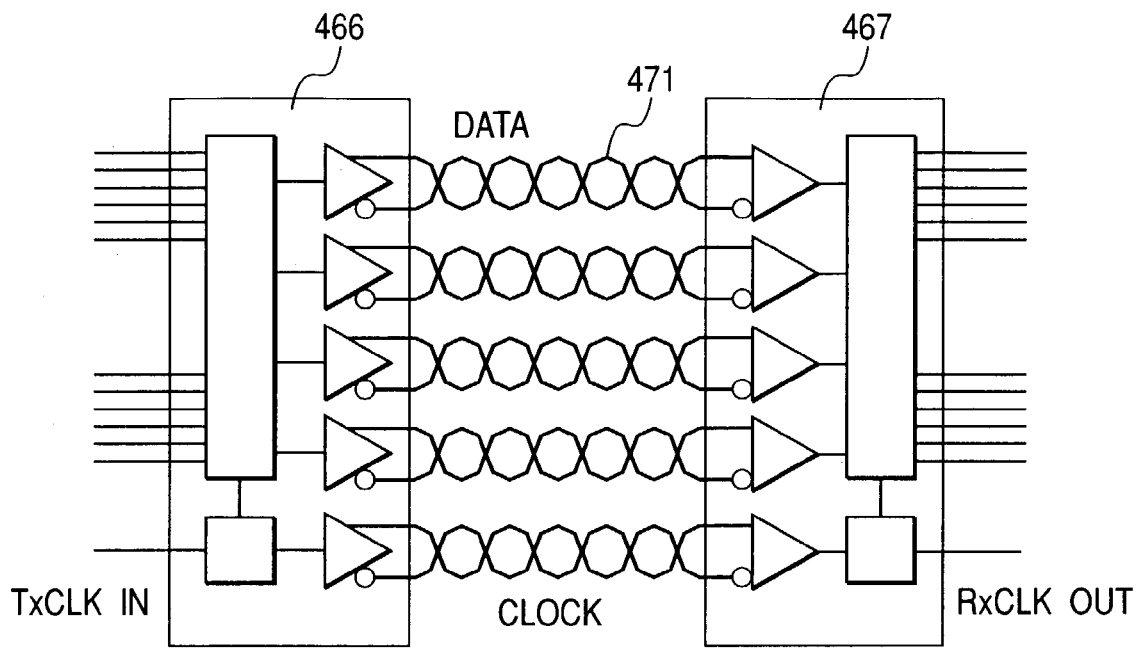
Figure 39C:
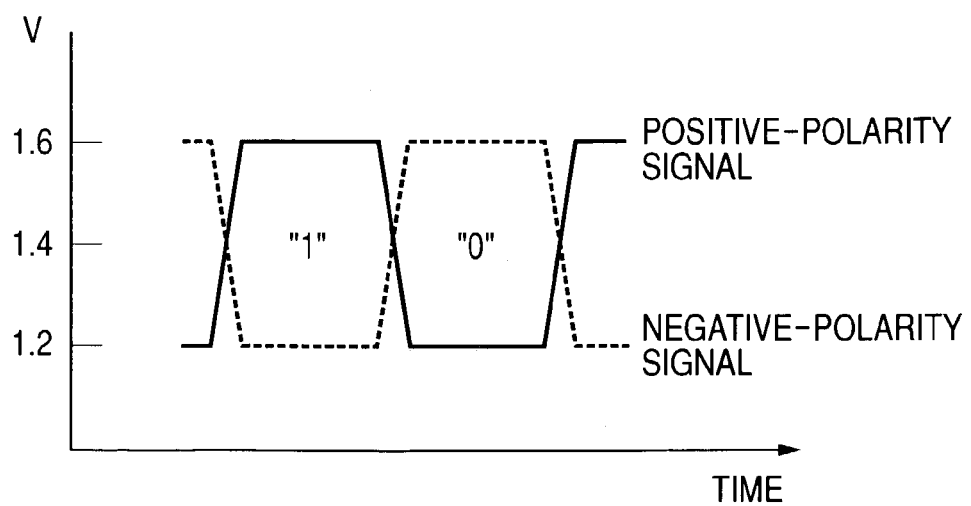

FIG. 39B illustrates a configuration of the transmitter 466 and the receiver 467, and FIG. 39C is a diagram for explaining the signal format of the LVDS (Low voltage Differential Signaling) transfer system and their signal levels. In the LVDS transfer system, signals of "1" and "0" are transmitted after converting them to small-amplitude differential-mode signals, i.e., signals comprising a combination of the two signals. In the case of FIG. 39C, one signal of the two signals is referred to as a positive-polarity signal, and the other as a negative-polarity signal, and the conversion is performed such that a positive-polarity signal of a signal representing "1" changes to a higher voltage level than its negative-polarity signal, and a positive-polarity signal of a signal representing "0" changes to a lower voltage level than its negative-polarity signal.

As shown in FIG. 39B, the transmitter 466 is connected to the receiver 467 via the twisted-pair wiring 471. In FIG. 39B, four pairs of data lines and a pair of clock lines are used to transfer data. FIG. 39A shows an example in which odd-numbered 10-bit data prefixed with a character A, even-numbered 10-bit data prefixed with a character B, and the remaining eight control signals are transmitted by the four pairs of data lines.

Figure 40:
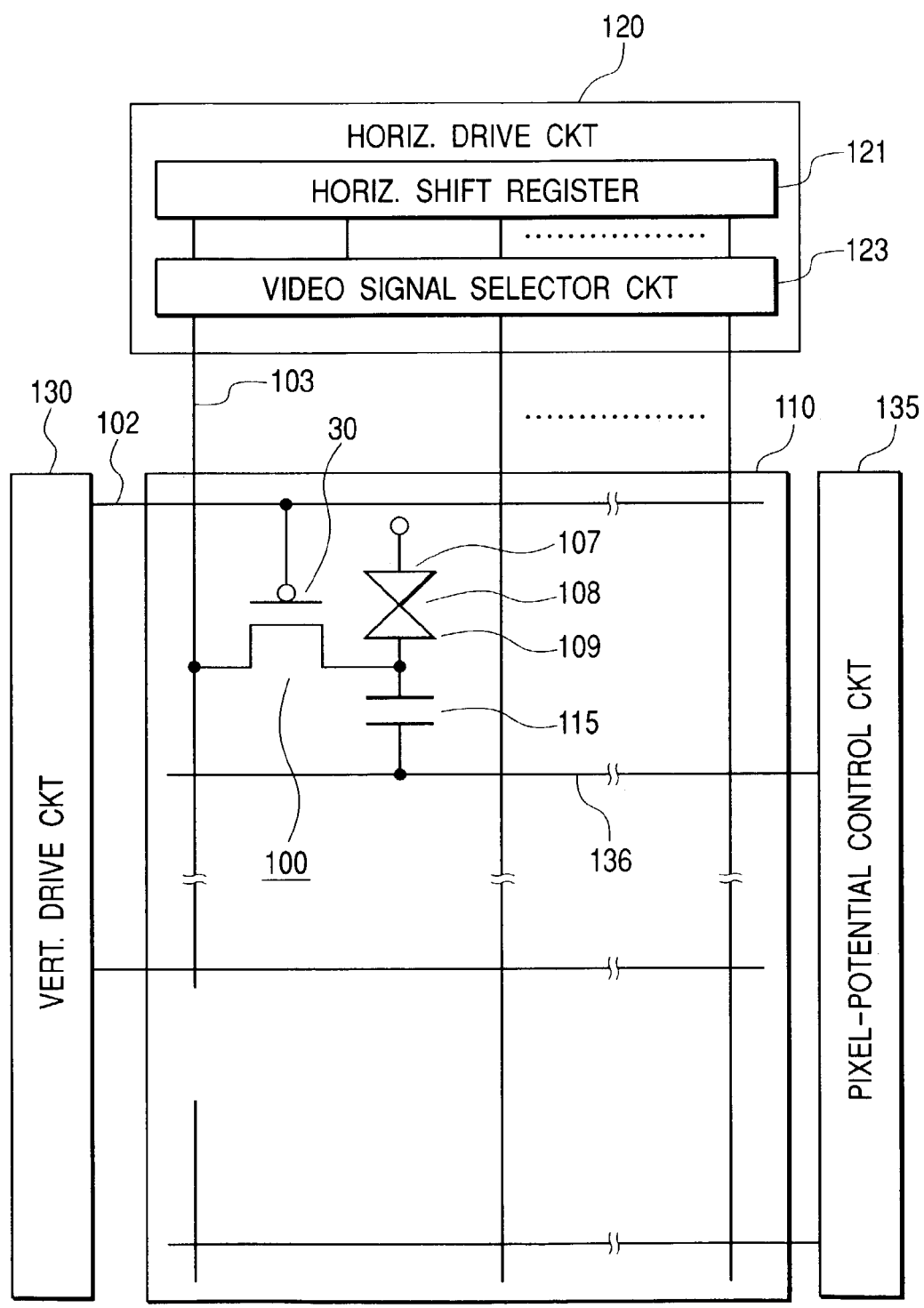
FIG. 40 is a block diagram describing a pixel section of the liquid crystal display device according to the preferred embodiment of the present invention.

Next, the pixel section 101 will be explained by referring to FIG. 40, and further, the following explains a method of driving by varying a potentials on a pixel electrode by using a pixel-potential control circuit. FIG. 40 is a circuit diagram showing an equivalent circuit of the pixel section 101. Each of the pixel sections 101 is disposed in an area surrounded by two adjacent ones of the scanning signal lines 102 and two adjacent ones of the video signal line 103 of the display section 110, and the pixel sections 101 are arranged in a matrix configuration. In FIG. 40, however, only one of the pixel sections 101 is shown to simplify the diagram. Each pixel section 101 has an active element 30 and a pixel electrode 109, and a pixel capacitance 115 is coupled to the pixel electrode 109. One electrode of the pixel capacitance 115 is coupled to the pixel electrode 109, and the other electrode is coupled to the pixel-potential control line 136. The pixel-potential control line 136 is connected to the pixel-potential control circuit 135. In FIG. 40, the active element 30 is represented by a p-type transistor.

As described above, a scanning signal is output to the scanning signal line 102 from the vertical drive circuit 130. The scanning signal is used to perform on-or-off control of the active element 30. A gray scale voltage is supplied as a video signal to the video signal line 103. When the active element 30 is turned on, the gray scale voltage is supplied to the pixel electrode 109 from the video signal line 103. The counter electrode 107 (the common electrode) is disposed to face the pixel electrode 109, and a liquid crystal layer (not shown) is sandwiched between the pixel electrode 109 and the counter electrode 107. The circuit diagram of FIG. 40 is so illustrated that an equivalent capacitance 108 due to the liquid crystal layer is coupled between the pixel electrode 109 and the counter electrode 107. A display is produced by applying a voltage between the pixel electrode 109 and the counter electrode 107, thereby changing orientation and others of liquid crystal molecules, and causing changes in properties of the liquid crystal layer against light.

In driving of the liquid crystal display device, an ac driving is employed as explained above, to prevent a dc current from being applied across the liquid crystal layer. To perform the ac driving, a potential of the counter electrode 107 is set as a reference potential, and a positive-polarity voltage and a negative-polarity voltage with respect to the reference potential are output as gray scale voltages from the video signal selector circuit 123. However, when the video signal selector circuit 123 is designed to be a high-withstand-voltage circuit capable of withstanding the positive-polarity voltage and the negative-polarity voltage, a problem arises in that the size of circuits including the active element 30 becomes larger, and operation speed is reduced. In addition, as shown in FIG. 19, the liquid-crystal-panel-drive control circuit 400 requires the positive-polarity-voltage-associated operational amplifier and the negative-polarity-voltage-associated operational amplifier.

Therefore, the present inventors studied an ac driving by supplying video signals of the same polarity with respect to the reference potential at all times to the pixel electrode 109 from the video signal selector circuit 123. For example, the video signal selector circuit 123 outputs a gray scale voltage of a positive polarity with respect to the reference potential. First the positive-polarity voltage with respect to the reference potential is written into a pixel electrode, and then by lowering the voltage of the pixel-potential control signal applied to an electrode of the pixel capacitance 115 from the pixel-potential control circuit 135, thereby reducing the voltage of the pixel electrode 109, a negative-polarity voltage with respect to the reference voltage can be generated on the pixel electrode 109. In this case, it is necessary that a polarity of a data corresponding to the negative-polarity voltage is reversed from that of a data corresponding to the positive-polarity voltage so that the negative-polarity voltage is a mirror image of the positive-polarity voltage with respect to the reference voltage. This driving method makes possible use of a low-withstand-voltage circuit as the video signal selector circuit 123 because of a small difference between the maximum and minimum voltages to be output from the video signal selector circuit 123. Here, the above explanation is made, as an example, of a case where initially the positive-polarity voltage is written into the pixel electrode 109, and then the negative-polarity voltage is generated on the pixel electrode 109 by using the pixel-potential control circuit 135, and it is also possible to generate a positive-polarity voltage on the pixel electrode 109 by raising the voltage of the pixel-potential control signal after initially writing a negative-polarity voltage on the pixel electrode 109.

Figure 41A:
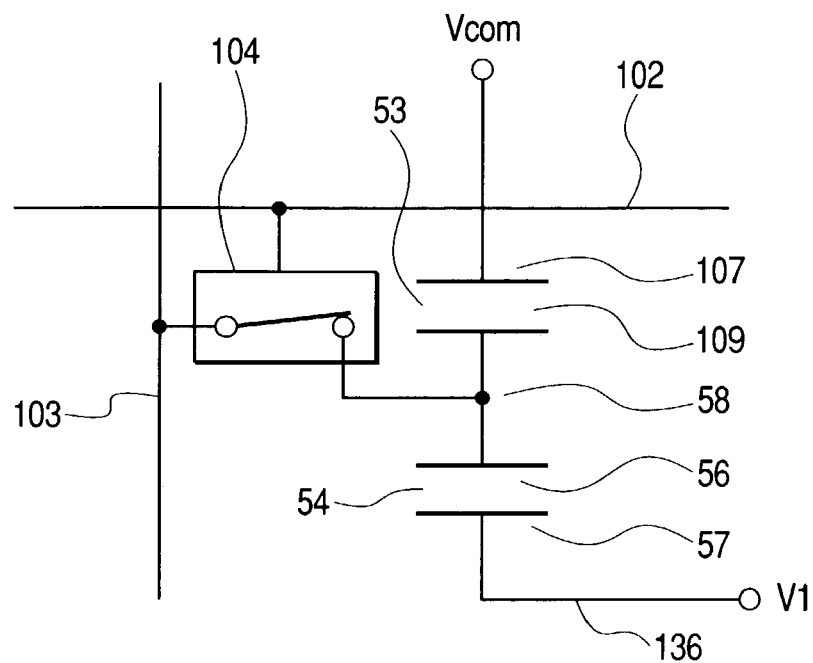
FIGS. 41A and 41B are schematic circuit diagrams describing a method of controlling the pixel potential of the liquid crystal display device according to the preferred embodiment of the present invention.
Figure 41B:
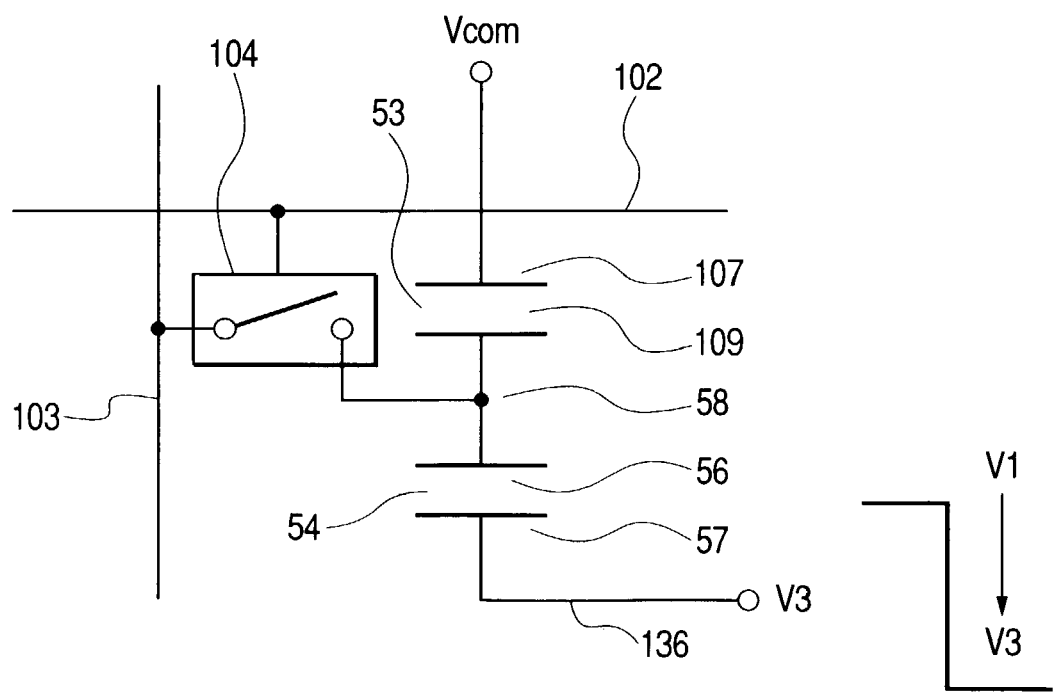

Next, a method of varying voltages on the pixel electrode 109 will be described by referring to FIGS. 41A and 41B. In FIGS. 41A and 41B, the liquid crystal capacitance 108 is represented by a first capacitor 53, the pixel capacitance 115 by a second capacitor 54 and the active element 30 by a switch 104, just for the purpose of explanation. An electrode of the pixel capacitance 115 to be coupled to the pixel electrode 109 shall be an electrode 56, and an electrode of the pixel capacitance 115 to be coupled to the pixel-potential control line 136 shall be an electrode 57. A connection point of the pixel electrode 109 and the electrode 56 is shown as a node 58. Here, for the explanation purpose, other parasitic capacitances are assumed to be negligible, and a capacitance of the first capacitor 53 is CL and a capacitance of the second capacitor 54 is CC.

First, as shown in FIG. 41A, a voltage V1 is externally applied to the electrode 57 of the second capacitor 54. Then, when the switch 104 is turned on by a scanning signal, a voltage is supplied to the pixel electrode 109 and the electrode 56 from the video signal line 103. Here, a voltage supplied to the node 58 shall be V2.

Next, as shown in FIG. 41B, the voltage (pixel-potential control signal) supplied to the electrode 57 is lowered from V1 to V3, when the switch 104 is turned off. At this time, since the total amount of electric charge charged in the first capacitor 53 and the second capacitor 54 does not change, the potential at the node 58 will change to: V2−{CC/(CL+CC)}×(V1−V3).

Here, if the capacitance CL of the first capacitor 53 is sufficiently smaller than the capacitance CC of the second capacitor 54 (CL<<CC), it will be CC/(CL+CC)≈1, and the voltage at the node 58 will be: V2−V1+V3. Here, if V2=0 and V3=0, the voltage at the node 58 will be −V1.

With the method explained above, the voltage supplied to the pixel electrode 109 from the video signal line 103 is selected to be positive with respect to the reference potential on the counter electrode 107, the negative-polarity voltage on the pixel electrode is generated by controlling the voltage applied on the electrode 57 (the pixel-potential control signal). When a negative-polarity signal is generated by using the above method, it is not necessary to supply the negative-polarity signal from the video signal selector circuit 123, and consequently, the peripheral circuits of the liquid crystal display panel can be composed of small-withstand-voltage elements.

Timing in operation of the circuit illustrated in FIG. 40 will be described by referring to FIG. 42. Symbol Φ1 represents a gray scale voltage to be supplied to the video signal line 103. Symbol Φ2 is a scanning signal to be supplied to the scanning signal line 102. Symbol Φ3 is a pixel-potential control signal (voltage-lowering signal) to be supplied to the pixel-potential control signal line 136. Symbol Φ4 represents the potential of the pixel electrode 109. The pixel potential control signal Φ3 is a signal having an amplitude between the voltages V 3 and V1.

Figure 42:
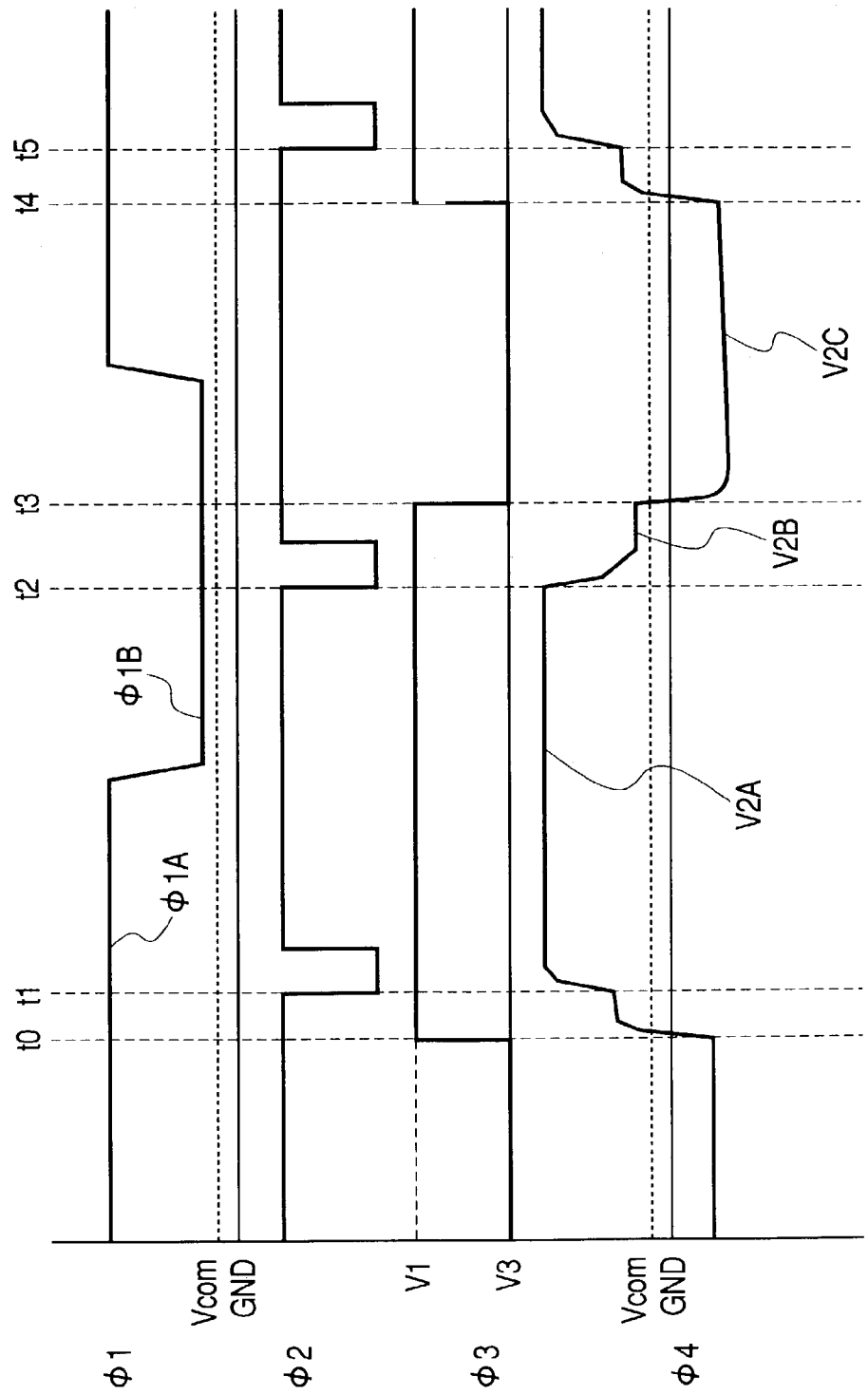
FIG. 42 is a timing diagram describing a method of controlling the pixel potential of the liquid crystal display device according to the preferred embodiment of the present invention.

In FIG. 42, symbol Φ1 represents a positive-polarity input signal Φ1A and a negative polarity input signal Φ1B. Here, the negative-polarity voltage is a signal of a negative polarity with respect to the reference potential Vcom to which a voltage applied on the pixel electrode changes due to the pixel-potential control signal. In the present embodiment, a description will be made of a case where both the positive-polarity-voltage-associated signal Φ1A and the negative-polarity-voltage-associated signal Φ1B serving as the video signal Φ1 are positive with respect to the reference potential Vcom applied to the counter electrode 107.

FIG. 42 shows a case where the gray scale voltage Φ1 is represented by the positive-polarity-voltage-associated signal Φ1A during a period from t0 to t2. First, at t0, the voltage V1 is output as the pixel-potential control signal Φ3. Then, at a time t1, when the scanning signal Φ2 changes to a low level, the p-type transistor 30 shown in FIG. 40 is turned on, and the positive-polarity input signal Φ1A supplied to the video signal line 103 is written into the pixel electrode 109. The signal to be written into the pixel electrode 109 is represented by Φ4 in FIG. 42. In FIG. 42, a voltage written into the pixel electrode 109 at t2 is denoted by V2A. Next, when the scanning signal Φ2 is brought into a non-selected state, i.e., a high level, the transistor 30 is brought into the off state, and the pixel electrode 109 is disconnected from the video signal line 103 supplying the voltage. The liquid crystal display device produces a gray scale in accordance with the voltage V2A which has been written into the pixel electrode 109.

The following explains a period from t2 to t4 during which the gray scale voltage Φ1 is the negative polarity input signal Φ1B. For the negative polarity input signal Φ1B, the scanning signal Φ2 is selected at the time t2, and the voltage V2B as represented by Φ4 will be written into the pixel electrode 109. Thereafter, the transistor 30 is brought into the off state, and at time t3, that is, 2 h (two horizontal scanning periods) after the time t2, the voltage supplied to the pixel capacitance 115 is lowered from V1 to V3 as represented by the pixel potential control signal Φ3. When the pixel-potential control signal Φ3 is changed from V1 to V3, the pixel capacitance 115 serves as a coupling capacitance, and the potential of the pixel electrode 109 are lowered in accordance with the amplitude of the pixel potential control signal Φ3. In this way, the negative-polarity voltage V2C with respect to the reference potential Vcom can be generated in the pixel.

When the negative-polarity voltage is generated by using the above method, it makes possible peripheral circuits made of low-withstand-voltage elements. More specifically, the signals to be output from the video signal selector circuit 123 is positive-polarity and small-amplitude signal, and therefore the video signal selector circuit 123 can be formed as a low-withstand-voltage circuit. In addition, it is not necessary to use a negative-polarity-voltage-associated operational amplifier, and further, if the video signal selector circuit 123 can be driven by a low voltage, the whole liquid crystal display device can be composed of low-withstand-voltage circuits since other peripheral circuits such as a horizontal shift register 120 and the display control device 111 are low-withstand-voltage circuits.

Figure 43:
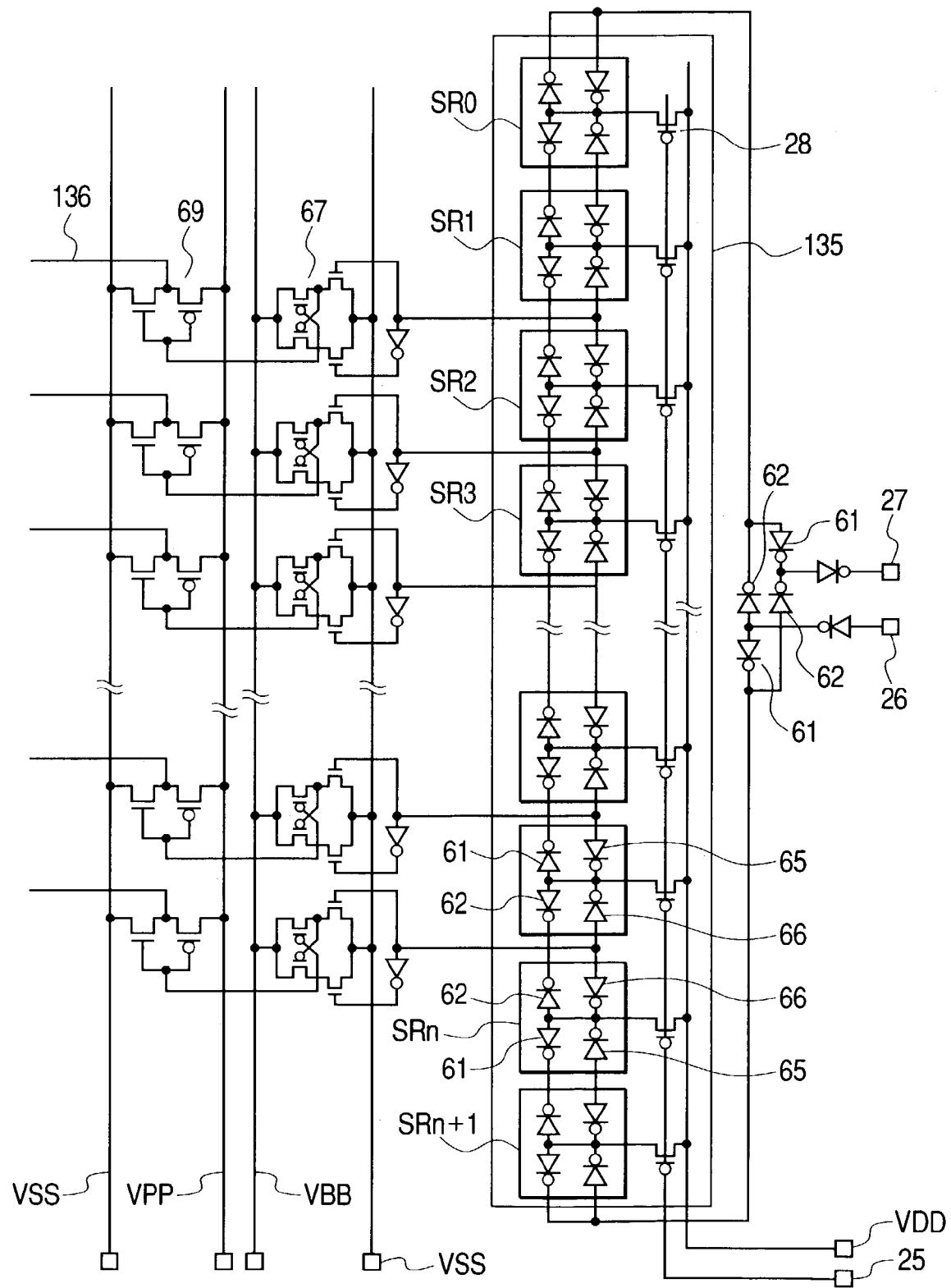
FIG. 43 is a schematic circuit diagram showing the configuration of a pixel-potential control circuit of the liquid crystal display device according to the preferred embodiment of the present invention.

A circuit configuration of the pixel-potential control circuit 135 is shown in FIG. 43. Symbol SR are bidirectional shift registers, which can shift signals in upward and downward. Each of the bidirectional registers SR is composed of clocked inverters 61, 62, 65 and 66. Reference numeral 67 are level shifters, and reference numeral 69 are output circuits. The bidirectional registers SR, etc. are operated by a power-supply voltage VDD. The level shifters 67 convert the voltage level of a signals to be output from the bidirectional registers SR. The level shifters 67 output signals which have an amplitude between the power-supply voltage VBB higher than that of the power-supply voltage VDD and a power-supply voltage VSS (GND potential). The output circuit 69 is supplied with power-supply voltages VPP and VSS, and outputs the voltages VPP and VSS to the pixel-potential control line 136 according to the signal from the level shifter 67. The voltage V1 of the pixel-potential control signal Φ3, as explained in connection with FIG. 42, represents the power-supply voltage VPP, and the voltage V3 represents the power-supply voltage VSS. In FIG. 43, the output circuit 69 is represented by an inverter comprising a p-type and a n-type transistor. By selecting the values of the power-supply voltage VPP to be supplied to the p-type transistor, and the power-supply voltage VSS to be supplied to the n-type transistor, it is possible to output the voltages VPP and VSS as the pixel potential control signal Φ3. However, since a silicon substrate for forming the p-type transistor is supplied with a substrate voltage as described later, the value of the power-supply voltage VPP is set properly for the substrate voltage.

Reference numeral 26 is a start signal input terminal which supplies a start signal that is one of control signals, to the pixel potential control circuit 135. Reference numeral 27 denotes a scan-ceasing signal output terminal. Bidirectional shift registers from SR1 to SRn shown in FIG. 43 successively output timing signals in synchronism with timing of an externally supplied clock signal, upon receipt of the start signal. The level shifters 67 output the voltages VSS and VBB in accordance with a timing signal. The output circuits 69 output the voltages VPP and VSS to the pixel potential control line 136 according to the output from the level shifter 67. The start signal and the clock signal are supplied to the bidirectional shift registers SR in such a manner as to provide the timing shown in the pixel-potential control signal Φ3 in FIG. 42. This make it possible to output the pixel potential control signal Φ3 from the pixel-potential control circuit 135 with a desired timing. Reference numeral 25 denotes a reset signal input terminal. Reference numeral 28 denotes reset transistors.

Next, the clocked inverters 61 and 62 to be used for the bidirectional shift register SR will be described by referring to FIGS. 44A and 44B. Symbol UD1 is a first-direction-setting signal line, and UD2 is a second-direction-setting signal line.

Figure 44A:
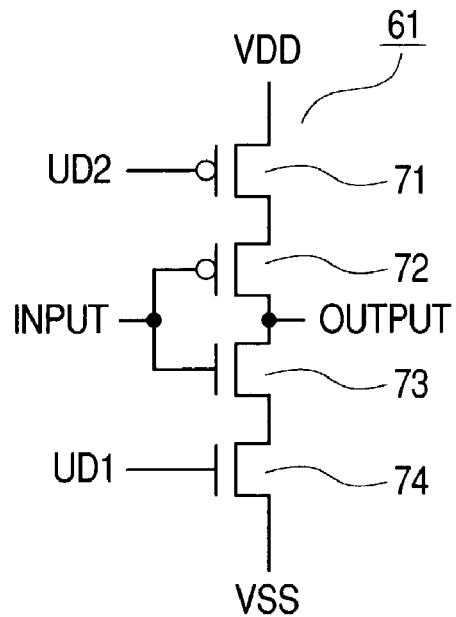
FIGS. 44A, 44B, 44C and 44D are schematic circuit diagrams showing the configuration of a clocked inverter of the liquid crystal display device according to the preferred embodiment of the present invention.
Figure 44B:
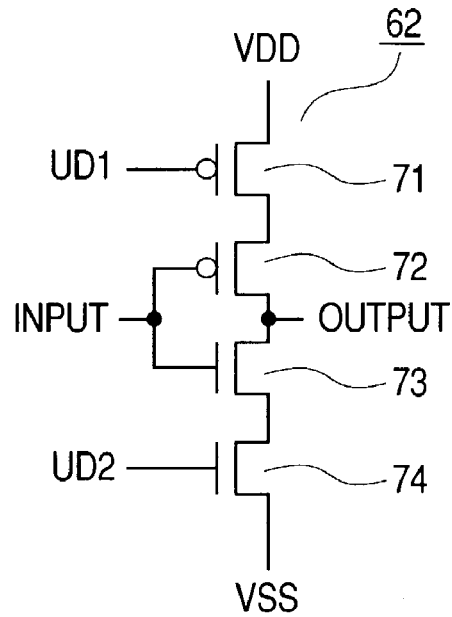

The first-direction-setting signal line UD1 is at an H level in FIGS. 44A and 44B when the liquid crystal display panel is scanned from bottom to top, and the second-direction-setting signal line UD2 is at an H level in FIG. 43 when the liquid crystal display panel is scanned from top to bottom. Although line connections are omitted in FIGS. 44A and 44B to simplify the diagrams, both the first-direction-setting signal line UD1 and the second-direction-setting signal line UD2 are connected to the clocked inverters 61 and 62 which constitute the bidirectional shift register SR.

The clocked inverter 61 is composed of the p-type transistors 71 and 72 and the n-type transistors 73 and 74, as shown in FIG. 44A. The p-type transistor 71 is coupled to the second-direction-setting signal line UD2, and the n-type transistor 74 is coupled to the first-direction-setting signal line UD1. Consequently, if the first-direction-setting signal line UD1 is at the H level and the second-direction-setting signal line UD2 is at the L level, the clocked inverter 61 operates as an inverter, and the impedance will become high when the second-direction-setting signal line UD2 is at the H level and the first-direction-setting signal line UD1 is at the L level.

On the contrary, in the clocked inverter 62, as shown in FIG. 44B, the p-type transistor 71 is coupled to the first-direction-setting signal line UD1, and the n-type transistor 74 is coupled to the second-direction-setting signal line UD2. Consequently, if the second-direction-setting signal line UD2 is at the H level, it operates as an inverter, and the impedance will become high when the first-direction-setting signal line UD1 is at the H level.

Figure 44C:
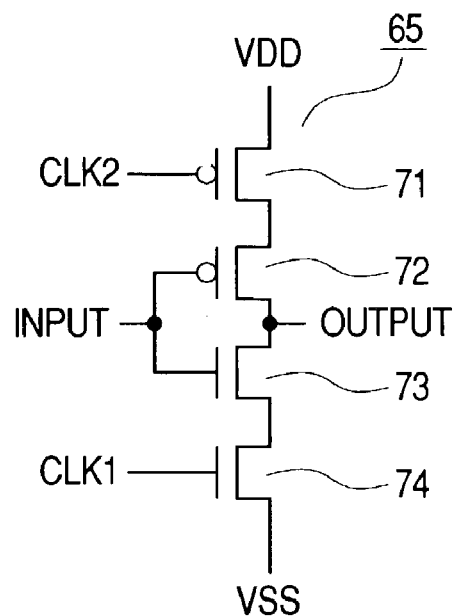

The clocked inverter 65 has a circuit configuration as shown in FIG. 44C, wherein, if a clock CLK1 is at the H level and a clock CLK2 is at the L level, it inverts an input and outputs the inverted input, and if the clock CKL1 is at L the level and the clock CLK2 is at the H level, the impedance will become high.

Figure 44D:
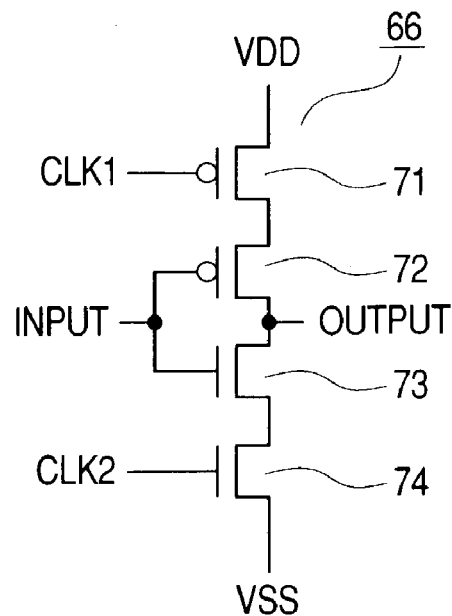

In addition, the clocked inverter 66 has a circuit configuration as shown in FIG. 44D, wherein, if the clock CLK2 is at the H level and the clock CLK1 is at the L. level, an input is inverted and the inverted input is output, and if the clock CKL2 is at the L level and the clock CLK1 is at the H level, the impedance will become high. Although connections of clock signal lines are omitted in FIG. 43, the clock signal lines CLK1 and CLK2 are connected to the clocked inverters 65 and 66 in FIGS. 44C and 44D.

As described above, by providing the bidirectional shift registers SR composed of the clocked inverters 61, 62, 65 and 66, it is possible to sequentially output the timing signals. Further, by providing the pixel potential control circuit 135 composed of the bidirectional shift registers SR, it is possible to scan the pixel potential control signal Φ3 bidirectionally. More specifically, the vertical drive circuit 130 is also composed of similar bidirectional shift registers, and therefore, the liquid crystal display device according to the present invention enables scanning upward and downward. Consequently, in a case of reversing the scanning direction, etc., the scanning is performed from bottom to top of the illustration in the figure by reversing the scanning direction. For this purpose, when the vertical drive circuit 130 performs scanning from bottom to top, the bottom-to-top scanning is made possible by also changing the setting of the first-direction-setting signal line UD1 and the second-direction-setting signal line UD2 of the pixel potential control circuit 135. The horizontal shift register 121 is also composed of similar bidirectional shift registers.

Figure 45:
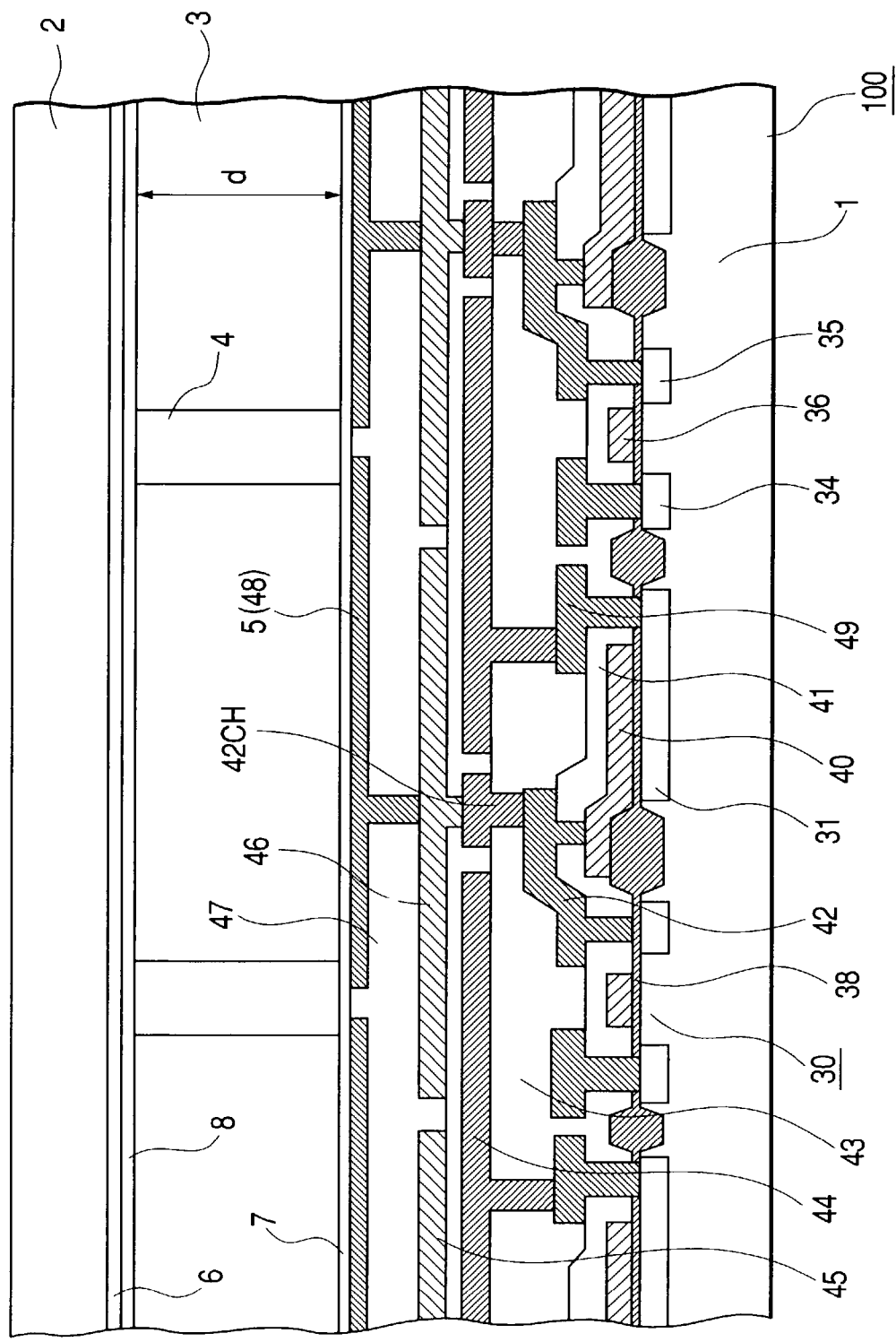
FIG. 45 is a schematic section view showing the pixel section of the liquid crystal display device according to the preferred embodiment of the present invention.

A pixel section of the reflective type liquid crystal display device LCOS according to the present invention will be described with reference to FIG. 45. FIG. 45 is a schematic sectional view of a liquid crystal panel used for the reflective type liquid crystal display device according to the present invention. In the figure, reference numeral 100 is the liquid crystal panel, reference numeral 1 is a drive-circuit substrate being a first substrate, reference numeral 2 is a transparent substrate being a second substrate, reference numeral 3 is liquid crystal composition, and reference numeral 4 is a spacer. The spacers 4 provide a cell gaps d disposed at a given interval between the drive-circuit substrate 1 and the transparent substrate 2. The liquid crystal composition 3 is sandwiched in the cell gap d. Reference numeral 5 is a reflective electrode (pixel electrode), which is formed on the drive-circuit substrate 1. Reference numeral 6 is a counter electrode, which applies a voltage to the liquid crystal composition 3 between the counter electrode and the reflective electrode 5. Reference numerals 7 and 8 are orientation films, which orient liquid crystal molecules unidirectionally. Reference numeral 30 is an active element, which supplies a gray scale voltage to the reflective electrode 5.

Reference numeral 34 is a source region of the active element 30, reference numeral 35 is a drain region and reference numeral 36 is a gate electrode. Reference numeral 38 is an insulating film, reference numeral 31 is a first electrode forming a pixel capacitance, and reference numeral 40 is a second electrode forming a pixel capacitance. The first electrode 31 and the second electrode 40 provide capacitance via the insulating film 38. In FIG. 45, the first electrode 31 and the second electrode 40 are represented as typical electrodes forming pixel capacitance. Besides the above-stated arrangement, it is possible to provide pixel capacitance if it is so arranged that a conductive layer electrically connected to a pixel electrode and a conductive layer electrically coupled to a pixel potential control signal line are placed oppositely to each other with a dielectric layer sandwiched therebetween.

Reference numeral 41 is a first interlayer film, and reference numeral 42 is a first conductive film. The first conductive layer 42 electrically connects the drain region 35 to the second electrode 40. Reference numeral 43 is a second interlayer film, reference numeral 44 is a first light-blocking film, reference numeral 45 is a third interlayer film, and reference numeral 46 is a second light-blocking film. A through-hole 42CH is bored between the second interlayer film 43 and the third interlayer film 45, thus electrically connecting the first conductive film 42 and the second light-blocking film 46. Reference numeral 47 is a fourth interlayer film, and reference numeral 48 is a second conductive film forming the reflective electrode 5. A gray scale voltage is transmitted from the drain region 35 of the active element 30 to the reflective electrode 5 via the first conductive film 42, the through-hole 42CH and the second light-blocking film 46.

The present liquid crystal display device is of a reflective type, and the liquid crystal panel 100 is irradiated with a large amount of light. The light-blocking film blocks light such that it does not enter the semiconductor layer of the drive-circuit substrate. In the reflective type of liquid crystal display device, light that is incident on the liquid crystal panel 100 comes in from the side of the transparent substrate 2 (at the top of illustration in FIG. 45), transmits through the liquid crystal composition 3, reflects on the reflective electrode 5, and re-transmits through the liquid crystal composition 3 and the transparent substrate 2 before being projected from the liquid crystal panel 100. However, part of the light incident on the liquid crystal panel 100 will leak toward the drive-circuit substrate 1 through a gap between the adjacent reflective electrodes 5. The first light-blocking film 44 and the second light-blocking film 46 are provided to prevent light from coming into the active element 30. In the present embodiment, the light-blocking films are each composed of a conductive layer, the second light-blocking film is electrically connected to the reflective electrode 5, and a pixel potential control signal is supplied to the first light-blocking film 44, so that the light-blocking films are allowed to function as part of the pixel capacitance.

In addition, by supplying the pixel potential control signal to the first light-blocking layer 44, it is possible to arrange the first light-blocking film 44, as an electrical shield layer, between the second light-blocking film 46 to which a gray scale voltage is supplied and the first conductive layer 42 forming the video signal line 103 or a conductive layer (a conductive layer formed in the same layer as the gate electrode 36) forming the scanning signal line 102. Consequently, the parasitic capacitance components decrease between the first conductive film 42 or the gate electrode 36, etc. and the second light-blocking film 46 or the reflective electrode 5. As stated earlier, although it is necessary to allow the pixel capacitance CC to be sufficiently larger relative to the liquid crystal capacitance CL, the provision of the first light-blocking film 44 as an electrical shield layer will reduce the parasitic capacitance to be connected in parallel with the liquid crystal capacitance CL, thus enhancing the efficiency. Further, with this arrangement, it is possible to reduce the introduction of noise from signal lines.

In addition, if a reflective type of liquid crystal display elements are employed and the reflective electrode 5 is formed on the surface of the liquid crystal composition 3 of the drive-circuit substrate 1, it is possible to use an opaque silicon substrate, etc. for the drive-circuit substrate 1. Further, such arrangement provides advantages that it is possible to arrange the active element 30 or related wiring beneath the reflective electrode 5, thus enabling the reflective electrode 5 which will act as a pixel and realizing the so-called high aperture ratio. Furthermore, the arrangement offers another advantage that heat generated by light incident on the liquid crystal panel 100 can be dissipated from the back of the drive-circuit substrate 1.

Figure 46:
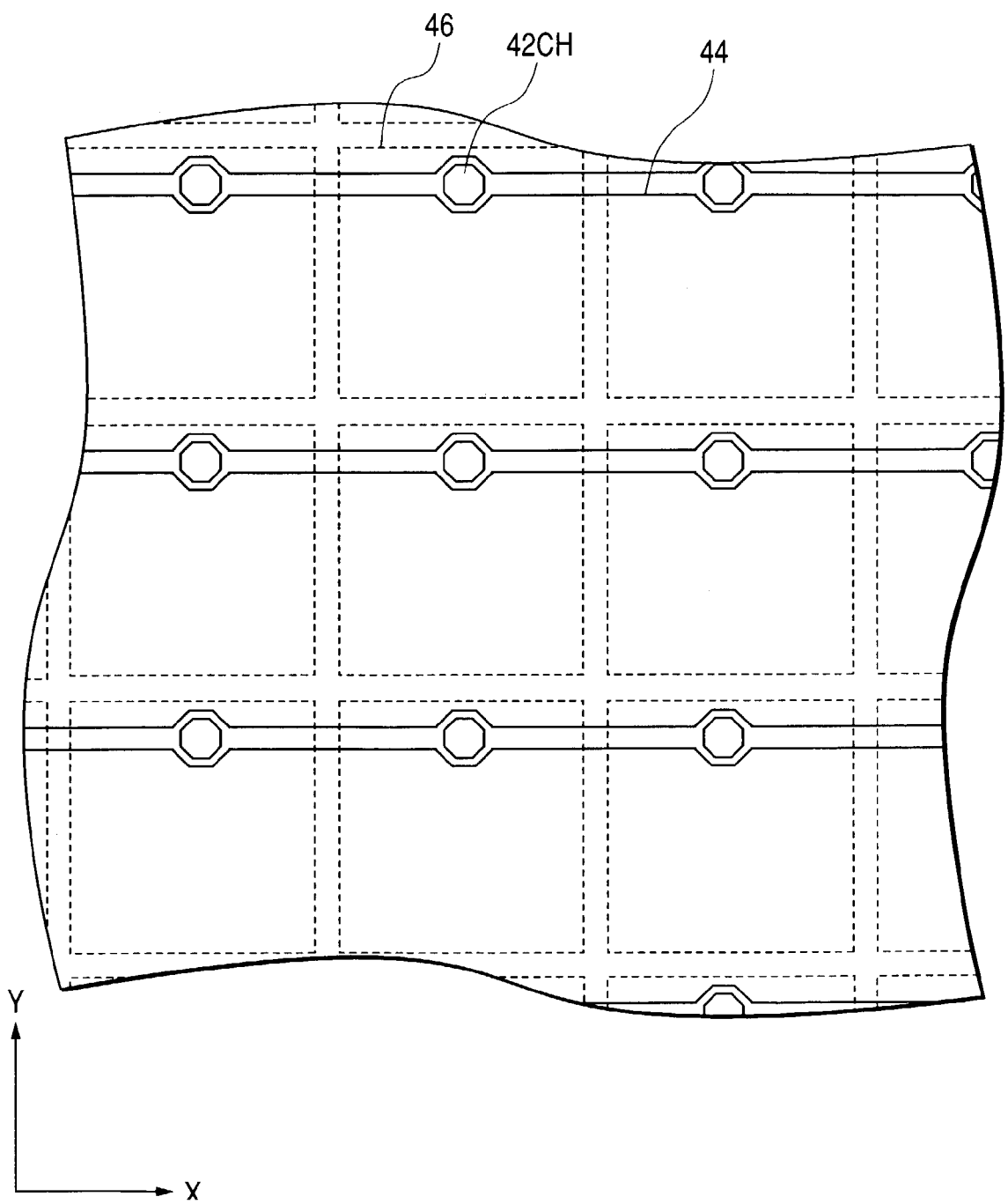
FIG. 46 is a schematic plan view showing the configuration which forms a pixel-potential control line by using a light-blocking film of the liquid crystal display device according to the preferred embodiment of the present invention.

A description will be made of the use of the light-blocking film as part of the pixel capacitance. The first light-blocking film 44 and the second light-blocking film 46 are opposed to each other via the third interlayer film 45, thus forming part of the pixel capacitance. Reference numeral 49 is a conductive layer forming part of the pixel potential control line 136. The first electrode 31 is electrically connected to the first light-blocking film 44 via the conductive layer 49. In addition, it is possible to form wiring from the pixel potential control circuit 135 to the pixel capacitance by using the conductive layer 49. However, with the present preferred embodiment, the first light-blocking film 44 is used as the wiring. FIG. 46 illustrates a configuration wherein the first light-blocking film 44 is used as the pixel potential control line 136.

FIG. 46 is a plan view showing the arrangement of the light-blocking film 44. Reference numeral 46 is the second light-blocking film, which is shown by dotted lines to indicate its position. Reference numeral 42CH is a through-hole, which connects the first conductive film 42 and the second light-blocking film 46. It should be noted that, in FIG. 46, other components are omitted to make the first light-blocking film 44 more understandable. The first light-blocking film 44 has a function of the pixel potential control line 136 and is formed continuously in X direction shown in the figure. The first light-blocking film 44 is formed in a manner to cover the entire display region since it functions as a light-blocking film, but, in order also to allow the function of the pixel potential control line 136, it is also elongated in X direction (in a direction parallel to the scanning signal line 102), formed in a linear arrangement in Y direction, and is coupled to the pixel potential control circuit 135. In addition, since the first light-blocking film functions as an electrode of the pixel capacitance, it is formed in such a manner as to overlap with the second light-blocking film 46 as widely as possible. Further, gaps between adjacent first light-blocking films 44 are formed as narrow as possible so that the first light-blocking films 44 functions as light-blocking films to reduce the leakage of light.

Note that, however, if the gaps between adjacent first light-blocking films 44 are formed narrower, as shown in FIG. 46, part of the light-blocking film 44 should overlap with the second light-blocking film 46. As stated earlier, the present liquid crystal display device enables bidirectional scanning. Consequently, when a pixel potential control signal is scanned bidirectionally, the light-blocking film 44 may or not overlap with the second light-blocking film 46 in the subsequent stage. With the case shown in FIG. 46, the first light-blocking film 44 and the second light-blocking film 46 in the subsequent stage overlap each other when scanning is made from top to bottom in the figure.

Figure 47A:
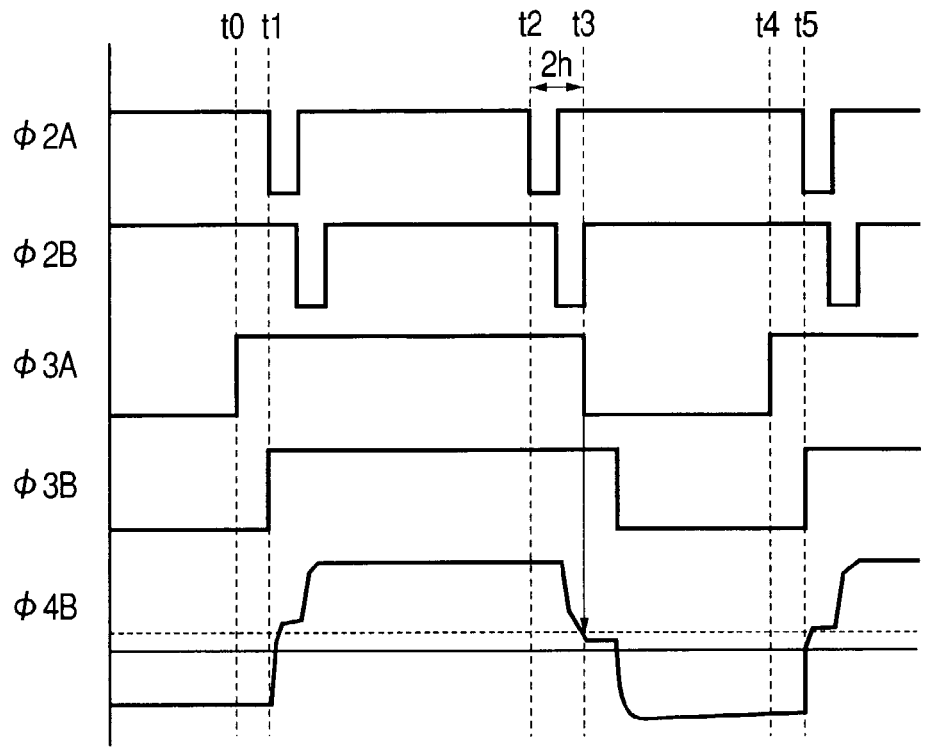
FIGS. 47A and 47B are timing diagrams showing a drive method of the liquid crystal display device according to the preferred embodiment of the present invention.
Figure 47B:
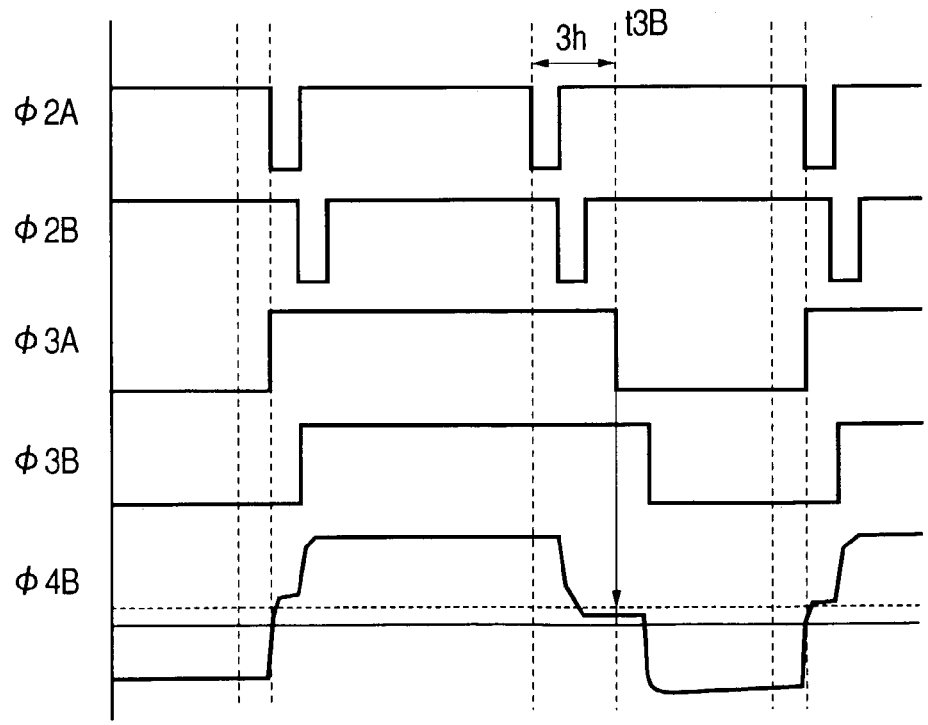

Now, a problem which arises when part of the light-blocking film 44 overlaps with the second light-blocking film 46 in the subsequent stage and a measure for solving the problem will be described by referring to FIGS. 47A and 47B. FIG. 47A is a timing diagram describing the problem. Symbol Φ2A is a scanning signal for a given row and shall be a scanning signal for the Ath row. Symbol Φ2B is a scanning signal for rows in the subsequent stage and shall be a scanning signal for the Bth row. It should be noted that a description is made of a period of time from t2 to t3 during which the problem should occur, and the description of other periods of time shall be omitted.

In FIG. 47A, the pixel potential control signal Φ3A is varied in Ath row at time t3 which is after 2h (two horizontal scanning periods) from time t2. After 1h from time t2, the output of the scanning signal Φ2A ceases, the active element 30 in Ath row which is driven by the scanning signal Φ2A is turned off, and the pixel electrode 109 in Ath row is disconnected from the video signal line 103. At time t3 which is 2h after time t2, even if a delay, etc. associated with the switching of the signal is taken into consideration, the active element 30 in Ath row is well in the OFF state. However, time t3 also implies a time when the scanning signal Φ2 in Bth row is switched.

Since the first light-blocking film 44 in Ath row and the second light-blocking film 46 in Bth row are overlapped with each other, a certain capacitance should exist between the pixel electrode in Bth row and the pixel potential control signal line in Ath row. Since time t3 is a time when the active element 30 in Bth row is switching to the OFF state, the pixel electrode 109 in Bth row has not well been disconnected from the video signal line 103. At this time, when the pixel potential control signal Φ3A in Ath row which has a capacitance component along with the pixel electrode 109 in Bth row is switched, electric charges will move between the video signal line 103 and the pixel electrode 109 since the pixel electrode 109 and the video signal line 103 are not completely disconnected from each other. More specifically, the switching of the pixel potential control signal line Φ3A in Ath row should affect a voltage Φ4B to be written onto the pixel electrode 109 in Bth row.

The effect caused by the pixel potential control signal Φ3A will be uniform and not be so noticeable when the scanning direction of the liquid crystal display device is constant. However, if a liquid crystal display device is provided for each color, such as red, green or blue, and a color display is achieved by overlapping outputs from liquid crystal display devices, only one liquid crystal display device performs a bottom-to-top scanning, and other display devices perform a top-to-bottom scanning because of the optical arrangement of such liquid crystal display devices, in some cases. As described above, if there is a liquid crystal display device, which performs the scanning in a different direction, among a plurality of liquid crystal display devices, the display quality will be uneven, thus causing the disfigurement of the display.

Next, a method of solving the problem described above will be described by referring to FIG. 47B. It will be so designed that the pixel potential control signal Φ3A in Ath row can be output after 3 h from the start of the scanning signal Φ2A in Ath row. With this arrangement, the timing implies that the scanning signal Φ2B in Bth row has already been switched, and the active element 30 in Bth row is well in the OFF state. Therefore, the effect of the pixel potential control signal Φ3A in Ath row on the voltage Φ4B to be written onto the pixel electrode 109 in Bth row will be reduced.

It should be noted that, in the above-stated arrangement, the time for writing the negative-polarity input signal becomes shorter by as long as 3 h compared to that of the positive-polarity input signal, but for a case where the number of the scanning signal lines 102 exceeds 100, the value will be 3% or smaller. Consequently, the discrepancy in the RMS values of the negative-polarity input signal and the positive-polarity input signal can be adjusted by the value of the reference voltage Vcom, etc.

The relationship between the voltage VPP to be supplied to the pixel capacitance and the substrate potential VBB will be described by referring to FIGS. 48A and 48B. Fir 48A illustrates an inverter circuit constituting the output circuit 69 of the pixel potential control circuit 135.

Figure 48A:
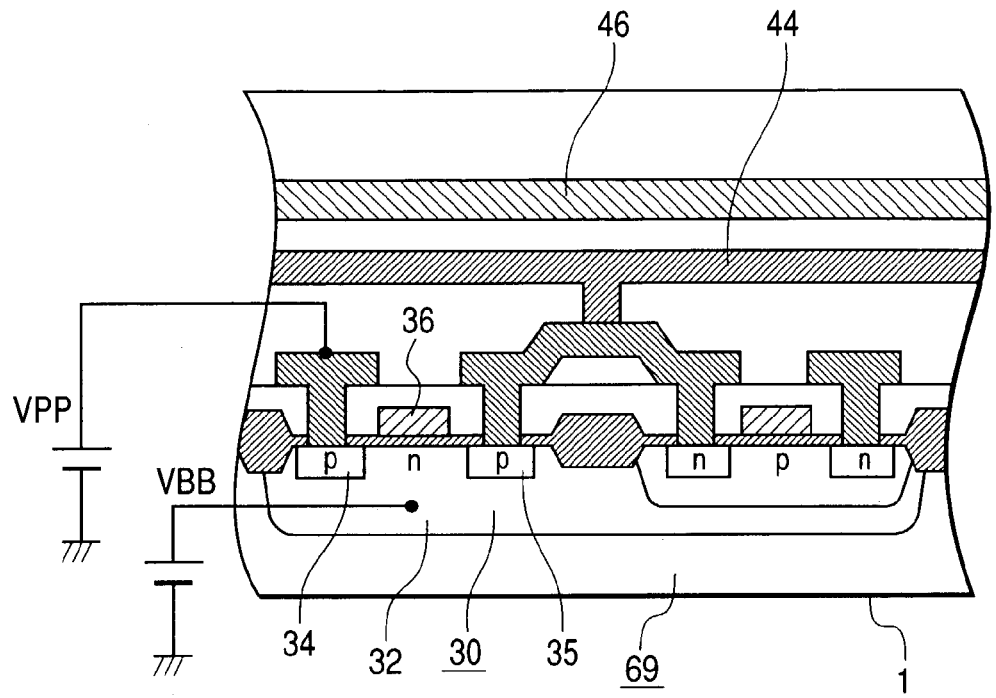
FIGS. 48A and 48B are respectively a schematic section view and a schematic timing chart for describing operations of an inverter circuit in the liquid crystal display device according to the preferred embodiment of the present invention.

In FIG. 48A, reference numeral 32 is a channel region of a p-type transistor, and an n-well is made by ion implantation, etc. on the silicon substrate 1. A substrate voltage VBB is supplied to the silicon substrate 1, and the potential of an n-well 32 is VBB. The source region 34 and the drain region 35 are each a p-type semiconductor layer and are formed on the silicon substrate 1 by ion implantation or the like. When a voltage having lower potential than the substrate voltage VBB is applied to the gate electrode 36 of the p-type transistor 30, the source region 34 and the drain region 35 come in a conducting state.

Generally, a common substrate potential VBB is applied to transistors mounted on a silicon substrate since no insulating portions, etc. are required and the entire structure can be simplified. The liquid crystal display device according to the present invention is provided with transistors of the drive circuit section and transistors of the pixel section formed on the silicon substrate 1. Also, a common substrate potential VBB is applied to the transistors of the pixel section by the same token.

The voltage VPP which is supplied to the pixel capacitance is applied to the source region 34 in the is of a p-type semiconductor layer, which is coupled to the n-well 32 in pn junction. If the potential of the source region 34 becomes higher than that of the n-well 32, a problem arises that a current flows to the n-well 32 from the source region 34. Therefore, the potential VPP is set so that it should be lower than the substrate voltage VBB.

As stated earlier, where the voltage written onto the pixel electrode is V2, the liquid crystal capacitance is CL, the pixel capacitance is CC, and the amplitude of the pixel potential control signal is between VPP and VSS, the voltage of the pixel electrode after the voltage drop can be expressed by:

$$V2-\{CC/(CL+CC)\}\times(VPP-VSS)$$

Here, when the GND potential is chosen for the BSS, the level of the voltage fluctuation at the pixel electrode will be defined by the voltage VPP, the liquid crystal capacitance CL and the pixel capacitance CC.

Figure 48B:
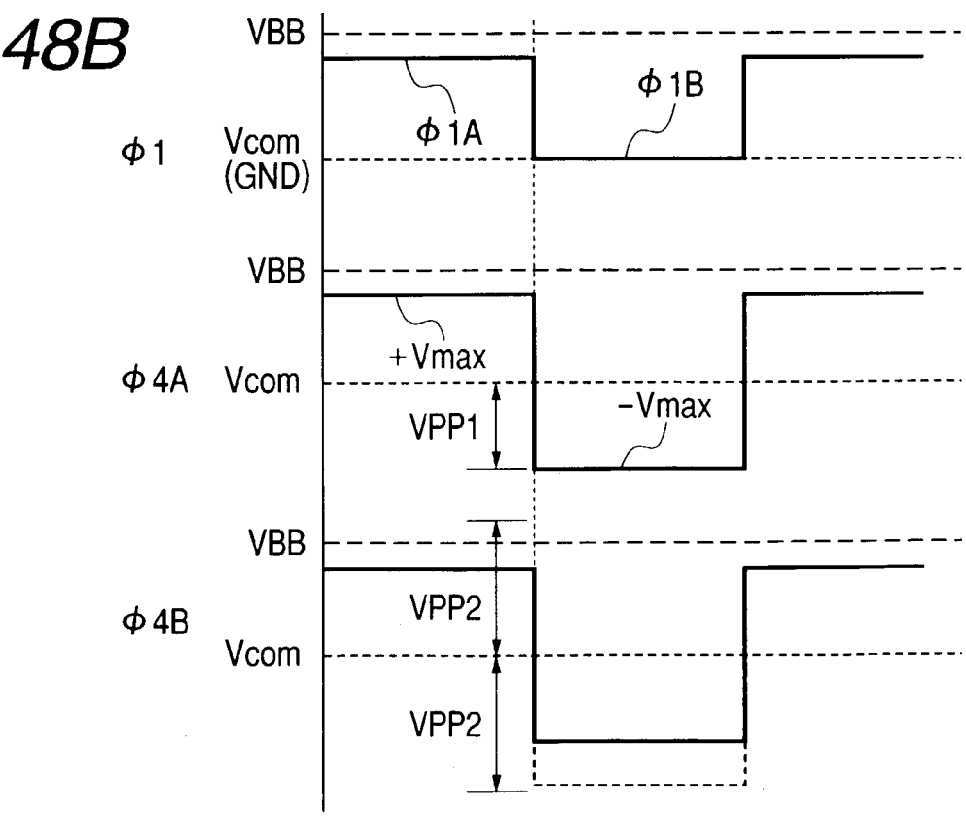

The relationship between CC/(CL+CC) and the voltage VPP is illustrated in FIG. 48B. It should be noted that the GND potential is used as the reference voltage Vcom to simplify the description. In addition, in a system in which the display becomes normally white unless a voltage is applied, a case will be described where a gray scale voltage is applied to the pixel electrode to obtain normally black image (minimum gray scale). Symbol Φ1 in FIG. 48B indicates a gray scale voltage to be written onto the pixel electrode from the video signal selector circuit 123. Symbol Φ1A indicates a gray scale voltage in positive polarity, and symbol Φ2A is a gray scale voltage in negative polarity. Since the image is normally black, both Φ1A and Φ1B are set so that the potential difference between the reference voltage Vcom and the gray scale voltage to be written onto the pixel electrode can be maximum. In FIG. 48B, since Φ1A is a positive-polarity signal, it will be set, as usual, to +Vmax so that the potential difference from the reference voltage Vcom becomes maximum, and Φ1B will be set to Vcom (GND) and the gray scale voltage is written onto the pixel electrode before it is decreased by using the pixel capacitance.

Symbols Φ4A and Φ4B each indicate a voltage of the pixel electrode. Symbol Φ4A indicates an ideal case where CC/(CL+CC) is 1, and symbol Φ4B indicates a case where CC/(CL+CC) becomes less than 1. If Φ4A is of negative polarity, since Φ1B has already been written as Vcom (GND), −Vmax which is lowered in accordance with the amplitude VPP of the pixel potential control signal will be:

$$-V\mathrm{max}=-VPP,\text{ since }CC/(CL+CC)=1$$

On the other hand, for Φ4B, since CC/(CL+CC) is 1 or less, it is necessary to supply the pixel potential control signal which satisfies +Vmax<VPP2. As stated earlier, since VPP<VBB must be satisfied, the relationship will be +Vmax<VPP<VBB. Here, although a method of lowering the pixel voltage is employed to realize a low-withstand-voltage circuit, a problem arises that once the voltage VPP of the pixel potential control signal has reached a high voltage, the substrate voltage VBB will also become high, thus providing a high-withstand-voltage circuit. To solve this problem, it is necessary to define the values of CL and CC so that CC/(CL+CC) preferably be 1, more specifically, CL<<CC.

Incidentally, since a conventional liquid crystal display device wherein a thin-film transistor is formed on a glass substrate needs to make the pixel electrode as wide as possible (to make an aperture ratio greater), the establishment of CL=CC could be realized at best. In addition, the liquid crystal display device according to the present invention has a configuration in which the driver-circuit section and the pixel section are formed on a single silicon substrate, which poses a problem that a low withstand voltage circuit cannot be provided if the substrate potential VBB is a high voltage.

Figure 50:
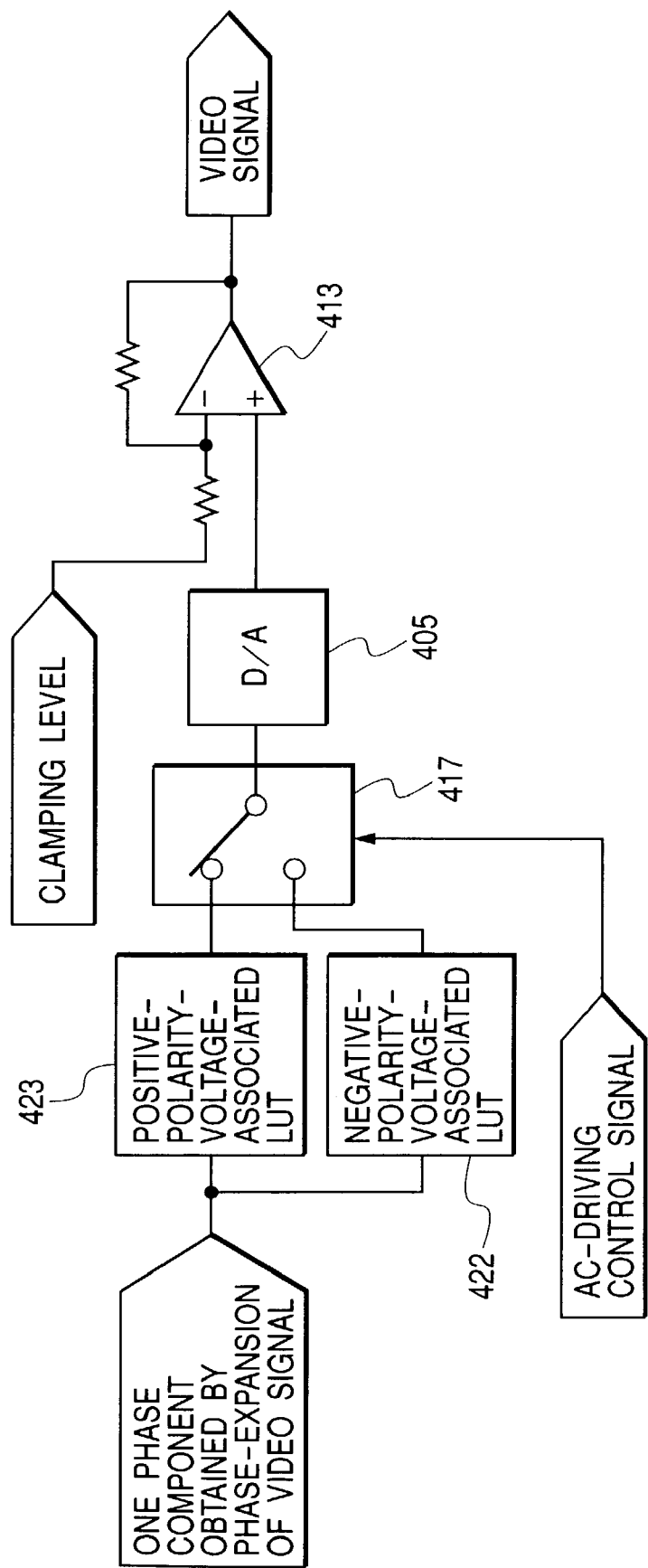
FIG. 50 is a schematic circuit diagram to create, by using the look-up table, positive-polarity signals and negative-polarity signals of the liquid crystal display device according to the preferred embodiment of the present invention.

A negative-polarity gray scale voltage will be described by referring to FIGS. 49A and 49B, and then a method of forming a negative-polarity gray scale voltage using a look-up table by referring to FIG. 50. It should be noted that, in FIGS. 49A and 49B, the GND potential is continuously used for the reference voltage Vcom to simplify the description. In addition, the description is made of a system wherein a white image (normally white) is obtained when a voltage is not applied across a liquid crystal layer.

Symbol Φ1 in FIG. 49A indicates a gray scale voltage to be written onto a pixel electrode from the video signal selector circuit 123, while symbol Φ4 in FIG. 49B indicates a voltage of a pixel electrode. To begin with, a case where the gray scale voltage is applied to a pixel electrode to provide a black image (minimum gray scale) will be described. Symbol Φ1A1 shows the case of positive polarity, whereas symbol Φ1B1 shows the case of negative polarity. Since the image is normally black, both Φ1A1 and Φ1B1 are set so that the potential difference between the reference voltage Vcom and a voltage to be written onto the pixel electrode becomes maximum.

Since Φ1A1 is a positive-polarity signal, in FIG. 49B, the voltage of the pixel electrode will be +Vmax so that the potential difference from the reference voltage Vcom is maximum as usual. On the other hand, Φ1B1 which is a negative-polarity signal is written onto the pixel electrode before it is lowered to −Vmax using the pixel capacitance.

A case where a gray scale voltage is applied to a pixel electrode so that a white image (maximum gray scale) can be obtained will be described. Symbol Φ1A2 shows the case of positive polarity, and symbol Φ1B2 shows the case of negative polarity. Since the image is normally white, both Φ1A2 and Φ1B2 are set so that the potential difference between the reference voltage Vcom and a voltage written onto the pixel electrode is minimum.

Since Φ1A2 is a positive-polarity signal, in FIG. 49B, the voltage of the pixel electrode will be +Vmin so that the potential difference from the reference voltage Vcom is minimum as usual. Symbol Φ1B2 which is a negative-polarity signal is written onto the pixel electrode before it is lowered using the pixel capacitance. Since the voltage to be lowered is VPP, a voltage which enables −Vmin after lowering the voltage will be chosen for Φ1B2.

As shown in FIGS. 49A and 49B, the negative-polarity signals Φ1B1 and Φ1B2 are not voltages that are obtained by simply inverting the polarity of positive-polarity signals Φ1A1 and Φ1A2 as often employed in conventional methods. Therefore, such negative-polarity signals are created by using look-up tables. FIG. 50 is a block diagram of the liquid-crystal-panel-drive control circuit 400 in which negative-polarity signals are created by using look-up tables. Reference numeral 422 is the negative-polarity-voltage-associated look-up table, and reference numeral 423 is the positive-polarity-voltage-associated look-up table. Since the negative-polarity signals are created by using the pixel capacitance, a negative-polarity-voltage-associated and a positive-polarity-voltage-associated operational amplifier are not used.

The negative-polarity-voltage-associated look-up table 422 uses compensation data that achieve compensation for variations. On the other hand, the positive-polarity-voltage-associated look-up table 423 uses correction data that achieves compensation for variations and compensation which enables to create negative-polarity signals after being lowered by the pixel capacitance. By switching the analog switch 417 in response to an ac-driving control signal, the positive-polarity signals and the negative-polarity signals are transmitted to the D/A converter 405.

Operations of the reflective type liquid crystal display device will be described. An electrically controlled birefringence mode is known as a mode provided by a reflective type liquid crystal display element. In the electrically controlled birefringence mode, a voltage is applied between a reflective electrode and a counter electrode to vary the orientation of molecules of liquid crystal composition, thus causing changes in the birefringence in a liquid crystal panel. The electrically controlled birefringence mode utilizes such changes in the birefringence as changes in the light transmission so as to form an image.

A single-polarizer twisted-nematic mode (SPTN), which is one of the electrically controlled birefringence modes, will be described by referring to FIGS. 51A and 51B. Reference numeral 9 is a polarizing beam splitter, which splits incident light L1 from a light source (not shown) into two polarized lights, and projects light L2 which has been turned into linearly polarized light. FIGS. 51A and 51B indicates a case where p-polarized light which is transmitted through the polarizing beam splitter 9 is used as light incident on the liquid crystal panel 100. However, it is possible to use s-polarized light that is reflected on the polarizing beam splitter 9. The liquid crystal composition 3 has a major axis of a liquid crystal molecule positioned parallel with the drive-circuit substrate 1 and the transparent substrate 2, and is formed of a nematic liquid crystal material of positive dielectric anisotropy. The liquid crystal molecules are oriented to be twisted through about 90 degrees between the drive-circuit substrate 1 and the transparent substrate 2 by orientation films 7, 8.

To begin with, FIG. 51A illustrates a case where no voltage is applied across a liquid crystal layer. Light incident on the liquid crystal panel 100 becomes elliptically polarized light due to the birefringence of the liquid crystal composition 3, and subsequently becomes circularly polarized light on the surface of the reflective electrode 5. The light reflected on the reflective electrode 5 re-transmits through the liquid crystal composition 3 to be elliptically polarized light again. The light is restored to be linearly polarized light at the time it is projected, and is then projected as light L3 (s-polarized light) whose phase is rotated by 90 degrees relative to the incident light L2. The projected light L3 re-enters the polarizing beam splitter 9, but it is reflected on the plane of polarization to be projected light L4. An image is obtained by irradiating a screen, etc. with the projected light L4. This is the so-called normally white (normally open) display method wherein light is projected from the liquid crystal layer while no voltage is applied across the liquid crystal layer.

FIG. 51B illustrates a case where a voltage is applied to a layer of the liquid crystal composition 3. When a voltage is applied to the layer of the liquid crystal composition 3, liquid crystal molecules are oriented in a direction of electric fields, and therefore, the recurrence ratio of birefringence within the liquid crystal layer will reduce. Consequently, the light L2 which comes in the liquid crystal panel as linearly polarized light is reflected as it is on the reflective electrode 5, and is projected as light L5 which is polarized in the same direction as that of the incident light L2. The projected light L5 transmits through the polarizing beam splitter 9 and returns to the light source. Under such arrangement, no light is irradiated onto a screen, etc. to provide a black image.

In the single-polarizer twisted-nematic mode, the orienting direction of liquid crystal molecules is parallel to the substrate, and it is possible to use a usual method of orienting for good processing stability. In addition, since it is operated under the normally white display method, tolerance can be allowed for display failures which may occur on the low-voltage side. More specifically, the normally white display method provides a dark level (black image) while a high voltage is applied. While this high voltage is applied, since almost all liquid crystal molecules are oriented in a direction of electric field which is perpendicular to the plane of substrate, the display in the dark level is not too dependent on an initial oriented state at the time of low voltage. Further, human eyes acknowledge the nonuniformity in luminance as a relative ratio of luminance, and is responsive approximately to the logarithm of luminance. Consequently, human eyes are sensitive to changes in dark level. For this reasons, the normally white method is a display method advantageous for nonuniformity in luminance caused by the initial oriented state.

However, the above-stated electrically controlled birefringence mode requires highly accurate cell gaps. More specifically, since the electrically controlled birefringence mode utilizes a phase difference between extraordinary rays and ordinary rays which is caused while light passes through a liquid crystal layer, the intensity of the transmitting light is dependent on the retardation $\Delta n \cdot d$ between extraordinary rays and ordinary rays. Here, $\Delta n$ is birefringence, and d is a cell gap that is defined by the spacers 4 between the transparent substrate 2 and the drive-circuit substrate 1 (See FIG. 45).

Therefore, in the present embodiment, the cell gap accuracy is determined to be $\pm 0.05$ μm or below, considering nonuniformity in display. In addition, since light incident on the liquid crystal is reflected on the reflective electrode and passes through the liquid crystal layer again in the reflective type liquid crystal display element, the cell gap d will be half of a transparent type liquid crystal display element when a liquid crystal having the same birefringence $\Delta n$ is used. While the cell gap for a general transparent type liquid crystal display element is designed to be 5 to 6 μm, the cell gap employed in the present embodiment is about 2 μm.

To deal with highly accurate and narrower cell gaps, the present embodiment employs a method of forming a column-like spacer on the drive-circuit substrate in stead of the conventional method of scattering beads between the substrates.

Figure 52:
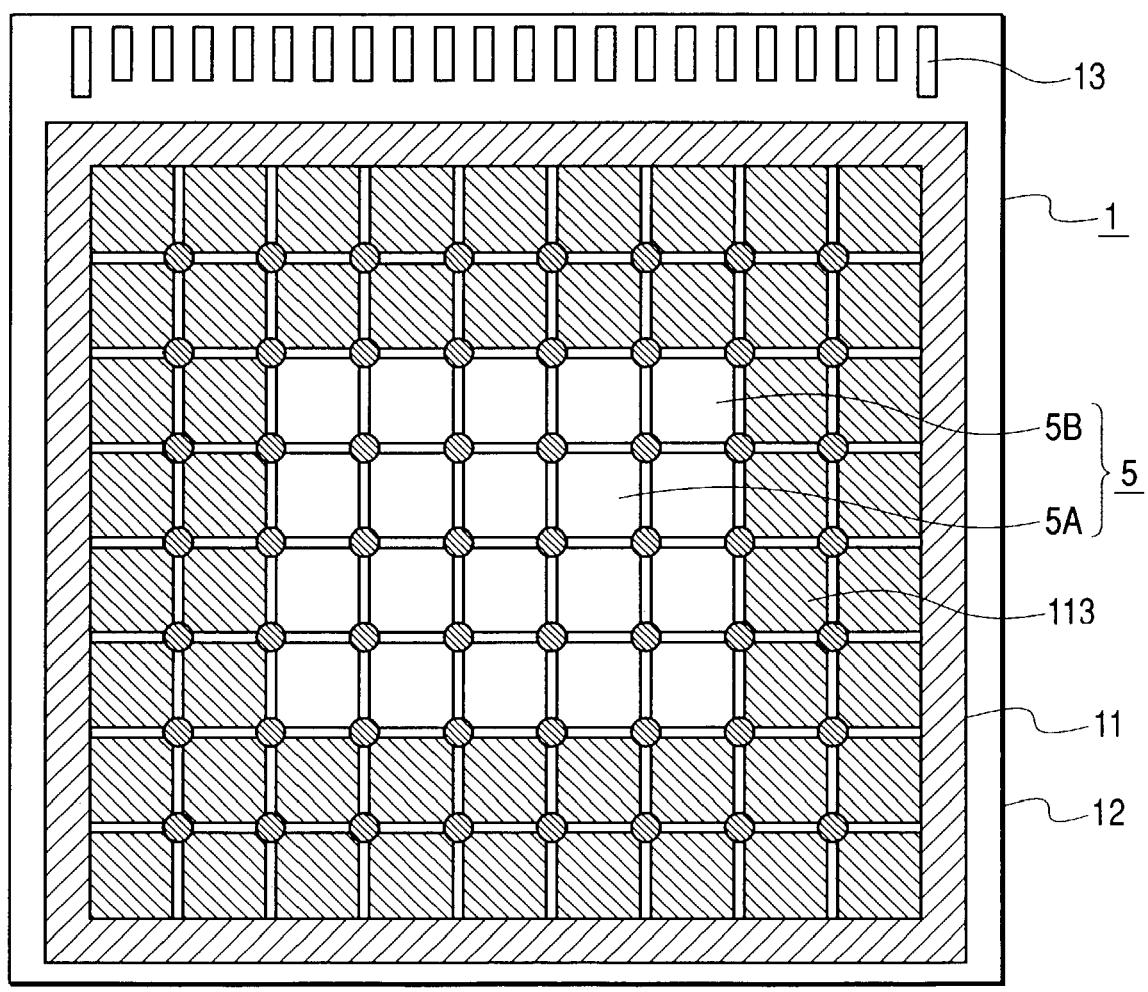
FIG. 52 is a schematic plan view showing a liquid crystal panel of the liquid crystal display device according to the preferred embodiment of the present invention.

FIG. 52 shows a pattern plan view describing the layout of the reflective electrode 5 and the spacers 4 provided on the drive-circuit substrate 1. A large number of spacers 4 are provided in a matrix configuration in a manner to retain regular intervals on the entire surface of the drive-circuit substrate 1. The reflective electrode 5 is a minimum pixel of an image formed by liquid crystal display elements. For simplification in FIG. 52, the reflective electrode is represented using four pixels in a longitudinal direction and five pixels in a lateral direction as shown by reference characters 5A and 5B. It should be noted that a group of the outsidemost pixels are indicated by reference character 5B, and a group of pixels that is located inside the former group is indicated by reference character 5A.

In FIG. 52, the four pixels in a longitudinal direction and five pixels in a lateral direction define a display region. An image displayed by liquid crystal elements is formed in this display region. Dummy pixels 113 are disposed outside the display region. A peripheral frame 11 formed of the same material as the spacers 4 are provided on the periphery of the dummy pixels 113. Further, a sealing material is applied to the outside of the peripheral frame 11. Reference numeral 13 is external connection terminals, which are used to supply signals from external equipment to the liquid crystal panel 100.

The spacers 4 and the peripheral frame 11 are formed of a resin material, examples of which include a negative photoresist of the chemically amplified type "BPR-113" (trade name) manufactured by JSR Corp. The photoresist material is applied by a spin-coating method to the drive-circuit substrate 1 on which the reflective electrode 5 is formed, and then a pattern of spacers 4 and a peripheral frame 11 is exposed on the photoresist film through a mask. Thereafter, the photoresist is developed with a remover to form the spacers 4 and peripheral frame 11.

When the spacers 4 and the peripheral frame 11 are formed from a photoresist material, etc., it is possible to control the height of the spacers 4 and the peripheral frame 11 at the film thickness of a material to be applied, thus enabling formation of the spacers 4 and the peripheral frame 11 with a high degree of accuracy. In addition, the positions of spacers 4 can be defined with a mask pattern, and it is possible to accurately place the spacers 4 in any desired position. The liquid crystal projector has a problem that the existence of the spacers 4 on pixels provides a visible shadow caused by the spacers on an extendedly projected image. By forming the spacers 4 through the exposure and the development by use of the mask pattern, the spacers 4 can be disposed at positions that cause no problem at the time of displaying an image.

In addition, since the peripheral frame 11 is formed at the time of forming the spacers 4, a method in which the liquid crystal composition 3 is first dropped onto the drive-circuit substrate 1 and then the transparent substrate 2 is bonded to the drive-circuit substrate 1 can be used as a method of sealing the liquid crystal composition 3 in between the drive-circuit substrate 1 and the transparent substrate 2.

Once the liquid crystal composition 3 has been disposed between the drive-circuit substrate 1 and the transparent substrate 2 to assemble the liquid crystal panel 100, the liquid crystal composition 3 can be held within the area surrounded by the peripheral frame 11. Further, the sealing material 12 is applied to the outside of the peripheral frame 11, and the liquid crystal composition 3 is sealed in the liquid crystal panel 100. As stated above, the peripheral frame 11 can be formed on the drive-circuit substrate 1 with a high degree of positional accuracy since it is formed by use of a mask pattern. This means the boundaries of the liquid crystal composition 3 can be defined with a high degree of accuracy. In addition, the peripheral frame 11 can also define the boundary between the area forming the sealing material 12 and the same with a high degree of accuracy.

The sealing material 12 has a role in the fixation of the drive-circuit substrate 1 and the transparent substrate 2, and anther role in the prevention of harmful substances from entering the liquid crystal composition 3. When the sealing material with liquidity is applied, the peripheral frame 11 functions as a stopper of the sealing material 12. Provision of the peripheral frame 11 as a stopper of the sealing material 12 can expand the design margin at the boundary of the liquid crystal composition 3 or the sealing material 12, thus making the distance from the perimeter of the liquid crystal panel 100 to the display area narrower (reduction in the perimeter area).

Since the peripheral frame 11 is formed in a manner to surround the display area, a problem arises that the peripheral frame 11 itself interferes successful rubbing of areas adjacent to the peripheral frame 11 when the drive-circuit substrate 1 is to be rubbed. In order to orient the liquid crystal composition 3 in a regular direction, an orientation film will be formed and rubbing will be executed. In the present embodiment, the orientation film 7 is applied after the spacers 4 and the peripheral frame 11 are formed on the drive-circuit substrate 1. Thereafter, a process of rubbing the orientation film 7 with cloth, etc. is given in a manner that the liquid crystal composition 3 is oriented in a regular direction.

During the rubbing, since the peripheral frame 11 protrudes from the drive-circuit substrate 1, the orientation film 7 cannot be sufficiently rubbed at a portion closer to the peripheral frame 11 due to a step caused by the peripheral frame 11. Consequently, a portion where the orientation of the liquid crystal composition 3 is nonuniform is liable to appear in the vicinity of the peripheral frame 11. In order to make the nonuniformity in display caused by the orientation failure of the liquid crystal composition 3 invisible, the dummy pixels 113 are placed for several pixels inside the peripheral frame 11, thus allowing them not to contribute to the display.

However, when the dummy pixels 113 are provided and signals are supplied to them similarly to the pixels 5A and 5B, a problem arises that display made by the dummy pixels 113 is also observed since the liquid crystal composition 3 exists between the dummy pixels 113 and the transparent substrate 2. When the device is operated in the normally white mode, the dummy pixels 113 are displayed in white color unless a voltage is applied to the liquid crystal composition 3. Consequently, boundaries of the display area become obscure, thus deteriorating the quality of display. Of course, to apply light blocking for the dummy pixels 113 is an idea, but it is difficult to form a light-blocking frame with a high degree of accuracy at the boundaries of the display area since the gap between pixels is several micrometers. Consequently, a voltage is supplied to the dummy pixels 113 to provide a black image so that a black frame surrounding the display area is observed.

Figure 53:
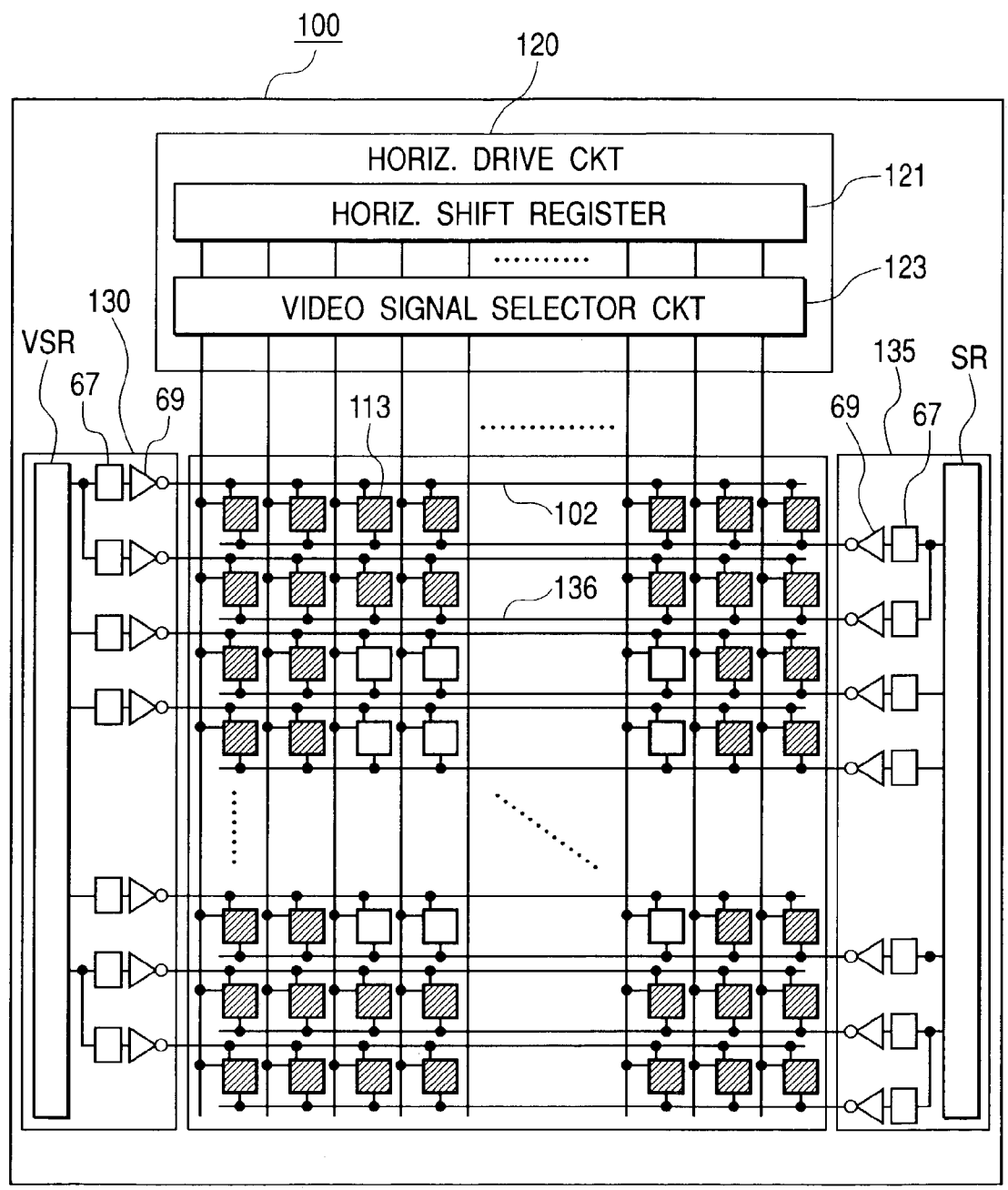
FIG. 53 is a schematic circuit diagram showing a method of driving dummy electrodes of the liquid crystal display device according to the preferred embodiment of the present invention.

A method of driving the dummy pixels 113 will be described by referring to FIG. 53. Since a voltage which achieves a black image is supplied to the dummy pixels 113, the area in which such dummy pixels are provided presents a black image over the area. If a black image is achieved over the area, it is not necessary to provide the pixels independently just like those provided in the display area, and a plurality of dummy pixels can be disposed in an electrically connected manner. In addition, in view of a time required for driving, it is unprofitable to allow a time required for writing into the dummy pixels. Given this factor, it is possible to arrange a plurality of electrodes of dummy pixels in series so as to provide a single dummy-pixel electrode. However, achieving a single dummy pixel by connecting a plurality of dummy pixels will result in the increased area of pixel electrode, and consequently, the liquid crystal capacitance becomes larger. As stated earlier, the efficiency of lowering the pixel voltage by using the pixel capacitance will reduce as the liquid crystal capacitance becomes larger.

Therefore, the dummy pixels are arranged independently as with pixels in the display area. However, if the dummy pixels are written into, line by line, as in the case of the usable pixels, the time to drive a plurality of dummy rows that are disposed anew will become longer. Consequently, a problem arises that the time required for writing into usable pixels becomes shorter by that time. On the contrary, for a high-definition image, much more restrictions on the time required for writing pixels will arise since high-speed video signals (signals having higher dot clock frequencies) is input. Therefore, in order to save writing time for several rows during a writing period for one screen, as shown in FIG. 53, for dummy pixels, timing signals for a plurality of rows are output from a vertical bidirectional shift register VSR of a vertical drive circuit 130 to a plurality of level shifters 67 and the output circuits 69, thereby outputting scanning signals. Likewise, the bidirectional shift register SR of the pixel potential control circuit 135 is allowed to output timing signals for a plurality of rows to a plurality of level shifters 67 and the output circuits 69, thereby outputting pixel potential control signals.

Figure 54:
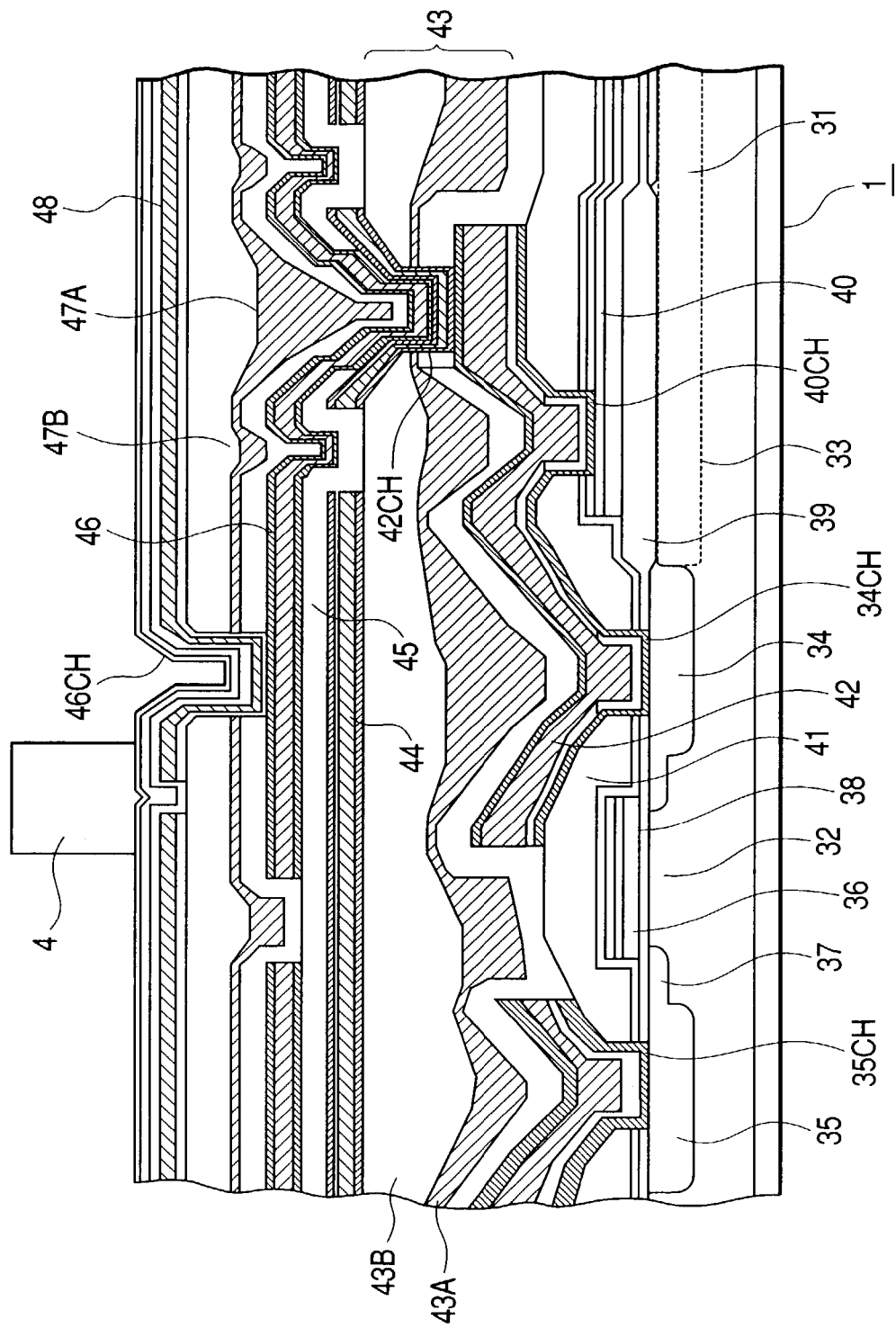
FIG. 54 is a schematic section view of active elements and its peripheral area of the liquid crystal display device according to the preferred embodiment of the present invention.
Figure 55:
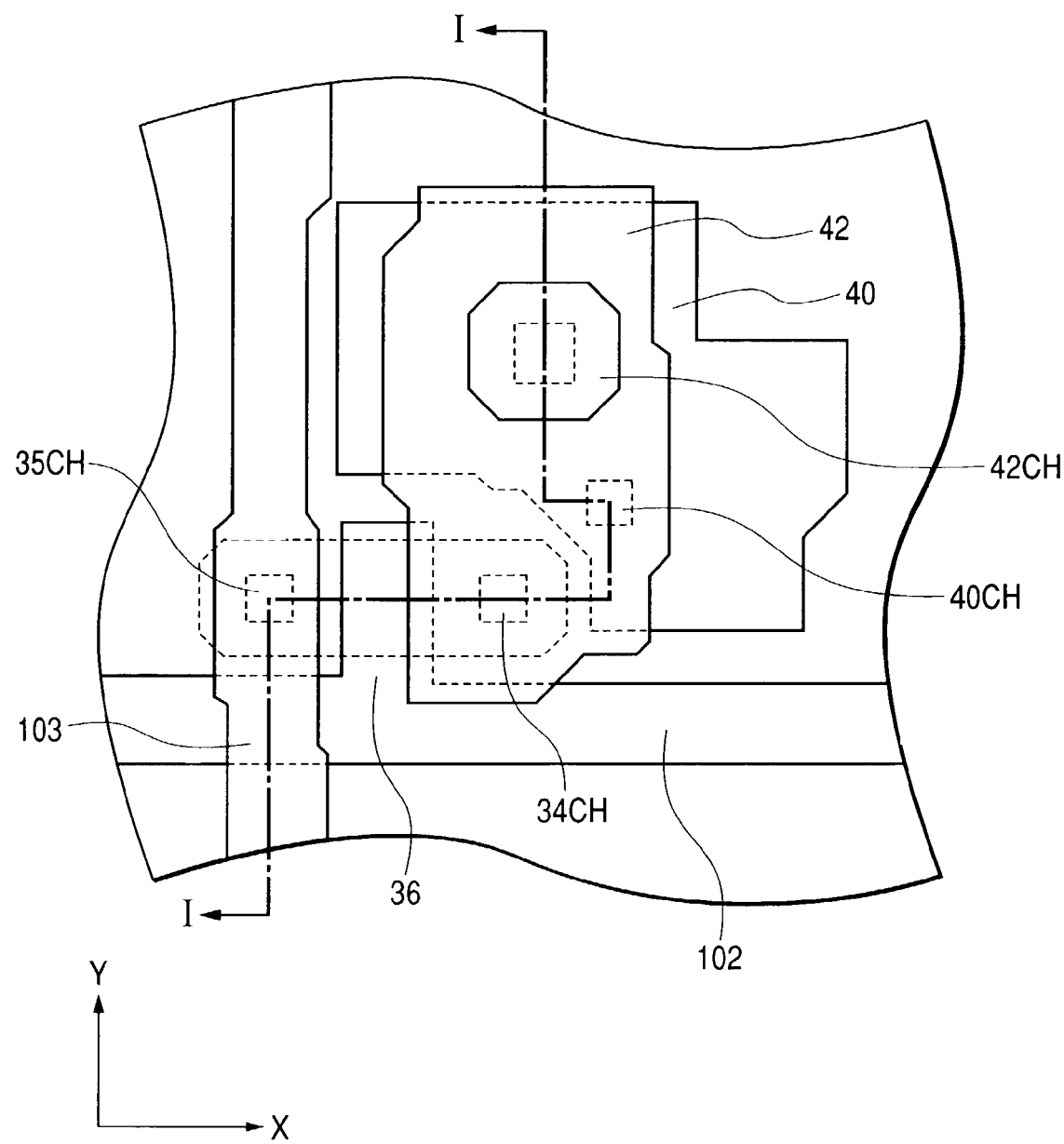
FIG. 55 is a schematic section view of active elements and the peripheral area of the liquid crystal display device according to the preferred embodiment of the present invention.

The active element 30 and the peripheral structures which are disposed on the drive-circuit substrate 1 will be described in detail by referring to FIGS. 54 and 55. It should be noted that, in FIGS. 54 and 55, the same reference numerals as those in FIG. 45 indicate the same structures. FIG. 55 is a schematic plan view showing the periphery of the active element 30. FIG. 54 is a sectional view taken on line I—I in FIG. 55, but the distance between respective structures in FIGS. 54 and 55 is not consistent. In addition, FIG. 55 only illustrates the respective positional relationships between the scanning signal line 102 and the gate electrode 36, the video signal line 103 and the source region 35, the drain region 34 and the second electrode 40 which forms the pixel capacitance, as well as the first conductive layer 42 and contact holes 35CH, 34CH, 40CH and 42CH, and other structures are omitted.

In FIG. 54, reference numeral 1 is a silicon substrate which is a drive-circuit substrate, reference numeral 32 is a semiconductor region (p-well) which is made on the silicon substrate 1 through the ion implantation, reference 33 is a channel stopper, reference numeral 34 is a drain region which is made conductive and formed on the p-well 32 through the ion implantation, reference numeral 35 is a source region which is formed on p-well 32 through the ion implantation, and reference 31 is a first electrode of the pixel capacitance which is made conductive and formed on the p-well 32 through the ion implantation. It should be noted that, in the present preferred embodiment, although the active element 30 is represented by a p-type transistor, a n-type transistor can also be employed.

Reference numeral 35 is a gate electrode, reference numeral 37 is an offset region which defuses the electric field strength at the end section of the gate electrode, reference numeral 38 is an insulating film, reference numeral 39 is a field oxide layer for electrically isolating transistors, and reference numeral 40 is a second electrode forming pixel capacitance, which forms capacitance together with the first electrode 31 disposed on the silicon substrate 1 via the insulating film 38. The gate electrode 36 and the second electrode 40 are each composed of two-layered film wherein a conductive layer which is used to lower the threshold of the active element 30 and a conductive layer of low resistance are stacked on the insulating film 38. A film made of, e.g., polysilicon and tungsten silicide stacked thereon may be used as the two-layered film. Reference numeral 41 is a first interlayer film, and reference numeral 42 is a first conductive film. The first conductive film 42 comprises a multilayer film comprising a barrier metal and a conductive film of low-resistance. For example, a multilayer film comprising a titanium tungsten and a aluminum film may be used as the first conductive film by forming it by sputtering.

In FIG. 55, reference numeral 102 is a scanning signal line. The scanning signal lines 102 extend in an X direction and are disposed parallel to each other in a Y direction in FIG. 55. A scanning signal to turn on and off the active element 30 is supplied to the scanning signal line. The scanning signal line 102 is composed of the same two-layered film as the gate electrode, and, for example, a two-layered film formed of a polysilicon and a tungsten silicide film may be used. The video signal lines 103 extend in a Y direction and are disposed parallel to each other in an X direction, and a video signal to be written onto the reflective electrode 5 is supplied to the video signal line. The video signal line 103 is composed of the same multilayer metallic film as the first conductive film 42, and, for example, a multilayer metallic film formed of a titanium tungsten and a aluminum film may be used.

A video signal is transmitted to the drain region 35 from the first conductive film 42 via the contact hole 35 bored in the insulating film 38 and the first interlayer film 41. When a scanning signal is supplied to the scanning signal line 102, the active element 30 is turned on, the video signal is transmitted to the source region 34 from the semiconductor region (p-well) 32 and is transmitted to the first conductive film 42 via the contact hole 34CH. The video signal transmitted to the first conductive film 42 is then transmitted to the second electrode 40 of pixel capacitance via the contact hole 40CH.

In addition, as shown in FIG. 54, the video signal is transmitted to the reflective electrode 5 through the contact hole 42CH. The contact hole 42CH is made above the field oxide layer 39. Since the field oxide layer 39 has a large film thickness, and therefore, structures placed above the field oxide layer are positioned at a position higher than other structures. Since the contact hole 42CH is made above the field oxide layer 39, it can be located at a position closer to the conductive film in the upper layer, thus making a length of the connection section of the contact hole shorter.

Further, as shown in FIG. 54, the second interlayer film 43 insulates the first conductive film 42 from the second conductive film 44. The second conductive film 43 is formed of two layers; a planarizing film 43A for covering and smoothing unevenness caused by structures and an insulating film 43A for covering the planarizing film. The planarizing film 43A is formed by applying the SOG (spin on glass) on it. The insulating film 43B is a TEOS film which is obtained by forming a $SiO_2$ film under the CVD (Chemical Vapor Deposition), using the TEOS (Tetraethylorthosilicate) as a reaction gas.

After forming the second interlayer film 43, the second interlayer film 43 is polished by the CMP (Chemical Mechanical Polishing). The second interlayer film 43 can be smoothened through the CMP process. The first light-blocking film 44 is formed on the second interlayer film thus smoothened. The first light-blocking film 44 is formed of a multilayer metallic film including tungsten and aluminum layers as with the first conductive film 42.

The first light-blocking film 44 covers almost the whole area of the drive-circuit substrate 1, and an opening is only the portion occupied by the contact hole 42CH as shown in FIG. 54. The third interlayer film 45 made of the TEOS film is formed on the first light-blocking film 44. Further, the second light-blocking film 44 is formed on the third interlayer film 45. The second light-blocking film 46 is formed of a multilayer metallic film including tungsten and aluminum layers as with the first conductive film 42. The second light-blocking film 46 is coupled to the first conductive film 42 via the contact hole 42CH. A metallic film forming the first light-blocking film 44 and a metallic film forming the second light-blocking film 46 are stacked in the contact light-blocking film 44 so as to establish the connection therebetween.

The first light-blocking film 44 and the second light-blocking film 46 are each formed of a conductive film, and the third interlayer film 45 formed of an insulating film (dielectric film) is disposed between the first and the second light-blocking film. A pixel potential control signal is supplied to the first light-blocking film 44 and a gray scale voltage is supplied to the second light-blocking film 46. Thus, pixel capacitance can be formed by the first light-blocking film and the second light-blocking film 46. It should be noted that, when taking into consideration an increase in withstand voltage of the third interlayer film 45 relative to the gray scale voltage and an increase in capacitance by making the film thickness thinner, the preferable film thickness of the third interlayer film 45 should be 150 nm to 450 nm, and more preferably, approximately 300 nm.

As stated in the above, although the invention achieved by the present inventor has been specifically described in accordance with the preferred embodiment according to the invention, the present invention is not limited to the preferred embodiments, and it is to be understood that changes and variations may be made without departing from the spirit or scope of the of the invention.

The following is a brief description of effects to be obtained by a typical invention among inventions disclosed in the application concerned.

According to the present invention, in driving reflective type liquid crystal display elements, it is possible to improve characteristics of noise, EMI, and EMC by arranging a circuit for achieve higher frequencies of video signals and control signals proximately to a liquid crystal panel.

According to the present invention, since circuit substrates can be developed regardless of changes in shape of optical systems during the developmental stage, it is possible to achieve reduction in cost resulting from the curtailment of development period, development work and facelift.

What is claimed is:

1. A liquid crystal projector comprising:
   a liquid crystal display device having three liquid crystal display panels and a display control device coupled to said three liquid crystal display panels; and
   an optical system which projects an image of said liquid crystal display device therefrom;
   wherein said display control device comprises a first section for receiving an externally supplied video signal, and a second section succeeding said first section and coupled to said three liquid crystal display panels;
   wherein said first section comprises a circuit which pre-processes said externally supplied video signal and outputs the preprocessed video signal;
   wherein said second section comprises three circuit systems, and each of said three circuit systems amplifies and converts said preprocessed video signal supplied from said first section into an ac signal, increasing a data rate of said video signal by a factor of two or more and outputs drive pulses for driving a corresponding one of said three liquid crystal display panels;
   wherein said first section is fabricated on a first substrate, said three circuit systems of said second section are fabricated on three second substrates, respectively, and said first and three second substrates are separated from each other;

wherein each of said three second substrates is disposed proximately to a corresponding one of said three liquid crystal display panels; and wherein each of said three second substrates is electrically coupled to said first substrate via a corresponding one of three flexible cables.

2. A liquid crystal projector as claimed in claim 1, wherein said second section includes at least one of a circuit for performing data rate conversion of said video signal, a circuit for performing gamma correction of said video signal, a circuit for performing display resolution conversion of said video signal, a digital-to-analog converter for converting said video signal in digital form to an analog signal, a sample-and-hold circuit for sampling and holding said video signal, and a circuit for phase-expanding said video signal.

3. A projector as claimed in claim 2, wherein the flexible cables are ribbon-like cables.

4. A projector as claimed in claim 2, wherein the flexible cables are foldable ribbon-like cables.

5. A liquid crystal projector as claimed in claim 1, wherein said video signal is supplied to said second section from said first section in differential-amplitude-mode.

6. A projector as claimed in claim 5, wherein the flexible cables are ribbon-like cables.

7. A projector as claimed in claim 5, wherein the flexible cables are foldable ribbon-like cables.

wherein said video signal is supplied to said second section from said first section in differential-amplitude-mode.

8. A liquid crystal projector as claimed in claim 1, wherein each of said three second substrates is one of a pair of substrates sandwiching a liquid crystal layer of a corresponding one of said three liquid crystal display panels.

9. A projector as claimed in claim 8, wherein the flexible cables are ribbon-like cables.

10. A projector as claimed in claim 8, wherein the flexible cables are foldable ribbon-like cables.

11. A liquid crystal projector as claimed in claim 1 wherein each of said three second substrates is attached on an outer surface of one of a pair of substrates sandwiching a liquid crystal layer of a corresponding one of said three liquid crystal display panels.

12. A projector as claimed in claim 11, wherein the flexible cables are ribbon-like cables.

13. A projector as claimed in claim 11, wherein the flexible cables are foldable ribbon-like cables.

14. A liquid crystal projector as claimed in claim 1 wherein said first section is fabricated on a first substrate, each of said three circuit systems of said second section is fabricated on an outer surface of a first one of a pair of substrates sandwiching a liquid crystal layer of a corresponding one of said three liquid crystal display panels, and said first substrate and the first ones of the substrates are separated from each other.

15. A projector as claimed in claim 14, wherein the flexible cables are ribbon-like cables.

16. A projector as claimed in claim 14, wherein the flexible cables are foldable ribbon-like cables.

17. A projector as claimed in claim 1, wherein the flexible cables are ribbon-like cables.

18. A projector as claimed in claim 1, wherein the flexible cables are foldable ribbon-like cables.

* * * * *